United States Patent
Voskian et al.

(10) Patent No.: US 12,264,399 B2
(45) Date of Patent: Apr. 1, 2025

(54) ELECTROCHEMICALLY MEDIATED GAS CAPTURE, INCLUDING FROM LOW CONCENTRATION STREAMS

(71) Applicant: Massachusetts Institute of Technology, Cambridge, MA (US)

(72) Inventors: Sahag Voskian, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/103,310

(22) Filed: Jan. 30, 2023

(65) Prior Publication Data

US 2023/0183872 A1    Jun. 15, 2023

Related U.S. Application Data

(63) Continuation of application No. 17/005,243, filed on Aug. 27, 2020, now Pat. No. 11,598,012, which is a (Continued)

(51) Int. Cl.
*C25B 9/00* (2021.01)
*B01D 53/32* (2006.01)
(Continued)

(52) U.S. Cl.
CPC .......... *C25B 11/095* (2021.01); *B01D 53/326* (2013.01); *C25B 1/00* (2013.01);
(Continued)

(58) Field of Classification Search
CPC ... C25B 11/095; C25B 11/085; C25B 11/031; C25B 9/19; C25B 1/00; C25B 13/04; B01D 53/326
See application file for complete search history.

(56) References Cited

U.S. PATENT DOCUMENTS

| | | |
|---|---|---|
| 3,206,333 A | 9/1965 | Roos |
| 3,540,934 A | 11/1970 | Boeke |

(Continued)

FOREIGN PATENT DOCUMENTS

| | | |
|---|---|---|
| CN | 101124031 A | 2/2008 |
| EP | 2740710 A1 | 6/2014 |

(Continued)

OTHER PUBLICATIONS

Extended European Search Report for Application No. EP 20859447.3 mailed Apr. 18, 2023.
(Continued)

*Primary Examiner* — Zulmariam Mendez
(74) *Attorney, Agent, or Firm* — Wolf, Greenfield & Sacks, P.C.

(57) ABSTRACT

Methods, apparatuses, and systems related to the electrochemical separation of target gases from gas mixtures are provided. In some cases, a target gas such as carbon dioxide is captured and optionally released using an electrochemical cell (e.g., by bonding to an electroactive species in a reduced state). Some embodiments are particularly useful for selectively capturing the target gas while reacting with little to no oxygen gas that may be present in the gas mixture. Some such embodiments may be useful in applications involving separations from gas mixtures having relatively low concentrations of the target gas, such as direct air capture and ventilated air treatment.

25 Claims, 22 Drawing Sheets

Related U.S. Application Data continuation-in-part of application No. PCT/US2019/057224, filed on Oct. 21, 2019, and a continuation-in-part of application No. 16/659,398, filed on Oct. 21, 2019, now abandoned.

(60) Provisional application No. 62/892,962, filed on Aug. 28, 2019.

(51) Int. Cl.
    *C25B 1/00*     (2021.01)
    *C25B 9/19*     (2021.01)
    *C25B 11/031*     (2021.01)
    *C25B 11/085*     (2021.01)
    *C25B 11/095*     (2021.01)
    *C25B 13/04*     (2021.01)

(52) U.S. Cl.
    CPC ............ *C25B 9/19* (2021.01); *C25B 11/031* (2021.01); *C25B 11/085* (2021.01); *C25B 13/04* (2013.01)

(56) References Cited

U.S. PATENT DOCUMENTS

| | | |
|---|---|---|
| 5,770,033 A | 6/1998 | Murphy |
| 5,776,351 A | 7/1998 | McGinness |
| 7,169,509 B2 | 1/2007 | Nobuta |
| 8,900,435 B2 | 12/2014 | Littau |
| 9,056,275 B2 | 6/2015 | Buttry |
| 9,222,179 B2 | 12/2015 | Teamey et al. |
| 10,464,018 B2 | 11/2019 | Voskian et al. |
| 10,646,813 B2 | 5/2020 | Landskron |
| 11,219,858 B2 | 1/2022 | Voskian et al. |
| 11,298,653 B2 | 4/2022 | Voskian et al. |
| 11,598,012 B2 | 3/2023 | Voskian et al. |
| 11,806,663 B2 | 11/2023 | Voskian et al. |
| 11,857,919 B2 | 1/2024 | Voskian et al. |
| 12,005,392 B2 | 6/2024 | Voskian et al. |
| 2002/0086203 A1 | 7/2002 | Nobuta et al. |
| 2002/0163135 A1 | 11/2002 | Kato |
| 2003/0019758 A1 | 1/2003 | Gopal |
| 2004/0229117 A1 | 11/2004 | Mitani et al. |
| 2005/0227071 A1 | 10/2005 | Muraoka et al. |
| 2007/0092769 A1 | 4/2007 | Davis et al. |
| 2008/0202341 A1 | 8/2008 | Poole et al. |
| 2009/0159456 A1 | 6/2009 | Littau et al. |
| 2010/0219068 A1 | 9/2010 | Yamauchi et al. |
| 2013/0045399 A1 | 2/2013 | Cole et al. |
| 2013/0084474 A1 | 4/2013 | Mills |
| 2013/0122382 A1 | 5/2013 | Mizuhata et al. |
| 2013/0145935 A1 | 6/2013 | Suzuka et al. |
| 2013/0292262 A1 | 11/2013 | Teamey et al. |
| 2014/0166499 A1 | 6/2014 | Landskron et al. |
| 2014/0220459 A1 | 8/2014 | Iida et al. |
| 2014/0271434 A1 | 9/2014 | Buttry |
| 2014/0332406 A1 | 11/2014 | Nottke |
| 2015/0004483 A1 | 1/2015 | Nakahara et al. |
| 2015/0110694 A1 | 4/2015 | Eltayeb et al. |
| 2015/0207165 A1 | 7/2015 | Schubert et al. |
| 2016/0017503 A1 | 1/2016 | Kaczur et al. |
| 2017/0088959 A1 | 3/2017 | Abouatallah et al. |
| 2017/0113182 A1* | 4/2017 | Voskian ............... B01D 53/326 |
| 2017/0113951 A1 | 4/2017 | Su |
| 2017/0179499 A1 | 6/2017 | Ashley et al. |
| 2018/0028962 A1 | 2/2018 | Hatton et al. |
| 2018/0215635 A1 | 8/2018 | Roberts |
| 2018/0257027 A1 | 9/2018 | Desai et al. |
| 2019/0030485 A1 | 1/2019 | Perry |
| 2019/0256990 A1 | 8/2019 | Kaczur et al. |
| 2020/0023307 A1 | 1/2020 | Voskian et al. |
| 2021/0031939 A1 | 2/2021 | Perry |
| 2021/0060485 A1 | 3/2021 | Voskian et al. |
| 2021/0062351 A1 | 3/2021 | Hatton et al. |
| 2021/0079537 A1 | 3/2021 | Spurgeon |
| 2021/0387139 A1 | 12/2021 | Voskian et al. |
| 2022/0040632 A1 | 2/2022 | Voskian et al. |
| 2022/0145002 A1 | 5/2022 | Rogers et al. |
| 2022/0184552 A1 | 6/2022 | Voskian et al. |
| 2022/0362708 A1 | 11/2022 | Voskian et al. |

FOREIGN PATENT DOCUMENTS

| | | |
|---|---|---|
| GB | 2513103 A | 10/2014 |
| JP | 2005-100926 A | 4/2005 |
| JP | 2007-090329 A | 4/2007 |
| JP | 2009-217992 A | 9/2009 |
| JP | 2013-134918 A | 7/2013 |
| JP | 2015-036128 A | 2/2015 |
| JP | 2018-533470 A | 11/2018 |
| KR | 2002-0037262 A | 5/2002 |
| KR | 2013-0048728 A | 5/2013 |
| WO | WO 1989/006055 A1 | 6/1989 |
| WO | WO 2003/087434 A1 | 10/2003 |
| WO | WO 2006/082436 A1 | 8/2006 |
| WO | WO 2011/116236 A2 | 9/2011 |
| WO | 2012/144189 A1 | 10/2012 |
| WO | WO 2013/025999 A2 | 2/2013 |
| WO | WO 2017/075014 A1 | 5/2017 |
| WO | WO 2019/136374 A1 | 7/2019 |

OTHER PUBLICATIONS

Bohle et al., Kinetics and mechanism of nucleophilic addition to nitric oxide: secondary amine diazeniumdiolation. Inorg Chem. May 19, 2008;47(10):3925-7.

Ren et al., What are functional ionic liquids for the absorption of acidic gases? J Phys Chem B. Feb. 28, 2013;117(8):2482-6. doi: 10.1021/jp311707e. Epub Feb. 12, 2013. Erratum in: J Phys Chem B. May 2, 2013;117(17):5394-5.

Smith et al., Nitric oxide-releasing polymers containing the [N(O)NO]- group. J Med Chem. Mar. 1, 1996;39(5):1148-56.

Zheng et al., Investigation of phenolic ionic liquids as efficient nitric oxide absorbents. J Molec Liq. 2021; 338: 116559.

International Search Report and Written Opinion dated Jan. 9, 2020, for Application No. PCT/US2019/057224.

International Search Report and Written Opinion dated Dec. 11, 2020, for Application No. PCT/US2020/048279.

Achilleos et al., Selective Molecularly Mediated Pseudocapacitive Separation of Ionic Species in Solution. ACS Appl. Mater. Interfaces, 2016, 8, 32743-32753.

Apaydin et al., Direct Electrochemical capture and release of carbon dioxide using an industrial organic pigment: quinacridone. Angew. Chemie Int. Ed., 2014, 53:6819-6822.

Bhatt et al., A Fine-Tuned Fluorinated MOF Addresses the Needs for Trace $CO_2$ Removal and Air Capture Using Physisorption. J. Am. Chem. Soc., 2016; 138:9301-9307.

Bryantsev et al., Predicting Solvent Stability in Aprotic Electrolyte LiAir Batteries: Nucleophilic Substitution by the Superoxide Anion Radical (02). J. Phys. Chem. A, 2011, 115, 12399-409.

Choi et al., Amine-Tethered Solid Adsorbents Coupling High Adsorption Capacity and Regenerability for $CO_2$ Capture From Ambient Air. ChemSusChem, 2011, 4, 628-635.

Dubois et al., Chapter 4—Electrochemical Concentration of Carbon Dioxide. Editor(s): B.P. Sullivan. Electrochemical and Electrocatalytic Reactions of Carbon Dioxide. 1993. 94-117. https://doi.org/10.1016/B978-0-444-88316-2.50008-5.

Gibian et al., Reactivity of Superoxide Ion with Carbonyl Compounds in Aprotic Solvents. J. Am. Chem. Soc., 1979, 101, 640-644.

Gurkan et al., Quinone reduction in ionic liquids for electrochemical $CO_2$ Separation. ACS Sustainable Chem. Eng. 2015;3(7):1394-1405.

Hefti et al., On the potential of phase-change adsorbents for $CO_2$ capture by temperature swing adsorption. Faraday Discuss., 2016, 192, 153-179.

Kim et al., A novel ventilation strategy with CO2capture device and energysaving in buildingsMoon. Energy Build., 2015, 87, 134-141.

(56) References Cited

OTHER PUBLICATIONS

Kokoszka et al., Supercapacitive swing adsorption of carbon dioxide. Angew Chem Int Ed Engl. Apr. 1, 2014;53(14):3698-3701. doi: 10.1002/anie.201310308. Epub Feb. 24, 2014. PMID: 24616112.

Li et al., Semiquinone Intermediates in the Two-Electron Reduction of Quinones in Aqueous Media and their Exceptionally High Reactivity towards Oxygen Reduction. Chemphyschem, 2011, 12, 1255-7.

Li et al., Numerical and experimental study of a novel compact micro fluidizedbeds reactor for CO2capture in HVAC. Energy Build., 2017, 135, 128-136.

Liu et al., Design, construction, and testing of a supercapacitive swing adsorption module for CO2 separation. Chem Commun (Camb). Mar. 28, 2017;53(26):3661-3664. doi: 10.1039/c7cc01055a.

Mao et al., Electrochemically Responsive Heterogeneous Catalysis for Controlling Reaction Kinetics. J. Am. Chem. Soc. 137, 1348-1355 (2015).

Marshall, (2017). In Switzerland, a giant new machine is sucking carbon directly from the air. Science. June 1. doi: 10.1126/science.aan6915.

Mizen et al., Reductive Addition of CO 2 to 9,10-Phenanthrenequinone. J Electro Soc. 1989;136(4):941-946.

Muench et al., Polymer-Based Organic Batteries. Chem. Rev., 2016;116:9438-9484.

Ntiamoah et al., CO2 Capture by Temperature Swing Adsorption: Use of Hot CO2-Rich Gas for Regeneration. Ind. Eng. Chem. Res., 2016, 55, 703-713.

Patel et al., Semiquinone Free Radicals and Oxygen Pulse Radiolysis Study of One Electron Transfer Equilibria. J. Chem. Soc. Faraday Trans. 1 Phys. Chem. Condens. Phases, 1973, 69, 814.

Peover et al., The Formation of the Superoxide Ion by Electrolysis of Oxygen in Aprotic Solvents. Chem. Commun., 1965, 183.

Rheinhardt et al., Electrochemical Capture and Release of Carbon Dioxide. ACS Energy Lett. 2017;2:454-461.

Riboldi et al., Evaluating Pressure Swing Adsorption as a CO2 separation technique in coal-fired power plants. Int. J. Greenh. Gas Control, 2015, 39, 1-16.

Roberts et al., Nucleophilic Oxygenation of Carbon Dioxide by Superoxide Ion in Aprotic Media to Form the C2O6—Species. J. Am. Chem. Soc., 1984, 106, 4667-4670.

Sanz-Pérez et al., Direct Capture of CO2 from Ambient Air. Chem. Rev., 2016, 116, 11840-11876.

Scovazzo et al., Electrochemical separation and concentration of < 1 % carbon dioxide from nitrogen. J. Electrochem. Soc. 2003;150(5):D91-D98.

Simpson et al, "Reactivity of Carbon Dioxide with Quinones," Electrochimica Acta, vol. 35, Issue 9, 1990, pp. 1399-1403.

Singh et al., Electrochemical Capture and Release of Carbon Dioxide Using a Disulfide-Thiocarbonate Redox Cycle. J Am Chem Soc. Jan. 25, 2017;139(3):1033-1036. doi: 10.1021/jacs.6b10806. Epub Jan. 11, 2017. PMID: 28052189.

Song et al., Polyanthraquinone as a Reliable Organic Electrode for Stable and Fast Lithium Storage. Angew Chem Int Ed Engl. Nov. 16, 2015;54(47):13947-51. doi:10.1002/anie.201506673. Epub Sep. 28, 2015.

Song et al., Towards sustainable and versatile energy storage devices: an overview of organic electrode materials. Energy Environ. Sci., 2013, 6, 2280-2301.

Stern et al., Post-combustion carbon dioxide capture using electrochemically mediated amine regeneration. Energy Environ. Sci., Jul. 2013;6(8):2505.

Vicari, Electrochemically-mediated membrane separations for carbon dioxide capture. Massachusetts Institute of Technology Dissertation. Jun. 2016.

Voskian et al., Faradaic electro-swing reactive adsorption for CO2 capture. Energy Environ Sci. 2019;12:3530-3547.

Wilcox et al., Assessment of reasonable opportunities for direct air capture. Environ. Res. Lett., 2017, 12:065001.

Winnick et al., Carbon Dioxide Concentration for manned Spacecraft Using a Molten Carbonate Electrochemical Cell. AlChE J., 1982, 28:103-111.

Zhou et al., Polyanthraquinone-based nanostructured electrode material capable of high-performance pseudocapacitive energy Storage in a protic electrolyte. Nano Energy, 2015, 15:654-661.

Zhu et al., Relationships between the Charge-Discharge Methods and the Performance of a Supercapacitive Swing Adsorption Module for CO2 Separation. J Physical Chemistry C 2018 122 (32), 18476-18483. DOI: 10.1021/acs.jpcc.8b03968.

Zhu et al., Relationships between the Elemental Composition of Electrolytes and the Supercapacitive Swing Adsorption of CO2. ACS Applied Energy Materials 2019 2 (10), 7449-7456. DOI: 10.1021/acsaem.9b01435.

\* cited by examiner

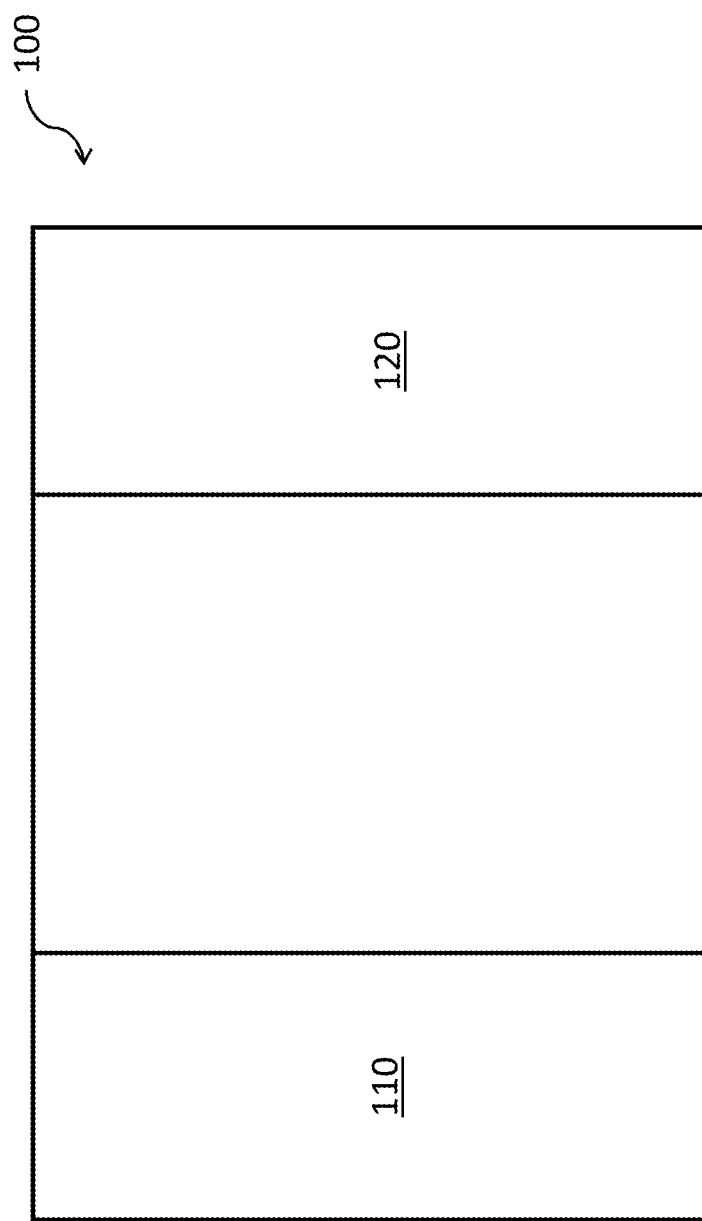

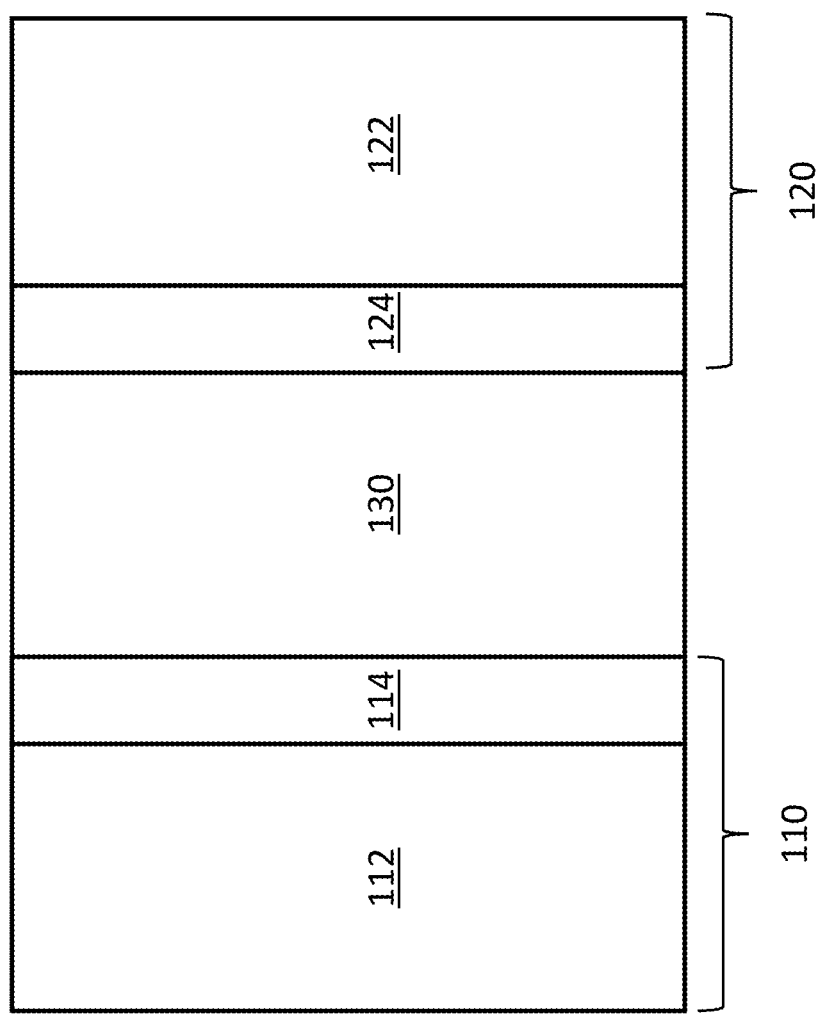

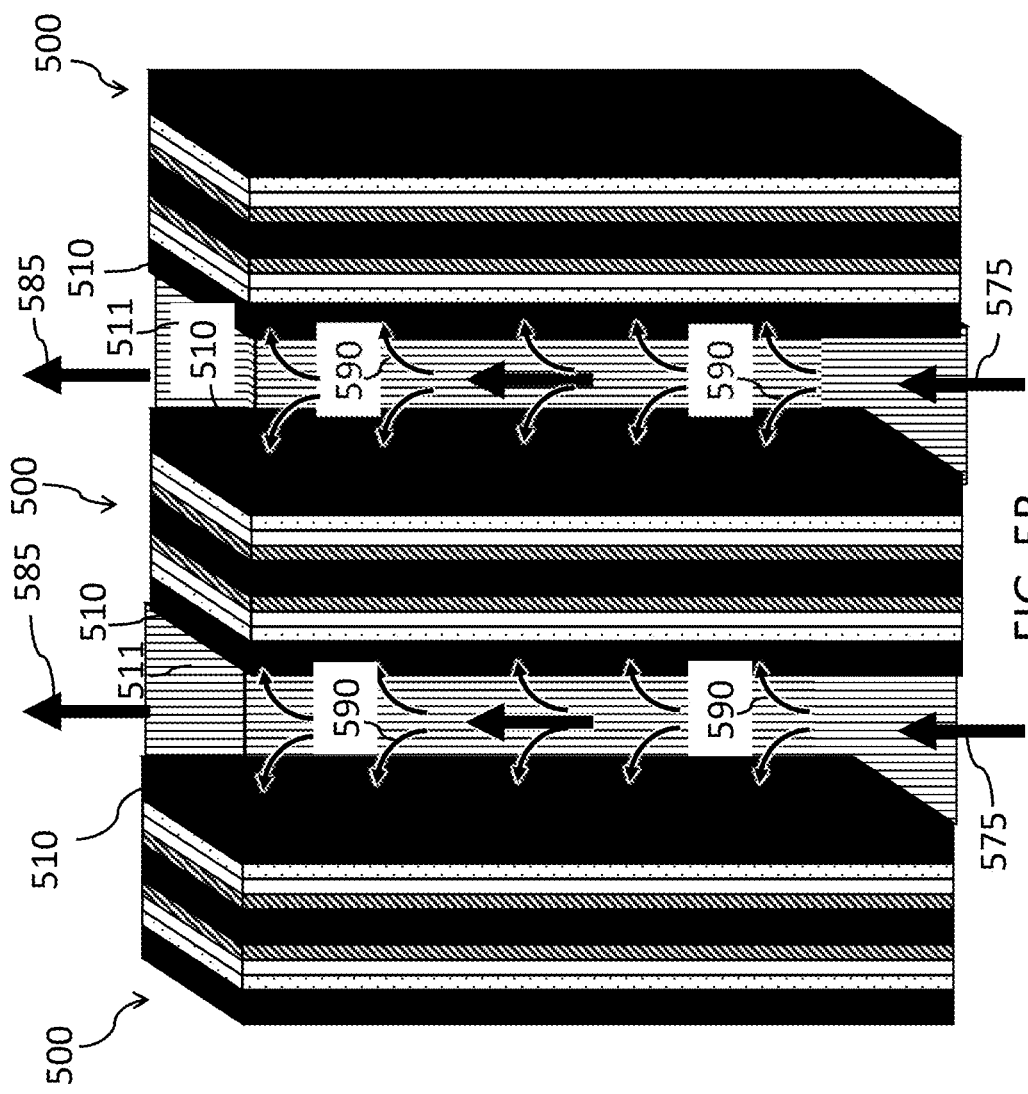

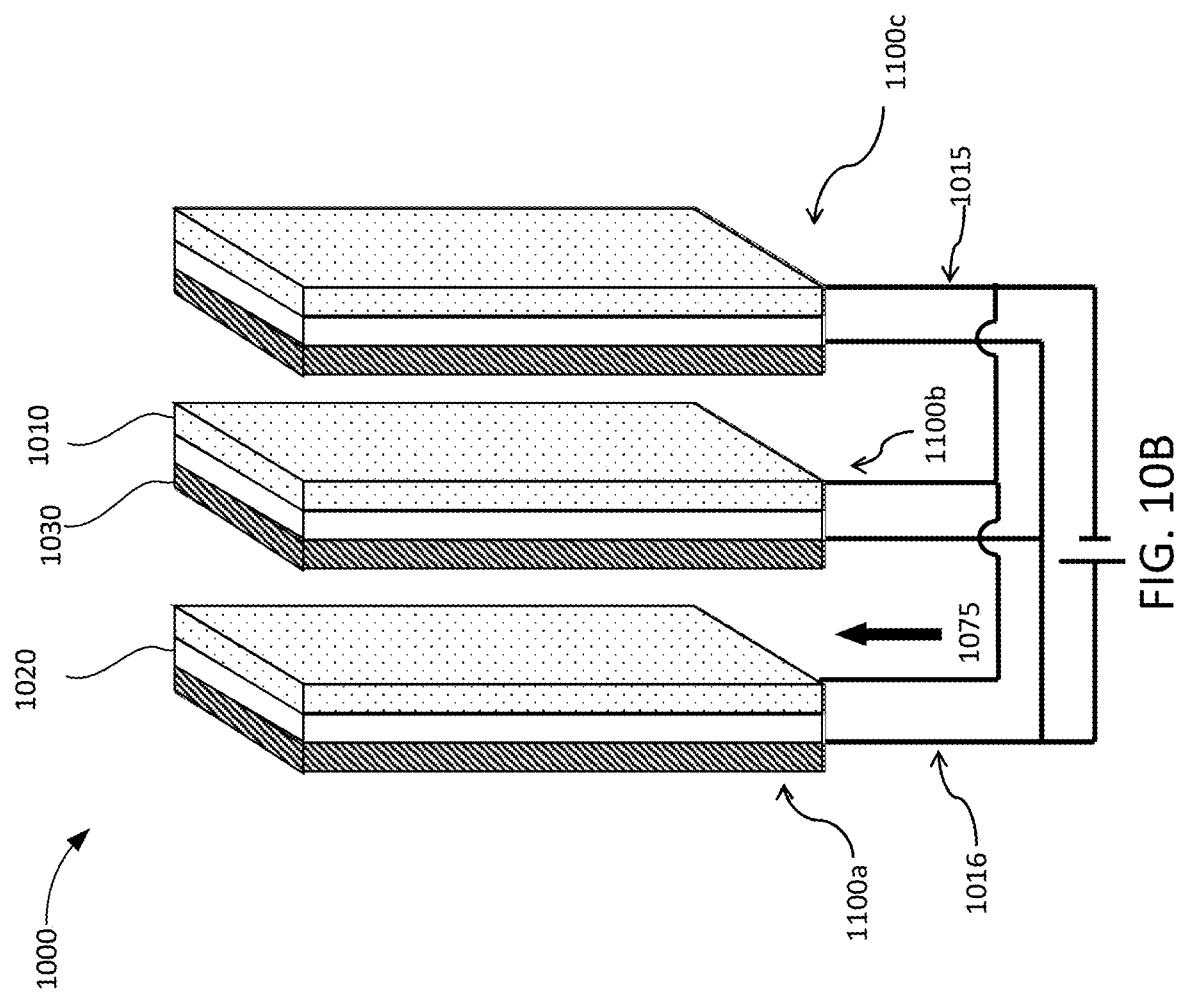

ELECTROCHEMICALLY MEDIATED GAS CAPTURE, INCLUDING FROM LOW CONCENTRATION STREAMS

RELATED APPLICATIONS

This application is a continuation of U.S. patent application Ser. No. 17/005,243, filed Aug. 27, 2020, entitled "Electrochemically Mediated Gas Capture, Including from Low Concentration Streams," which is a continuation-in-part of U.S. patent application Ser. No. 16/659,398, filed Oct. 21, 2019, entitled "Electrochemically Mediated Gas Capture, Including from Low Concentration Streams," and is also a continuation-in-part of International Patent Application No. PCT/US2019/057224, filed Oct. 21, 2019, entitled "Electrochemically Mediated Gas Capture, Including from Low Concentration Streams," each of which claims priority under 35 U.S.C. § 119(e) to U.S. Provisional Application No. 62/892,962, filed Aug. 28, 2019, and entitled "Electrochemically Mediated Carbon Capture from Low Concentration Streams," all of which are incorporated herein by reference in its entirety for all purposes.

TECHNICAL FIELD

Methods, apparatuses, and systems related to the electrochemical separation of target gases from gas mixtures are generally described.

BACKGROUND

Efforts have been made to remove target species from gas mixtures. For example, over the last two decades there has been an effort to mitigate global warming by curbing anthropogenic carbon dioxide ($CO_2$) emission. A number of approaches, such as conventional thermal methods, have been pursued to tackle carbon dioxide capture at different stages of its production: either post combustion capturing at power plants, or concentrating it from the atmosphere, after which it is either pressurized and stored in geological formations, or it is converted to commercially useful chemical compounds. Other potential applications of target gas removal include removing target gases directly from air or from ventilated air. Improved apparatuses, methods, and/or systems are desirable.

SUMMARY

Methods, apparatuses, and systems related to the electrochemical separation of target gases from gas mixtures are provided. In some cases, a target gas such as carbon dioxide is captured and optionally released using an electrochemical cell (e.g., by bonding to an electroactive species in a reduced state). Some embodiments are particularly useful for selectively capturing the target gas while reacting with little to no oxygen gas that may be present in the gas mixture. Some such embodiments may be useful in applications involving separations from gas mixtures having relatively low concentrations of the target gas, such as direct air capture and ventilated air treatment. The subject matter of the present invention involves, in some cases, interrelated products, alternative solutions to a particular problem, and/or a plurality of different uses of one or more systems and/or articles.

In one aspect, electrochemical cells are described. In some embodiments, the electrochemical cell comprises a negative electrode comprising a first electroactive species; a positive electrode; and a separator between the negative electrode and the positive electrode, the separator being capable of containing a conductive liquid, wherein the first electroactive species has an oxidized state and at least one reduced state in which the species is capable of bonding with a target gas, but for which a reaction with oxygen ($O_2$) is thermodynamically unfavorable at at least one temperature. In some embodiments, the first electroactive species has at least one reduced state in which the species is capable of bonding with a target gas but for which a reaction with oxygen ($O_2$) is thermodynamically unfavorable at at least one temperature greater than or equal to 223 K and less than or equal to 573 K. In some embodiments, the first electroactive species has at least one reduced state in which the species is capable of bonding with a target gas but for which a reaction with oxygen ($O_2$) is thermodynamically unfavorable at at least one temperature greater than or equal to 223 K and less than or equal to 373 K.

In some embodiments, the electrochemical cell comprises a negative electrode comprising a first electroactive species immobilized on the negative electrode; and a positive electrode; wherein the first electroactive species has an oxidized state and at least one reduced state in which the species is capable of bonding with a target gas but for which a reaction with oxygen ($O_2$) is thermodynamically unfavorable at at least one temperature. In some embodiments, the first electroactive species has at least one reduced state in which the species is capable of bonding with a target gas but for which a reaction with oxygen ($O_2$) is thermodynamically unfavorable at at least one temperature greater than or equal to 223 K and less than or equal to 573 K. In some embodiments, the first electroactive species has at least one reduced state in which the species is capable of bonding with a target gas but for which a reaction with oxygen ($O_2$) is thermodynamically unfavorable at at least one temperature greater than or equal to 223 K and less than or equal to 373 K.

In another aspect, gas separation systems are described. In some embodiments, the gas separation system comprises a plurality of electrochemical cells in fluid communication with a gas inlet and gas outlet, wherein the gas separation system is configured to have a productivity for capturing a target gas of greater than equal to 0.003 $kg_{target\ gas}/(kg_{bed}t_b)$ at a gas stream flow rate of greater than or equal to 0.001 L/s and less than or equal to 500 L/s, where $kg_{bed}$ is the bed weight and $t_b$ is breakthrough time for the gas separation system.

In another aspect, methods of at least partial gas separation are described. In some embodiments, the method comprises applying a potential difference across an electrochemical cell; exposing a gas mixture comprising a target gas to an electrochemical cell; and removing an amount of the target gas from the gas mixture during and/or after the applying the first potential difference, wherein less than or equal to 0.1% of any oxygen gas ($O_2$) present in the gas mixture by volume percent is removed from the gas mixture.

In some embodiments, the method comprises applying a first potential difference across an electrochemical cell; exposing a first amount of an input gas mixture comprising a target gas to the electrochemical cell; bonding at least a portion of the target gas with an electroactive species of the electrochemical cell during and/or after the applying the first potential difference to produce a first treated gas mixture having a lower amount of the target gas than the first gas mixture; applying a second potential difference across the electrochemical cell; and releasing a portion or all of the target gas bonded with the electroactive species to produce a second treated gas mixture, wherein, during and/or after the releasing the method further comprises flowing a second gas through the electrochemical cell to remove at least a portion or all of the released target gas from the electrochemical cell, and/or applying a vacuum condition to the electrochemical cell to remove at least a portion or all of the released target gas from the electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A shows a side-view schematic diagram of an exemplary electrochemical cell comprising a negative electrode and a positive electrode, according to one or more embodiments;

FIG. 1B shows a side-view schematic diagram of an exemplary electrochemical cell comprising a negative electrode, a positive electrode, and a separator, according to one or more embodiments;

FIG. 5B shows a schematic drawing of an exemplary system comprising flow fields, performing a gas separation process, according to one or more embodiments;

FIG. 10B shows a schematic drawing of an exemplary system comprising a plurality of electrochemical cells electrically connected in parallel performing a gas separation process, according to one or more embodiments;

DETAILED DESCRIPTION

Figure 2:
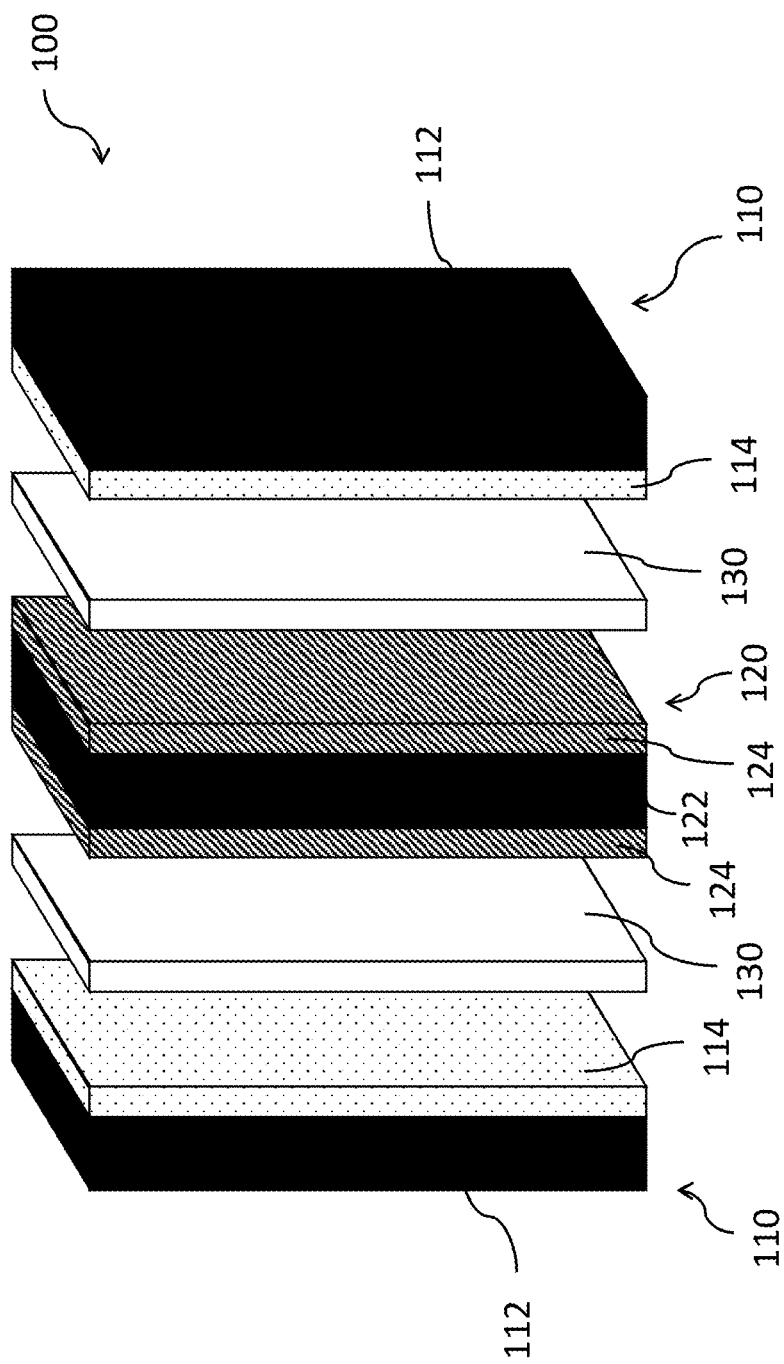
FIG. 2 shows an exploded schematic diagram of an exemplary electrochemical cell, according to one or more embodiments.

Methods, apparatuses, and systems related to the electrochemical separation of target gases from gas mixtures are provided. In some cases, a target gas such as carbon dioxide is captured and optionally released using an electrochemical cell (e.g., by bonding to an electroactive species in a reduced state). Some embodiments may be particularly useful for selectively capturing the target gas while reacting with little to no oxygen gas that may be present in the gas mixture. Some such embodiments may be useful in applications involving separations from gas mixtures having relatively low concentrations of the target gas, such as direct air capture and ventilated air treatment. Certain such embodiments are less energy-intensive or expensive than certain existing technologies, such as thermal or pressure-swing target gas separation.

In some aspects, methods of at least partially separating gas mixtures, and electrochemical cells and gas separation systems that may be useful for such applications, are generally described. Certain aspects are related to applying potential differences across electrochemical cells and exposing gas mixtures (e.g., low-concentration mixtures such as ambient air, ventilated air) comprising the target gas (e.g., $CO_2$) to the electrochemical cells. The electrochemical cell may include electrodes comprising certain electroactive species (e.g., certain optionally-substituted quinones or polymer-derivatives thereof) that can access states generated by the electrochemical potential capable of reacting with the target gas but incapable of reacting with potentially interfering species, such as oxygen gas. Reactions between the electroactive species and oxygen gas may be reduced or avoided by careful selection of the electroactive species (e.g., choosing electroactive species having a reduced state capable of bonding with the target gas, but for which a reaction with oxygen gas is thermodynamically unfavorable). Certain other aspects relate to methods of gas flow during capture and release processes, as well as gas separation systems capable of capturing target gas with high productivity even with low-concentration gas mixtures.

Target gas capture, including from low-concentration target gas streams can be valuable but difficult to perform inexpensively and without using energy-intensive methods. Existing conventional methods and systems have many disadvantages, including high energy requirements and waste. Furthermore, conventional thermal methods to capture target gases (e.g., carbon dioxide) often fail to meet the ever-stricter efficiency and capacity criteria set by regulatory agencies.

As a particular example regarding removal of carbon dioxide gas, while most such applications target streams of high $CO_2$ concentrations (3%-15%) from industrial, power generation and other such point sources, it can be desirable to remove $CO_2$ from enclosed spaces for ventilation purposes in buildings and car cabins, or for cabin environmental control systems on board spacecraft and submarines, where the maximum allowed $CO_2$ concentration in habitable spaces is 5,000 ppm (or 0.5%). However, the low concentration of $CO_2$ in such applications poses challenges, potentially due to low driving forces and large quantities of other species present in air in addition to $CO_2$. Such concerns are also prevalent in the direct air capture of $CO_2$ from the atmosphere at concentrations of about 400 ppm, which could warrant consideration as a long-term mitigation strategy.

Particularly regarding electrochemical $CO_2$ capture (though relevant to other target gases), the electrochemistry of $O_2$ can play an important role in the electrochemically-mediated separation of target $CO_2$, particularly in gas mixtures having a relatively high oxygen concentration and/or a relatively low $CO_2$ concentration (e.g., ventilated air applications, direct air capture applications, etc.). Certain electroactive species that may be suitable for reacting with $CO_2$ when in a reduced state may also be capable of reacting with $O_2$. As a non-limiting example, quinones typically undergo two consecutive one-electron reductions in aprotic electrolyte solutions (e.g., conductive liquids), and, the two reduced states have been observed to effectively complex with $CO_2$. It has been discovered in the context of the present disclosure that the standard reduction potential to activate the quinones is an important parameter to identify suitable redox-active molecules for electrochemical $CO_2$ separations. In aprotic electrolyte solutions, the one-electron reduction of dissolved $O_2$ gas yields stable superoxide ion ($O_2^-$), which can be an effective nucleophile. Superoxide ion undergoes nucleophilic addition to carbonyl atoms that are bonded to electron-withdrawing leaving groups, such as acid anhydride and esters. Previous studies demonstrate that the superoxide ion is reactive toward $CO_2$ in aprotic electrolyte solutions to the anion radical intermediate, $CO_4^{-\cdot}$, which subsequently forms peroxodicarbonate, $C_2O_6^{2-}$. In addition, it has been observed in the context of the present disclosure that the use of common alkyl carbonate electrolytes such as propylene carbonate and ethylene carbonate is not recommended when the superoxide ion is generated in any electrochemical processes. Therefore, the standard reduction potential for one-electron reduction of $O_2$ is an important parameter to assist in identifying suitable redox-active molecules for electrochemical $CO_2$ separations. Furthermore, chemical oxidation of the electrochemically reduced (activated) electrodes by oxygen molecules can generate a charge imbalance in the electrochemical cell. In some cases, this charge imbalance can render target gas-capturing electrodes inactive towards the target gas.

Certain methods and electrochemical cells that leverage these insights have been developed and are generally described herein. In some cases, the methods and electrochemical cells and systems relate to Electro-Swing Adsorption (ESA) processes, which can in some cases remove target gases from gas mixtures while removing little to none of any oxygen gas present.

In some aspects, electrochemical cells are described. FIG. 1A depicts a schematic diagram of an exemplary electrochemical cell 100, comprising a negative electrode 110 and positive electrode 120. In certain cases, the electrochemical cell is suitable for reacting with target gases from gas mixtures in any of a variety of applications including at least partially separating a target gas mixtures having relatively low concentrations of the target gas (e.g., ambient air, ventilated air, etc.). The term "electrochemical cell," as used herein refers to an apparatus in which redox half reactions take place at negative and positive electrodes. The term "electrochemical cell" is intended to include apparatuses that meet these criteria even where the behavior of the cell could arguably be characterized as more pseudocapacitive than Faradaic and thus might otherwise be referred to as a type of capacitor.

As mentioned above, in some embodiments, the electrochemical cell comprises a negative electrode. As used herein, a negative electrode of an electrochemical cell refers to an electrode into which electrons are injected during a charging process. For example, referring to FIG. 1A, when electrochemical cell 100 is charged (e.g., via the application of a potential by an external power source), electrons pass through an external circuit (not shown) and into negative electrode 110. As such, in some cases, species associated with the negative electrode can be reduced to a reduced state (a state having an increased number of electrons) during a charging process of the electrochemical cell.

The electrochemical cell may also comprise a positive electrode. As used herein, a positive electrode of an electrochemical cell refers to an electrode from which electrons are removed during a charging process. For example, referring again to FIG. 1A, when electrochemical cell 100 is charged (e.g., via the application of a potential by an external power source), electrons pass from positive electrode 120 and into an external circuit (not shown). As such, in some cases, species associated with the positive electrode can be oxidized to an oxidized state (a state having a decreased number of electrons) during a charging process of the electrochemical cell.

In some embodiments, the negative electrode comprises a first electroactive species. As used herein, an electroactive species generally refers to an agent (e.g., chemical entity) which undergoes oxidation or reduction upon exposure to an electrical potential in an electrochemical cell. It should be understood that when an electrode comprises an electroactive species, the electroactive species may be located at a surface of the electrode, in at least a portion of the interior of the electrode (e.g., in pores of the electrode), or both. For example, in some embodiments, negative electrode 110 in FIG. 1 comprises a first electroactive species. The first electroactive species may be on or near surface negative electrode 110, the first electroactive species may be in the interior of at least a portion of negative electrode 110, or a combination of the both.

In some embodiments, the first electroactive species is immobilized on the negative electrode. Such embodiments may be distinguished from those of other systems, in which the electroactive species are free to be transported from one electrode to another via, for example, advection. As is generally understood, a species immobilized on an electrode (e.g., the negative electrode) is one that, under a given set of conditions, is not capable of freely diffusing away from or dissociating from the electrode. The electroactive species can be immobilized on an electrode in a variety of ways. For example, in some cases, an electroactive species can be immobilized on an electrode by being bound (e.g., via covalent bonds, ionic bonds, and/or intramolecular interaction such as electrostatic forces, van der Waals forces, hydrogen bonding, etc.) to a surface of the electrode or a species or material attached to the electrode. In some embodiments, the electroactive species can be immobilized on an electrode by being adsorbed onto the electrode. In some cases, the electroactive species can be immobilized on an electrode by being polymerized onto the electrode. In certain cases, the electroactive species can be immobilized on an electrode by being included in a composition (e.g., a coating, a composite layer, etc.) that is applied or deposited onto the electrode. In certain cases, the electroactive species (e.g., polymeric or molecular electroactive material) infiltrates a microfiber or, nanofiber, or carbon nanotube mat, such that the electroactive material is immobilized with respect to the mat. The mat may provide an enhanced as surface area enhancement for electrolyte and gas access, as well as expanded network for electrical conductivity. In some embodiments, the electroactive species is part of a gel composition associated with the electrode (e.g., as a layer deposited on the electrode, as a composition infiltrating pores of the electrode, or as a composition at least partially encapsulating components of the electrode such as fibers or nanotubes of the electrode). Such a gel comprising the electroactive species (e.g., a hydrogel, ionogel, organogel, etc.) may be prepared prior to association with the electrode (e.g., applied as a coating to form a layer), or the gel may be prepared in the presence of the electrode by contacting the electrode (e.g., via coating or submersion) with a gel precursor (e.g., a pre-polymer solution comprising the electroactive species) and gel formation may then be initiated (e.g., via cross-linking via introduction of a crosslinking agent, a radical initiator, heating, and/or irradiation with electromagnetic radiation (e.g., ultraviolet radiation)).

In some embodiments described in more detail below, the negative electrode comprises an electroactive composite layer comprising an immobilized polymeric composite of the electroactive and another material (e.g., a carbonaceous material). For example, in some embodiments the electroactive composite layer comprises a composite of a polymer comprising the first electroactive species (e.g., a redox-active polymer having a reduction potential in the ranges described below) and carbon nanotubes (CNT).

The first electroactive species may have an oxidized state (having fewer electrons than the reduced state) and at least one reduced state (having more electrons than the oxidized state). As a non-limiting example, if the first electroactive species is benzoquinone, the neutral benzoquinone would be considered the oxidized state, the semiquinone (product of the addition of one electron to neutral benzoquinone) would be considered one reduced state, and the benzoquinone dianion (the product of the addition of one electron to neutral benzoquinone) would be considered another reduced state.

In some embodiments, the first electroactive species has at least one reduced state in which the species is capable of bonding with the target gas (e.g. $CO_2$). A species being capable of bonding with a target gas generally refers to an ability for the species to undergo a bonding reaction with the target gas to a significant enough extent and at a rate significant enough for a useful gas separation process to occur. For example, a species capable of bonding with a target gas may having a binding constant with the target gas of greater than or equal to $10^1$ $M^{-1}$, greater than or equal to $10^2$ $M^{-1}$, and/or up to $10^3$ $M^{-1}$, or higher at room temperature (23° C.). A species capable of bonding with a target gas may be able to bond with the target gas on a timescale of on the order of minutes, on the order of seconds, on the order of milliseconds, or as low as on the order of microseconds or less. A species may be capable of bonding with a target gas at at least one temperature (e.g., at least one temperature greater than or equal to 223 K and less than or equal to 573K, such as at 298 K). In some embodiments, the species is capable of bonding with a target gas at a first temperature but bonding with the target gas at a second temperature is thermodynamically and/or kinetically unfavorable. Such a temperature dependence may be based on a temperature dependence of a change in Gibbs free energy between the species (e.g., reduced quinone) and the target gas (e.g., carbon dioxide). With the insight and guidance of this disclosure, one of ordinary skill in the art would be able to select an appropriate temperature for promoting bonding between the species in its at least one reduced state and the target gas.

In some embodiments, the first electroactive species has an oxidized state in which it is capable of releasing bonded target gas. The first electroactive species may be chosen such that in at least one reduced state it has a strong affinity for the intended target gas for the particular application for which it is intended. For example, in some embodiments, where $CO_2$ is the target gas, the chosen first electroactive species may have a binding constant with carbon dioxide of $10^1$ to $10^3$ $M^{-1}$. In some embodiments, the chosen electroactive species may have a binding constant with a different target gas of $10^1$ to $10^3$ $M^{-1}$. It has been observed that some quinones can be used as suitable electroactive species. In some embodiments, in the presence of $CO_2$, an optionally-substituted quinone may be reduced to its semiquinone or dianion (e.g., in a single step or multiple steps), which then binds to $CO_2$ forming a complex. Other electroactive species that can form a covalent bond with $CO_2$, to form a carboxylate moiety, upon reduction may also be used.

In some embodiments, the first electroactive species has at least one reduced state in which the species is capable of bonding with the target gas, but for which there is at least one temperature (e.g., 298 K) at which it is thermodynamically unfavorable for the species to react with oxygen ($O_2$). In certain cases, the first electroactive species has at least one reduced state in which the species is capable of bonding with the target gas, but for which there is at least one temperature (e.g., 298 K) at which it is kinetically unfavorable for the species to react with oxygen ($O_2$) because a rate constant for the reaction is too low for a reaction to occur on a timescale commensurate with the gas capture, such as microseconds, milliseconds, seconds, or minutes). As mentioned above, an ability for an electroactive species to react with the target gas but not with oxygen (at least in a thermodynamically and/or kinetically favorable manner) can be useful in certain applications in which a relatively high amount of oxygen is present in a gas mixture to be separated or when the target gas is present in a relatively low amount (thereby having to compete with oxygen gas to react with the at least one reduced state, if the oxygen is present). In some embodiments, the first electroactive species has at least one reduced state in which the species is capable of bonding with the target gas, but for which a reaction it is thermodynamically unfavorable for the species to react with oxygen ($O_2$) at at least one temperature in a range of greater than or equal to 223 K, greater than or equal to 248 K, greater than or equal to 273 K, greater than or equal to 298 K, and/or up to 323 K, up to 348 K, up to 373 K, up to 398 K, up to 423 K, up to 448 K, up to 473 K, up to 498 K, up to 523 K, up to 548 K, up to 573 K, or higher. In some embodiments, the first electroactive species has at least one reduced state in which the species is capable of bonding with the target gas, but for which a reaction it is thermodynamically unfavorable for the species to react with oxygen ($O_2$) at a temperature of 298 K. It should be understood that a reaction being thermodynamically unfavorable at a given temperature, as used herein, refers to the reaction having a positive change in Gibbs free energy ($\Delta G_{rxn}$) at that temperature. For example, the reaction between the species in the at least one reduced state and oxygen gas may have a change in Gibbs free energy ($\Delta G_{rxn}$) of greater than 0 kcal/mol, greater than or equal to +0.1 kcal/mol, greater than or equal to +0.5 kcal/mol, greater than or equal to +1 kcal/mol, greater than or equal to +2 kcal/mol, greater than or equal to +3 kcal/mol, greater than or equal to +5 kcal/mol, and/or up to +8 kcal/mol, up to +10 kcal/mol, up to +20 kcal/mol, or more at at least one temperature in a range of greater than or equal to 223 K, greater than or equal to 248 K, greater than or equal to 273 K, greater than or equal to 298 K, and/or up to 323 K, up to 348 K, up to 373 K, up to 398 K, up to 423 K, up to 448 K, up to 473 K, up to 498 K, up to 523 K, up to 548 K, up to 573 K, or higher. In some embodiments, the reaction between the species in the at least one reduced state and oxygen gas has a change in Gibbs free energy ($\Delta G_{rxn}$) of greater than 0 kcal/mol, greater than or equal to +0.1 kcal/mol, greater than or equal to +0.5 kcal/mol, greater than or equal to +1 kcal/mol, greater than or equal to +2 kcal/mol, greater than or equal to +3 kcal/mol, greater than or equal to +5 kcal/mol, and/or up to +8 kcal/mol, up to +10 kcal/mol, up to +20 kcal/mol, or more at a temperature of 298 K.

It is been discovered, in the context of the present disclosure, that some electroactive species capable of bonding to a target gas may nevertheless also be reactive towards oxygen or its reduction products (e.g., superoxide ion, peroxide dianion, etc.). In some such cases, reactivity with oxygen or its reduction products is deleterious to a gas separation process. For example, reactivity with oxygen may reduce the efficiency with which the target gases captured, or the superoxide ion or peroxide ion may have deleterious reactivity toward components of electrochemical cell (e.g., the electroactive species, the target gas, the separator, the conductive liquid when present, etc.). However, it is been discovered in the context of the present disclosure that some particular electroactive species may have at least one reduced state capable of bonding to the target gas, but for which a reaction with oxygen ($O_2$) is thermodynamically and/or kinetically unfavorable. Examples and selection criteria for some such electroactive species are described in more detail below.

In some embodiments, the standard reduction potential for the generation of at least one reduced state of the first electroactive species in a conductive liquid is more positive than is the standard reduction potential for the interconversion between oxygen gas ($O_2$) and superoxide ion ($O_2^-$). Having such a standard reduction potential may contribute to the species in the at least one reduced state being able to bond to a target gas while also being thermodynamically disfavored to react with oxygen gas. As an example, in a conductive liquid of 0.1 M n-tetrabutylammonium hexafluorophosphate in dimethylformamide (DMF) at room temperature, the ($O_2/O_2^-$) redox couple may have a standard reduction potential of −1.35 V vs. a given reference. Therefore, any suitable electroactive species having a standard reduction potential that is more positive than −1.35 V vs. that given reference in that conductive liquid at room temperature would be said to have at least one reduced state that is more positive than the standard reduction potential for the interconversion between oxygen gas ($O_2$) and superoxide ion ($O_2^-$). In some embodiments, a standard reduction potential for the interconversion between the oxidized state and the at least one reduced state of the first electroactive species in the conductive liquid is more positive than is the standard reduction potential for the interconversion superoxide ($O_2^-$) and peroxide ($O_2^{2-}$).

One of ordinary skill in the art, with the benefit of this disclosure, would be able to determine the standard reduction potential for an electroactive species in a given conductive liquid. For example, one could use cyclic voltammetry, linear sweep voltammetry, or any other suitable electrochemical technique to measure the standard reduction potential. In some cases in which, for example, a cyclic voltammetry wave is irreversible for the electroactive species, the standard reduction potential may be approximated using any suitable technique known to one or ordinary skill in the art, such as the peak potential. The standard reduction potential may depend on the temperature at which it is measured. In some embodiments, the standard reduction potential is measured at any of the temperatures mentioned above, such as at 298 K.

In some embodiments, the standard reduction potential for the generation of at least one reduced state of the first electroactive species in a conductive liquid is at least 5 mV, at least 10 mV, at least 20 mV, at least 50 mV, at least 100 mV, at least 200 mV, at least 400 mV, or more positive than the standard reduction potential for the interconversion between oxygen gas ($O_2$) and superoxide ion ($O_2^-$). As an example, if the interconversion of oxygen gas and superoxide ion in a conductive liquid is −1.35 V vs. a given reference and an electroactive species has a standard reduction potential for the generation of a reduced state of the species of −1.00 V vs. that given reference, then that electroactive species has a standard reduction potential for the generation of that reduced state that is 350 mV more positive than the standard reduction potential for the interconversion between oxygen gas ($O_2$) and superoxide ion ($O_2^-$). In some embodiments, the standard reduction potential for the generation of at least one reduced state of the first electroactive species in a conductive liquid is less than or equal to 1 V, less than or equal to 900 mV, less than or equal to 800 mV, less than or equal to 600 mV, or less than or equal to 500 mV positive than the standard reduction potential for the interconversion between oxygen gas ($O_2$) and superoxide ion ($O_2^-$).

In some embodiments, the standard reduction potential for the generation of at least one reduced state of the first electroactive species in a conductive liquid is at least 5 mV, at least 10 mV, at least 20 mV, at least 50 mV, at least 100 mV, at least 200 mV, at least 400 mV, or more positive than is the standard reduction potential for the interconversion between superoxide ion ($O_2^-$) and peroxide dianion ($O_2^{2-}$). In some embodiments, the standard reduction potential for the generation of at least one reduced state of the first electroactive species in a conductive liquid is less than or equal to 1 V, less than or equal to 900 mV, less than or equal to 800 mV, less than or equal to 600 mV, or less than or equal to 500 mV positive than the standard reduction potential for the interconversion between superoxide ion ($O_2^-$) and peroxide dianion ($O_2^{2-}$).

The first electroactive species may be of any suitable form, provided that it satisfies at least one of the criteria required herein. In some embodiments, the first electroactive species is or comprises a molecular species. For example, the first electroactive species may be or comprise an organic molecule. The first electroactive species may comprise one or more functional groups capable of binding to a target gas and a gas mixture (e.g., when the electroactive species is in a reduced state). The functional groups may include, for example, a carbonyl group. In some embodiments, the first electroactive species is part of a polymer, such as a redox-active polymer. The first electroactive species may be part of a polymeric material immobilized on the negative electrode. For example, referring to FIG. 1A, the first electroactive species may be part of a polymeric material immobilized on negative electrode 110 of electrochemical cell 100.

In some embodiments, the first electroactive species is or comprises an optionally-substituted quinone (i.e., the quinone may comprise functional groups and/or other moieties or linkages bonded to the main structure of the quinone). In certain cases, the first electroactive to species is or comprises a redox-active polymer comprising an optionally-substituted quinone. The choice of substituent (e.g., functional groups) on the optionally-substituted quinone may depend on any of a variety of factors, including but not limited to its effect on the standard reduction potential of the optionally-substituted quinone. One of ordinary skill, with the benefit of this disclosure, would understand how to determine which substituents or combinations of substituents on the optionally-substituted quinone are suitable for the first electroactive species based on, for example synthetic feasibility and resulting standard reduction potential. Exemplary functional groups with which the optionally-substituted quinone may be functionalized include, but are not limited to, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl, ethyl ester, etc.), amino, amido, quaternary ammonium (e.g., tetraalkylamino), branched or unbranched alkyl (e.g., C1-C18 alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, and/or carbonyl groups, any of which is optionally-substituted.

The optionally-substituted quinone of the first electroactive species may comprise one or more of structures chosen from formula (IA) and (IB):

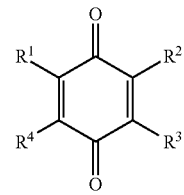

(IA)

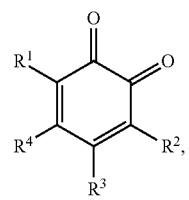

(IB)

wherein $R^1$, $R^2$, $R^3$, and $R^4$ can be the same or different, and can be hydrogen, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl, ethyl ester, etc.), amino, amido, quaternary ammonium (e.g., tetraalkylamino), branched or unbranched alkyl (e.g., C1-C18 alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, and/or carbonyl groups, any of which is optionally-substituted, and/or any two adjacent groups of $R^1$-$R^4$ can be joined together to form an optionally-substituted ring.

In some embodiments, the optionally-substituted quinone is or comprises an optionally-substituted naphthquinone. In certain cases, the optionally-substituted quinone is or comprises an optionally-substituted anthraquinone. In some embodiments, the optionally-substituted quinone is or comprises an optionally-substituted phenanthrenequinone (also referred to as an optionally-substituted phenanthrenedione). The substituents (e.g., functional groups) may be any of those listed above.

In some embodiments, the electroactive species is or comprises one or more of the following: phenanthrenequinone ester (PQ-ester), iodo-phenanthrenequinone (PQ-I), di-iodo-phenanthrenequinone (PQ-$I_2$), phenanthrenequinone (PQ), ortho-naphthquinone (o-NQ), dimethyl-para-naphthquinone (p-NQ-$Me_2$), para-naphthquinone (p-NQ), di-tert-butyl-benzoquinone (TBQ), and benzoquinone (BQ), the structures of which are shown below:

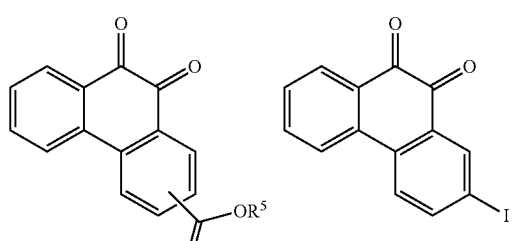

PQ-ester

PQ-I

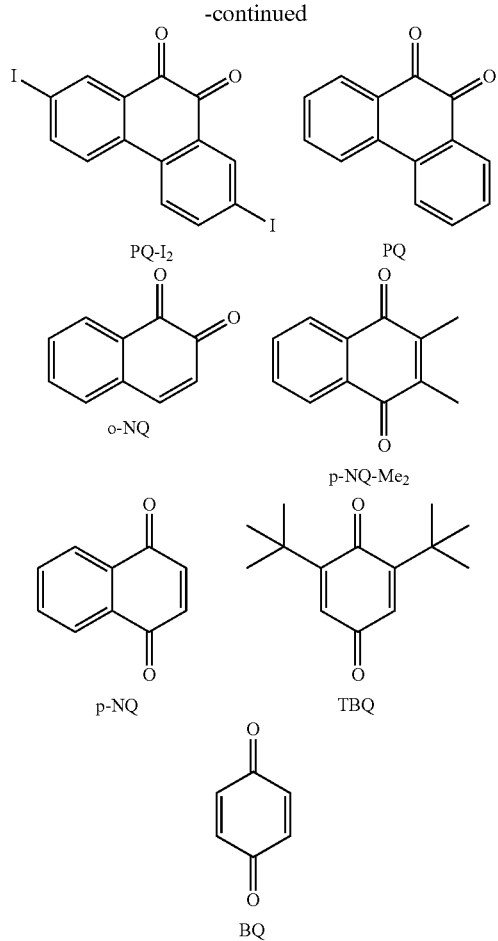

wherein R⁵ is optionally-substituted branched or unbranched C1-C18 alkyl (e.g., methyl, ethyl, propyl, butyl, etc.).

In some cases, other regio-isomers of the above non-limiting examples of electroactive species are suitable as well (e.g., with substituents at different locations of the quinone).

As mentioned above, the first electroactive species may be part of a redox-active polymer. In some cases, any of the optionally-substituted quinones described herein may be part of the redox-active polymer. In some such cases, at least a portion of the redox-active polymer comprises a backbone chain and one or more of the optionally-substituted quinones covalently bonded to the backbone chain. A backbone chain generally refers to the longest series of covalently bonded atoms that together create a continuous chain of the polymer molecule. In certain other cases, the optionally-substituted quinones described herein may be part of the backbone chain of the redox-active polymer.

The electroactive species (e.g., first electroactive species) may comprise cross-linked polymeric materials. For example, in some embodiments, the electroactive species comprises or is incorporated into hydrogels, ionogels, organogels, or combinations thereof. Such cross-linked polymeric materials are generally known in the art, and may in some instances comprise electroactive species described herein as part of the three-dimensional structure (e.g., via covalent bonds). However, in some embodiments, electroactive species are incorporated into the cross-linked polymeric materials via adsorption (e.g., physisorption and/or chemisorption). In some embodiments, the electroactive species comprises an extended network. For example, the electroactive species may comprise a metal organic framework (MOF) or a covalent organic framework (COF). In some embodiments, the electroactive species comprises functionalized carbonaceous materials. For example, the electroactive species may comprise functionalized graphene, functionalized carbon nanotubes, functionalized carbon nanoribbons, edge-functionalized graphite, or combinations thereof.

In some embodiments, a separator is between the negative electrode and the positive electrode. For example, referring to FIG. 1B, separator 130 is between negative electrode 110 and positive electrode 120. The separator may serve as a protective layer that can prevent the respective electrochemical reactions at each electrode from interfering with each other. The separator may also help electronically isolate the negative and positive electrodes from one another and/or other components within the electrochemical cell to prevent short-circuiting. A person of ordinary skill, with the benefit of this disclosure, will be able to select a suitable separator. The separator may comprise a porous structure. In some instances, the separator is or comprises a porous solid material. In some embodiments, the separator is or comprises a membrane. The membrane of the separator may be made of suitable material. For example, the membrane of the separator may be or comprise a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein. The material for the separator may comprise a cellulose membrane, a polymeric material, or a polymeric-ceramic composite material. Further examples of separators include polyvinylidene difluoride (PVDF) separators, PVDF-Alumina separators, or Celgard.

In some embodiments, the electrochemical cell comprises one or more separators containing or capable of containing a conductive liquid (e.g., ionic liquid). As an example, referring to FIG. 1B, separator 130 of the electrochemical cell 100 may contain or be capable of containing a conductive liquid. A conductive liquid generally refers to a liquid having a relatively high electrical conductivity at room temperature (23° C.). The conductive liquid may have a sufficiently high electrical conductivity to facilitate electrochemical reactions in an electrochemical circuit involving the negative electrode and the positive electrode. The conductive liquid is generally ionically conductive, in that it can facilitate the transport of ions. However, the conductive liquid generally has a relatively low electronic conductivity (e.g., conductivity due to the motion of electronic charge such as via electrons or holes) to prevent short-circuiting of the electrochemical cell.

In some cases, a separator containing the conductive liquid is at least partially (or completely) impregnated with the conductive liquid. For example, the separator may absorb an amount of the conductive liquid upon being submerged, coated, dipped, or otherwise associated with the conductive liquid. In some such cases where the separator is porous, some or all of the pores of the separator (in the interior and/or near the surface of the separator) may become at least partially filled with the conductive liquid. In some embodiments, the separator is saturated with the conductive liquid. A separator being saturated with a conductive liquid generally refers to the separator containing the maximum amount of conductive liquid capable of being contained within the volume of that separator at room temperature (23° C.) and ambient pressure. In some embodiments, the electrochemical cell may be provided without the conductive liquid present in the separator, but with the separator capable of containing the conductive liquid when it is put into operation to perform a gas separation process. One way in which the separator may be capable of containing the conductive liquid is by having a relatively high porosity and/or containing materials capable of absorbing and/or being wetted by the conductive liquid.

In some embodiments the conductive liquid comprises an ionic liquid, for example, a room temperature ionic liquid ("RTIL"). The RTIL electrolyte may have a low volatility (i.e., a room temperature vapor pressure of less than $10^{-5}$ Pa, for example, from $10^{-10}$ to $10^{-5}$ Pa), thereby reducing the risk of electrodes drying, and allowing for flow of gas past the electrodes without significant loss to evaporation or entrainment. In some embodiments, the ionic liquid makes up substantially all (e.g., at least 80 vol %, at least 90 vol %, at least 95 vol %, at least 98 vol %, at least 99 vol %, at least 99.9 vol %) of the conductive liquid.

The ionic liquid may comprise an anion component and a cation component. The anion of the ionic liquid may comprise, without limitation: halide, sulfate, sulfonate, carbonate, bicarbonate, phosphate, nitrate, nitrate, acetate, $PF_6^-$, $BF_4^-$, triflate, nonaflate, bis(triflyl)amide, trifluoroacetate, heptaflurorobutanoate, haloaluminate, triazolide, and amino acid derivatives (e.g. proline with the proton on the nitrogen removed). The cation of the ionic liquid may comprise, without limitation: imidazolium, pyridinium, pyrrolidinium, phosphonium, ammonium, sulfonium, thiazolium, pyrazolium, piperidinium, triazolium, pyrazolium, oxazolium, guanadinium, and dialkylmorpholinium. In some embodiments, the room temperature ionic liquid comprises an imidazolium as a cation component. As one example, in some embodiments, the room temperature ionic liquid comprises 1-butyl-3-methylimidazolium ("Bmim") as a cation component. In some embodiments, the room temperature ionic liquid comprises bis(trifluoromethylsulfonyl)imide ("TF$_2$N") as an anion component. In some embodiments, the room temperature ionic liquid comprises 1-butyl-3-methylimidazolium bis(trifluoromethylsulfonyl)imide ([Bmim][TF$_2$N]), represented by the following formula (IIA):

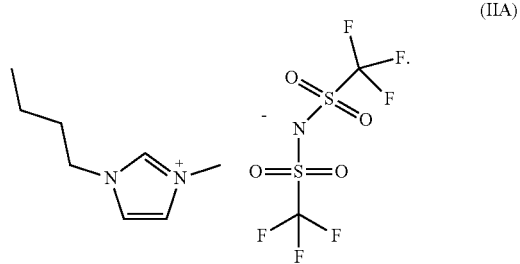

(IIA)

In some embodiments, the room temperature ionic liquid comprises 1-butyl-3-methylimidazolium tetrafluoroborate (BF$_4$) ([Bmim][BF$_4$]), represented by the following formula (IIB):

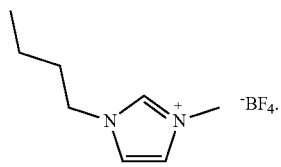

(IIB)

In some embodiments, the conductive liquid comprises a low-volatility electrolyte solution. For example, the conductive liquid may comprise a liquid solvent having a relatively high boiling point and dissolved ionic species therein (e.g., dissolved supporting electrolyte ions). The liquid solvent having a relatively high boiling point may be non-aqueous. For example, the liquid solvent may comprise N,N-dimethylformamide (DMF) or the like.

Turning to the positive electrode, in some embodiments, the positive electrode comprises a second electroactive species. The second electroactive species may be a different composition than the first electroactive species of the negative electrode, though it some embodiments the second electroactive species is the same as the first electroactive species. In some embodiments the positive electrode comprises an electroactive layer (sometimes referred to as a complementary electroactive layer) comprising the second electroactive species. The complementary electroactive layer may be in the form of a composite, and as such, may be a complementary electroactive composite layer. In operation, this second electroactive species may serve as a source of electrons for the reduction of the first electroactive species present in the negative electrode. Likewise, the second electroactive species may serve as a sink for electrons during the oxidation of the first electroactive species. It is in this manner that the electroactive layer of the positive electrode may be described as "complementary." The second electroactive species may comprise, for example, a redox-active polymer. In some embodiments, the redox-active polymer is or comprises a polymer comprising ferrocene (e.g., as moieties bonded to the polymer backbone). In some embodiments, second electroactive species comprises a metallocene (e.g., ferrocene). In some such cases, the second electroactive species comprises a redox-active polymer comprising a metallocene. As one non-limiting embodiment, the redox-active polymer comprises polyvinyl ferrocene. As another example, the second electroactive species may comprise a polymer comprising a thiophene. In some such cases, the second electroactive species comprises poly(3-(4-fluorophenyl)thiophene). In some embodiments, the second electroactive species comprises phenothiazine. As another example, in some embodiments, the second electroactive species comprises (2,2,6,6-tetramethylpiperidin-1-yl)oxyl (referred to as "TEMPO"), or derivatives thereof (e.g., comprising optional substituents). In certain cases, the second electroactive species comprises a Faradaic redox species having a standard reduction potential at least 0.5 volts (V), at least 0.6 V, at least 0.8 V, and/or up to 1.0 V, up to 1.5 V, or more positive than the first reduction potential of the first electroactive species.

As with the primary electroactive composite layer of the negative electrode, the complementary electroactive composite layer of the positive electrode may comprise an immobilized polymeric composite of an electroactive species and of another material (e.g., a carbonaceous material). Examples of the carbonaceous material include carbon nanotube (e.g., single-walled carbon nanotube, multiwalled-carbon nanotube), carbon black, KetjenBlack, carbon black Super P, or graphene. Other materials are also possible. In certain cases, the second electroactive species can be immobilized on a positive electrode by being included in a composition (e.g., a coating, a composite layer, etc.) that is applied or deposited onto the positive electrode. In certain cases, the second electroactive species (e.g., polymeric or molecular electroactive material) infiltrates a microfiber, nanofiber, or carbon nanotube mat associated with the positive electrode, such that the second electroactive species is immobilized with respect to the mat of the positive electrode. The second electroactive species may also be part of a gel associated with the positive electrode in the same or similar manner as described above with respect to the first electroactive species.

According to one or more embodiments, the electroactive composite layer of the positive electrode may have a particular ratio of weight of electroactive material to carbonaceous material. The ratio by weight may be chosen to facilitate a high electrical current per mass of electroactive material. In some embodiments, a ratio by weight of the mass of electroactive material to the mass of carbonaceous material for the complementary electroactive composite layer may be between 1 to 2 and 2 to 1. In some embodiments, it may be 1 to 1. Other ratios are also possible.

In some cases, one or more electrodes of the electrochemical cell comprises an electroactive composite layer. For example, in some embodiments, the negative electrode comprises an electroactive composite layer (e.g., a primary electroactive composite layer). Referring again to FIG. 1B, negative electrode 110 comprises composite electroactive composite layer 114 facing positive electrode 120, according to certain embodiments. In certain cases, the positive electrode comprises an electroactive composite layer (e.g., a complementary electroactive composite layer). For example, in FIG. 1B, negative electrode 120 comprises electroactive composite layer 124 facing negative electrode 110. The electroactive composite layer of the positive electrode may also be referred to as complementary electroactive composite layer, as the electroactive species within it serves as an electron sink or electron source for the electroactive material of the negative electrode. In some cases, the electroactive composite layer of an electrode (e.g., negative electrode, positive electrode) extends through the entire thickness dimension of an electrode. For example, the electroactive composite layer may intercalate through an entire thickness of an electrode. However, in some embodiments, the electroactive composite layer of an electrode does not extend through the entire thickness dimension of an electrode. In some such cases, the electroactive composite layer intercalates through some of but not the entire thickness of the electrode. In certain cases, the electroactive composite layer is a coating on the surface of another component of the electrode (e.g., a current collector, a gas permeable layer, etc.).

In some embodiments, the electroactive species of an electrode (e.g., the first electroactive species of the negative electrode, the second electroactive species of the positive electrode), are part of an electroactive composite layer. For example, in FIG. 1B, electroactive composite layer 114 comprises the first electroactive species described herein, according to some embodiments. Similarly, in some embodiments, electroactive composite layer 124 comprises the second electroactive species (e.g., polyvinylferrocene).

In addition to the electroactive species, the electroactive composite layer of the negative electrode may also comprise a carbonaceous material. Examples of suitable materials include, but are not limited to, carbon nanotube (e.g., single-walled carbon nanotube, multi-walled-carbon nanotube), carbon black, KetjenBlack, carbon black Super P, graphene, or combinations thereof. Other examples also include immobilizing and/or coating of the electroactive species (e.g., in polymeric or molecular forms or otherwise) into/onto a microfiber, nanofiber or carbon nanotube mat via intercalation, grafting, chemical vapor deposition (CVD), or otherwise.

According to one or more embodiments, the electroactive composite layer of the negative electrode may have a particular ratio of weight of electroactive species to carbonaceous material. The ratio by weight may be chosen to facilitate a high electronic current per mass of electroactive material. In some embodiments, a ratio by weight of the mass of electroactive material to the mass of carbonaceous material may be between 1 to 1 and 1 to 10. In some embodiments, it may be 1 to 3. Other ratios are also possible.

The negative electrode may further comprise a gas permeable layer. The gas permeable layer (which may also be referred to as a substrate layer) may be proximate to the electroactive composite layer, and facing outward from the electrochemical cell. In some embodiments, the gas permeable layer is in contact with the first electroactive species. In some such cases, the gas permeable layer is in direct contact with the first electroactive species, while in other such cases, the gas permeable layer is in indirect contact with the first electroactive species. It should be understood that when a portion (e.g., layer) is "on" or "in contact with" another portion, it can be directly on the portion, or an intervening portion (e.g., layer) also may be present (in which case the portion is understood to be "indirectly on" or "in indirect contact with" the other portion). A portion that is "directly on", "in direct contact with", another portion means that no intervening portion is present. It should also be understood that when a portion is referred to as being "on" or "in contact with" another portion, it may cover the entire portion or a part of the portion. In some embodiments, the gas permeable layer is in contact (e.g., in direct contact with or in indirect contact with) with the electroactive composite layer of the negative electrode.

A gas stream may diffuse through the gas permeable layer to come into contact with the electroactive composite layer. The gas permeable layer may comprise a conductive solid material and act as a current collector within the cell.

The gas permeable layer may comprise a porous material. In some embodiments, the gas permeable layer has a porosity, for example, of greater than or equal to 60%, greater than or equal to 70%, greater than or equal to the 75%, greater than or equal to 80%, or greater. In some embodiments, the gas permeable layer has a porosity of less than or equal to 85%, less than or equal to 90%, or more. Combinations of these ranges are possible. For example, in some embodiments, the gas permeable layer of the negative electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat. Other materials may also be used.

While in some embodiments the electrochemical cell comprises a single negative electrode, in other embodiments the electrochemical cell comprises more than one negative electrode. For example, in some embodiments, the negative electrode described herein is a first negative electrode, and the electrochemical cell comprises a second negative electrode. The positive electrode may be between the first negative electrode and the second negative electrode. The second negative electrode may also comprise the first electroactive species. The second negative electrode may be identical in configuration and composition to the first negative electrode. In some embodiments, the electrochemical cell comprises greater than or equal to 1 negative electrode, greater than or equal to 2 negative electrodes, greater than or equal to 3 negative electrodes, greater than or equal to 5 negative electrodes, greater than or equal to 10 negative electrodes, and/or up to 15 negative electrodes, up to 20 negative electrodes, up to 50 negative electrodes, or more.

While in some embodiments the electrochemical cell comprises a single separator (e.g., between the negative electrode and the positive electrode), in other embodiments the electrochemical cell comprises more than one separator. For example, in some embodiments, the separator described herein is a first separator, and the electrochemical cell comprises a second separator. In some embodiments in which a second negative electrode is present, the second separator may be between the positive electrode and the second negative electrode. The second separator may be identical in configuration and composition to the first separator. In certain cases, the second separator is capable of comprising (e.g., being saturated with) the conductive liquid. In some embodiments, the electrochemical cell comprises greater than or equal to 1 separator, greater than or equal to 2 separators, greater than or equal to 3 separators, greater than or equal to 5 separators, greater than or equal to 10 separators, and/or up to 15 separators, up to 20 separators, up to 50 separators, or more. In some cases, each of the separators is between a respective negative electrode and positive electrode.

In some embodiments of the electrochemical cell in which the positive electrode has a negative electrode on either side (e.g., a first negative electrode and a second negative electrode), the positive electrode comprises second electroactive species facing each of the negative electrodes. In some such embodiments, the positive electrode comprises two complementary electroactive composite layers, each facing one of the negative electrodes.

The positive electrode may further comprise a substrate layer positioned proximate to or between the electroactive composite layer or layers. The substrate layer may be in direct contact or in indirect contact with the electroactive composite layer or layers. The substrate layer of the positive electrode may comprise the same or different material as that of the substrate layer of the negative electrode (when present). For example, the substrate layer may comprise a material such as carbon paper (treated, TEFLON-treated, or untreated), carbon cloth, or nonwoven carbon mat. The substrate may comprise, in some embodiments, a mat comprising, for example carbon nanotubes, microfibers, nanofibers, or combinations thereof. Other materials are also possible. The substrate layer of the positive electrode may comprise a conductive material and act as a current collector within the cell. In some embodiments, the substrate comprises a metal and/or metal alloy. For example, the substrate may comprise a metal and/or metal alloy foil (e.g., having a relatively small thickness of less than or equal to 200 microns, less than or equal to 100 microns, less than or equal to 10 microns, and/or as low as 1 micron, or less). Examples of suitable foils could include, but are not limited to, aluminum foils, titanium foils. As a particular example, in some embodiments, the positive electrode comprises a substrate between a first complementary electroactive composite layer facing the first negative electrode and a second complementary electroactive composite layer facing the second negative electrode. In this context, an electroactive composite layer of the positive electrode can be facing a particular electrode (e.g., a negative electrode) if a line extending away from the bulk of the electroactive composite layer can intersect that electrode without passing through the substrate. An object (e.g., electroactive composite layer) can be facing another object when it is in contact with the other object, or when one or more intermediate materials are positioned between the surface and the other object. For example, two objects that are facing each other can be in contact or can include one or more intermediate materials (e.g., a separator) between them.

FIG. 2 depicts an example of an electrochemical cell, according to some, but not necessarily all embodiments, and having one or more of the components described above. Electrochemical cell 100 comprises a positive electrode 120 between two negative electrodes 110. Separators 130 separate the positive and negative electrodes 120 and 110. Each of the negative electrodes 110 comprises an optional gas permeable layer 112, which is positioned away from the center of the cell 100, and an optional primary electroactive composite layer 114, which faces toward the positive electrode 120. In some embodiments, positive electrode 120 comprises substrate layer 122 and two complementary electroactive composite layers 124 thereon. The different components of the electrochemical cell 100 may have certain properties described throughout this disclosure, for example, comprising the electrode materials (e.g., electroactive species) described above. The configuration of two outwardly-facing negative electrodes 110, as shown, for example, in FIG. 2, may, in some cases, provide the advantage of doubling the gas-adsorbing area exposed to the gas.

According to one or more embodiments, the target gas comprises a nucleophilic molecule. According to one or more embodiments, the target gas may comprise an aprotic acidic gas. According to one or more embodiments the target gas comprises a gas capable of forming a complex with the electroactive species of the negative electrode when the electroactive species is in its reduced state (e.g., by bonding to the species in its reduced state). According to one or more embodiments, the target gas comprises carbon dioxide ($CO_2$). According to one or more embodiments, the target gas comprises sulfur dioxide ($SO_2$). According to one or more embodiments the target gas comprises a borane ($BR_3$), wherein each R can be the same or different and is a suitable substituent (e.g., hydrogen, alkyl, aryl, etc., each optionally-substituted). In some embodiments, the target gas comprises one species (one type of molecule). In some embodiments, the target gas comprise more than one species (e.g., a first type of molecule and a second, different type of molecule). The potential window at which capture and release takes place may depend on the particular target gas of that embodiment, and hence enriching and stripping of the target gas may be controlled by applying the appropriate potential difference applied across the electrochemical cell.

In some embodiments, the gas mixture (e.g., input gas mixture) to be at least partially separated from the gas mixture by being exposed to the electrochemical cell is ambient air (e.g., air from an ambient environment such as outdoor air). Ambient air refers to generally refers to air found in unenclosed places, such as outdoors. In some such cases, the electrochemical cell is used for direct air capture. The systems and methods described herein may be a useful technique for removing a target gas such as carbon dioxide directly from ambient air (e.g., to reduce greenhouse gas levels), without needing to pre-concentrated the target gas. Certain aspects of the present disclosure may, in some cases, make the systems and methods described herein particularly useful for direct air capture (e.g., an ability to bond with a target gas while being thermodynamically disfavored from reacting with major components of ambient air, such as oxygen).

In some embodiments, the concentration of the target gas in the gas mixture is relatively low. One such case may be when the gas mixture is ambient air. In some embodiments, the concentration of the target gas in the gas mixture prior to exposure to the electrochemical cell is less than or equal to 500 ppm, less than or equal to 450 ppm, less than or equal to 400 ppm, less than or equal to 350 ppm, less than or equal to 300 ppm, less than or equal to 200 ppm, or less. In some embodiments, the concentration of the target gas in the gas mixture is as low as 100 ppm, as low as 50 ppm, as low as 10 ppm, or less. Combinations of these ranges are possible. For example, in some embodiments, the concentration of the target gas in the gas mixture is less than or equal to 500 ppm and as low as 10 ppm. In some embodiments in which the target gas is carbon dioxide, the concentration of the carbon dioxide in the gas mixture prior to exposure to the electrochemical cell is less than or equal to 500 ppm, less than or equal to 450 ppm, less than or equal to 350 ppm, or less. In some embodiments, the concentration of the carbon dioxide in the gas mixture prior to exposure to the electrochemical cell is greater than or equal to 300 ppm, greater than or equal to 350 ppm, or greater. Combinations of these ranges are possible. For example, in some embodiments, the concentration of carbon dioxide in the gas mixture prior to exposure to the electrochemical cell is greater than or equal to 300 ppm and less than or equal to 400 ppm, or greater than or equal to 300 ppm in less than or equal to 500 ppm.

In some embodiments, the gas mixture (e.g., input gas mixture) to be at least partially separated from the gas mixture by being exposed to the electrochemical cell is ventilated air. The ventilated air may be air in an enclosed or at least partially enclosed place (e.g., air being circulated in an enclosed place). Examples of places in which the gas mixture (e.g., ventilated air) may be located include, but are not limited to sealed buildings, partially ventilated places, car cabins, inhabited submersibles, air crafts, and the like.

The concentration of target gas in the ventilated air may be higher than ambient air but lower than concentrations typical for industrial processes. In some embodiments, the concentration of the target gas in the gas mixture prior to exposure to the electrochemical cell is less than or equal to 5,000 ppm, less than or equal to 4,000 ppm, less than or equal to 2,000 ppm, less than or equal to 1,000 ppm, or less. In some embodiments, the concentration of the target gas in the gas mixture (e.g., when it is ventilated air/air in enclosed spaces) is as low as 1,000 ppm, as low as 800 ppm, as low as 500 ppm, as low as 200 ppm, as low as 100 ppm, as low as 10 ppm, or less. Combinations of these ranges are possible. For example, in some embodiments, the concentration of the target gas in the gas mixture is less than or equal to 5,000 ppm and as low as 500 ppm. In some embodiments in which the target gas is carbon dioxide, the concentration of the carbon dioxide in the gas mixture prior to exposure to the electrochemical cell is less than or equal to 5,000 ppm, less than or equal to 4,000 ppm, less than or equal to 2,000 ppm, less than or equal to 1000 ppm, less than or equal to 500 ppm, or less. In some embodiments, the concentration of the carbon dioxide in the gas mixture prior to exposure to the electrochemical cell is greater than or equal to 10 ppm, greater than or equal to 100 ppm, greater than or equal to 300 ppm, greater than or equal to 500 ppm, greater than or equal to 1,000 ppm, greater than or equal to 2,000 ppm, or greater. Combinations of these ranges are possible. For example, in some embodiments, the concentration of carbon dioxide in the gas mixture prior to exposure to the electrochemical cell is greater than or equal to 500 ppm and less than or equal to 5,000 ppm, or greater than or equal to 10 ppm in less than or equal to 5,000 ppm.

In some embodiments, the gas mixture comprises oxygen gas ($O_2$). In some such embodiments include those where the gas mixture comprises ambient air or ventilated air, or even high purity oxygen gas mixtures. In some, but not necessarily all embodiments, the gas mixture has a relatively high concentration of oxygen gas (e.g., prior to exposure to the electrochemical cell). Certain aspects of the systems and methods described herein (e.g., the choice of particular electroactive species, methods of handling gases in the system, etc.) may contribute to an ability to capture target gases in gas mixtures in which oxygen gas is present without deleterious interference. In some embodiments, oxygen gas is present in the gas mixture (e.g., prior to exposure to the electrochemical cell) at a concentration of greater than or equal to 0 vol %, greater than or equal to 0.1 vol %, greater than or equal to 1 vol %, greater than or equal to 2 vol %, greater than or equal to 5 vol %, greater than or equal to 10 vol %, greater than or equal to 20 vol %, greater than or equal to 50 vol %, greater than or equal to 75 vol %, greater than or equal to 90 vol %, greater than or equal to 95 vol %, greater than or equal to 99 vol %, greater than or equal to 99.9 vol %, greater than or equal to 99.99 vol %, or higher. In some embodiments, oxygen gas is present in the gas mixture at a concentration of less than or equal to substantially 100 vol %, less than or equal to 99.9999 vol %, less than or equal to 99.999 vol %, less than or equal to 99.99 vol %, less than or equal to 99.9 vol %, less than or equal to 99.9 vol %, less than or equal to 99.9 vol %, less than or equal to 99 vol %, less than or equal to 95 vol %, less than or equal to 90 vol %, less than or equal to 75 vol %, less than or equal to 50 vol %, less than or equal to 25 vol %, less than or equal to 21 vol %) less than or equal to 10 vol %, less than or equal to 5 vol %, less than or equal to 2 vol %, or less. Combinations of these ranges are possible. For example, in some embodiments, oxygen gas is present in the gas mixture at a concentration of greater than or equal to 0 vol % and less than or equal to substantially 100 vol % (e.g., for specialized high $O_2$ combustion processes), greater than or equal to 0 vol %, and less than or equal to 50 vol %, greater than or equal to 0 vol % and less than or equal to 21 vol % (e.g., in incomplete combustion processes), and greater than or equal to 10 vol % and less than or equal to 25 vol % (e.g., for ventilated air or direct air capture processes).

In some embodiments, the gas mixture to undergo at least partial gas separation comprises water vapor. The gas mixture may comprise water vapor for example, because it is or comprises ambient air or ventilated air. In some cases, the gas mixture (e.g., prior to exposure to the electrochemical cell) has a relatively high relative humidity. For example, in some embodiments, the gas mixture has a relative humidity of greater than or equal to 0%, greater than or equal to 5%, greater than or equal to 10%, greater than or equal to 25%, greater than or equal to 50%, greater than or equal to 75%, greater than or equal to 90%, or higher at at least one temperature in the range of between $-50°$ C. and $100°$ C. In some embodiments, the gas mixture has a relative humidity of less than or equal to 100%, less than or equal to 95%, less than or equal to 90%, less than or equal to 75%, less than or equal to 50%, less than or equal to 25%, less than or equal to 10%, or less at at least one temperature in the range of between $-50°$ C. and $100°$ C.

The gas mixture (e.g., input gas mixture) to undergo at least partial separation from by being exposed to the electrochemical cell may have any of a variety of pressures when exposed to the electrochemical cell. For example, the gas mixture may have an overall pressure (e.g., in a gas separation system) of greater than or equal to 0.1 bar, greater than or equal to 0.2 bar, greater than or equal to 0.5 bar, greater than or equal to 1 bar, greater than or equal to 2 bar, and/or up to 5 bar, up to 8 bar, up to 10 bar, or higher. The gas mixture may have any of these pressure values while comprising the target gas and oxygen in any of the concentration ranges described above.

According to one or more embodiments, an electrochemical cell generally described herein may be operated to at least partially separate a gas mixture. In some embodiments, the gas mixture is a gas stream. In some embodiments, the gas mixture is air in a ventilated structure, while in certain cases, the air is ambient air (e.g., in direct air capture embodiments). However, the gas mixtures is not limited to such embodiments. For example, in some embodiments, a gas mixture is a gas from industrial process (e.g., flue gas). In some embodiments, the electrochemical cell may be operated to perform a gas separation process involving the gas mixture. For example the electrochemical cell may be operated to remove a portion of a target gas from a gas mixture. In some such cases, operation of the electrochemical cell involves exposing the gas mixture to the electrochemical cell. The gas mixture may be exposed to the electrochemical cell such that the target gas bonds to the first electroactive species to produce a treated gas mixture having a lower amount of the target gas than the gas mixture originally exposed to the electrochemical cell (sometimes referred to as "input gas mixture").

The process of at least partially separating the target gas from the gas mixture may comprise applying a potential difference across the electrochemical cell. One of ordinary skill, with the benefit of this disclosure, would understand how to apply a potential across the electrochemical cell. One way to apply the potential is by connecting the negative electrode and the positive electrode to a suitable power source capable of polarizing the negative and positive electrodes. In some embodiments, the power supply is DC voltage to a system. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell).

In some embodiments, the process further comprises exposing the electrochemical cell to the gas mixture. The potential difference may be applied during at least a portion of the time during which the gas mixtures exposed to the electrochemical cell. However, some embodiments comprise applying the potential difference prior to exposing the gas mixture to the electrochemical cell. In other words, in some embodiments, the step of exposing the gas pressure to the electrochemical cell occurs during the step of applying the potential difference across the electrochemical cell and/or after applying the potential difference across electrical cell. In some embodiments, exposing the gas mixture to the electrochemical cell comprises introducing a gas stream comprising the target gas (e.g. $CO_2$) to the electrochemical cell to bond the target gas to the first electroactive species to produce a treated gas mixture (e.g., a treated gas stream).

According to some embodiments, application of a positive voltage to the electrochemical cell, during a charging mode, causes a redox half reaction at the negative electrode in which the electroactive species is reduced. As discussed, herein, the electroactive species of the negative electrode is selected for the property of having a higher affinity for the target gas (e.g., $CO_2$) when it is in a reduced state relative to when it is in an oxidized state. By reducing the electroactive species and passing a gas mixture (e.g., ventilated air, ambient air, an industrial gas stream) across the face of the negative electrode, a target gas (e.g., $CO_2$) may bond to the electroactive species. In such a manner, the target gas may be removed from the gas mixture to provide a treated gas mixture (e.g., comprising a lower amount of the target gas than the gas mixture).

By way of a non-limiting example, in some embodiments in which the electroactive species of the negative electrode is an optionally-substituted quinone, the electroactive active species may be reduced to at least one of its reduced states according to the following reaction (1):

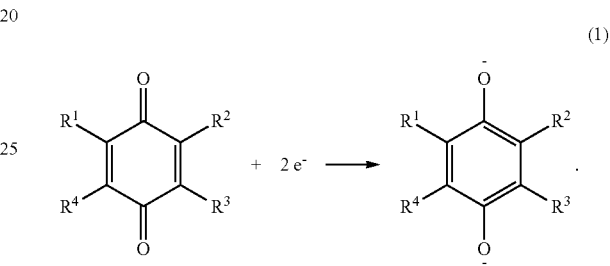

Again by way of non-limiting example, in some embodiments in which the electroactive active species is reduced in the presence of a target gas comprising carbon dioxide, the following reaction (2) takes place:

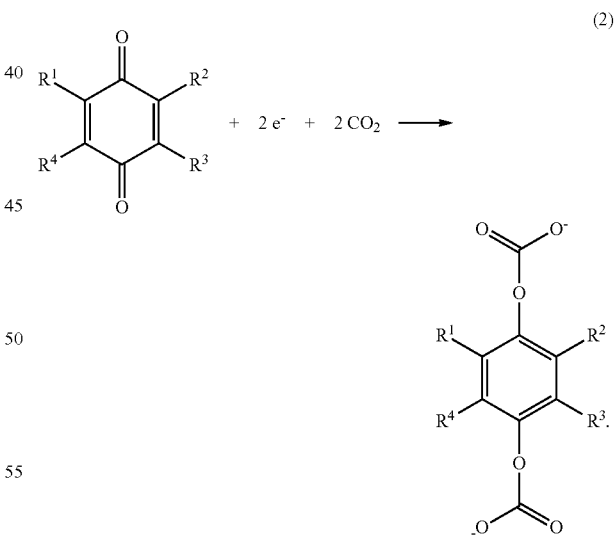

According to some embodiments, while the first electroactive species (e.g., an optionally-substituted quinone) is being reduced at the negative electrode, a second electroactive species (e.g., a redox-active polymer such as polyvinyl ferrocene) is being oxidized at the positive electrode. During the charge mode, the oxidation of the second electroactive species provides a source of electrons for driving the reduction of the first electroactive species.

Again by way on non-limiting example, in some embodiments in which the electroactive species of the positive electrode comprises polyvinyl ferrocene, this second electroactive species may be oxidized according to the following reaction (3):

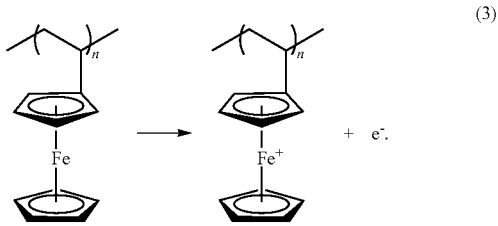

While each of reactions (1)-(3) are shown taking place in one direction, some reversibility may be exhibited. Analogous reactions may take place with the use of different species, as would be understood by a person of ordinary skill in the art.

In some embodiments, the second electroactive species comprises an intercalation compound. For example, the second electroactive may comprise a metal ion intercalation compound. One exemplary class of intercalation compounds includes metal oxides. The intercalation compound may include intercalation compounds of alkali metal ions such as lithium ions and/or sodium ions. In some embodiments, the intercalation compound comprises an alkali metal ion transition metal oxide (e.g., a lithium cobalt oxide, a lithium manganese oxide, a lithium nickel oxide, and/or lithium oxides comprising cobalt, manganese, and/or nickel). In some embodiments, the intercalation compound comprises an alkali metal transition metal polyoxyanion, such as a lithium transition metal phosphate. One example of a suitable lithium transition metal phosphate for the positive electrode is lithium iron phosphate ($LiFePO_4$). In some embodiments, during the charge mode, the oxidation of a second electroactive species in the form of an alkali metal ion intercalation compound (e.g., $LiFePO_4$) provides a source of electrons for driving the reduction of the first electroactive species, while simultaneous releasing an alkali metal ion (e.g., a lithium ion) that can shuttle to through an electrolyte (e.g., on or within a separator when present) toward the negative electrode to maintain charge balance and complete an electrochemical circuit. Conversely, during a discharge mode, the reduction of a second electroactive species in the form of an alkali metal ion intercalation compound provides a sink for electrons from the oxidation of the first electroactive species, while at the same time an alkali metal ion (e.g., a lithium ion) can shuttle from the a region in proximity to the negative electrode, through an electrolyte (e.g., on or within a separator when present), and toward the positive electrode where it can be intercalated into the intercalation compound and maintain charge balance.

According to one or more embodiments, upon charging the electrochemical cell by applying a potential difference across the positive electrode and negative electrodes, electrons flow from the portions of the second electroactive species (e.g., ferrocene (Fc) units in a pVFc-CNT composite) on the positive electrode, thus oxidizing the second electroactive species (e.g., by oxidizing ferrocene to ferrocenium ($Fc^+$) (as shown by reaction (3))), to the negative electrode, through an external circuit. At the negative electrode, the first electroactive species (e.g., optionally-substituted quinone units in a CNT composite) are reduced (e.g., to the semiquinone or dianion form of the optionally-substituted quinone) in the presence of the target gas (e.g., $CO_2$), which diffuses into the negative electrode. The electroactive species in its reduced state (e.g., the dianion of the optionally-substituted quinone) readily binds to $CO_2$ via a covalent bond, as represented in equation (2), forming a complex.

The potential difference applied across the electrochemical cell, during the charge mode, may have a particular voltage. The potential difference applied across the electrochemical cell may depend, for example, on the standard reduction potential for the generation of at least one reduced state of the first electroactive species, as well as the standard reduction potential for the interconversion between a reduced state and an oxidized state of the second electroactive species, when present. In some embodiments, the potential difference is at least 0 V, at least 0.1 V, at least 0.2 V, at least 0.5 V, at least 0.8 V at least 1.0 V, at least 1.5 V, or higher. In some embodiments, the potential difference is less than or equal to 2.0 V, than or equal to 1.5 V, than or equal to 1.0 V, less than or equal to 0.5 V, or less. Combinations of these voltages are also possible. For example, in some embodiments, the potential difference applied across the electrochemical cell is at least 0.5 V and less than or equal to 2.0 V. Other values are also possible.

Figure 3A:
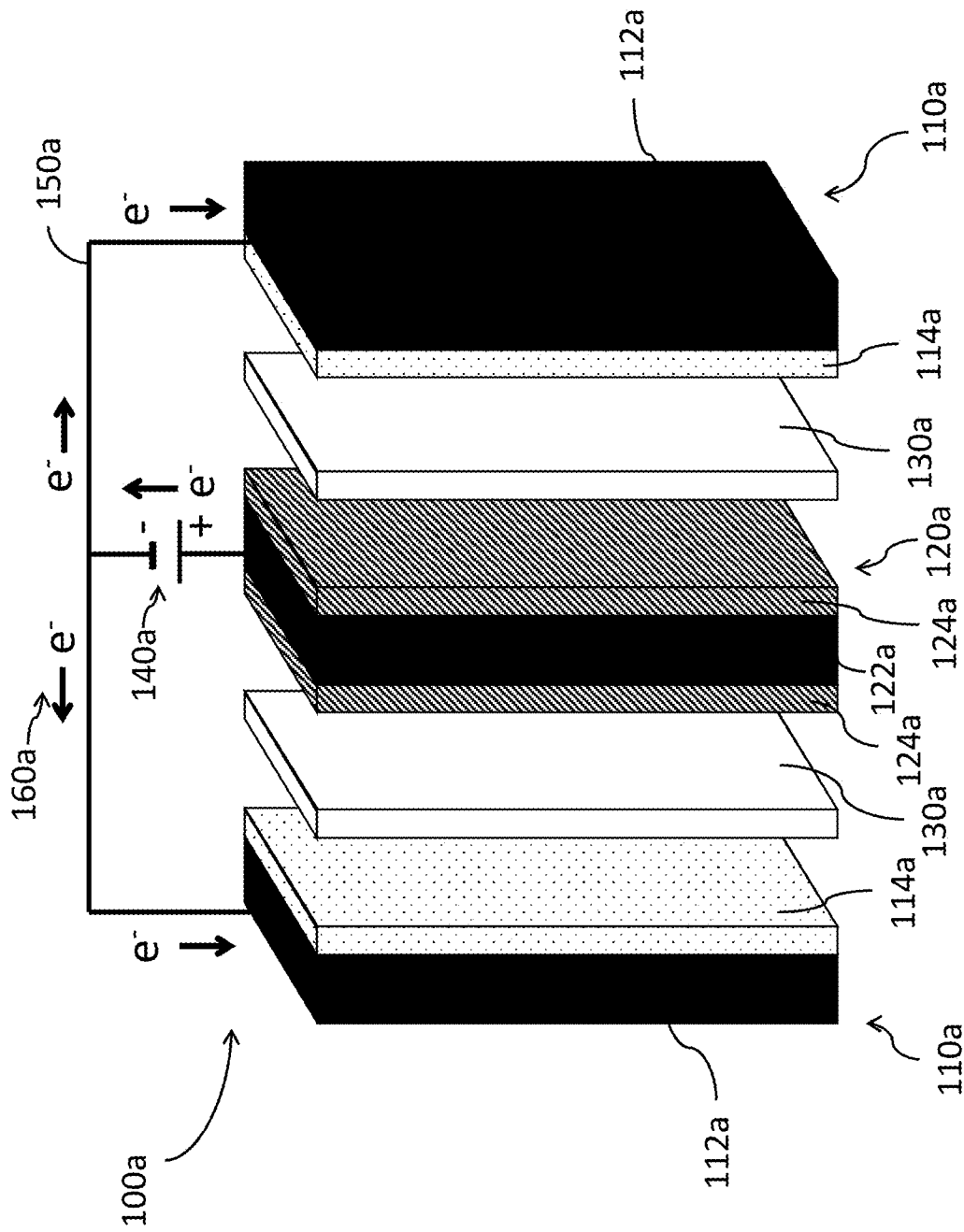
FIG. 3A shows an exploded schematic diagram of an electrochemical cell, operating in a charge mode, according to one or more embodiments.

FIG. 3A shows an exploded view of an exemplary electrochemical cell 100a, operating in a charge mode, according to one or more embodiments. The components of electrochemical cell 100a may be like those described with regard to electrochemical cell 100, described herein with regard to FIG. 2. As shown in FIG. 3A, a power source 140a and wiring 150a are used to apply a potential difference across the electrochemical cell 100a, according to certain embodiments. This causes an electron flow 160a in the external circuit 150a directing electrons to the primary electroactive composite layer 114a of each of the negative electrodes 110a, according to certain embodiments. In some embodiments, a redox half-cell reaction takes place at the electroactive composite layer 114a to reduce the first electroactive species immobilized in the layer 114a. In its reduced state, the electroactive species exhibits an increased affinity towards a target gas in a gas mixture (not shown), according to certain embodiments. The target gas of the gas stream may permeate the gas permeable layer 112a of the negative electrode to bond to the reduced material of the composite layer 114a.

In some embodiments, a relatively large amount of the target gas is removed from the gas mixture during the processes described herein. Removing a relatively large amount of the target gas may, in some cases, be beneficial for any of a variety of applications, such as capturing gases that may be deleterious if released into the atmosphere for environmental reasons. As one example, in some embodiments, the target gas comprises carbon dioxide, and removing a relatively high amount of the carbon dioxide from gas mixture may be beneficial to either limit the greenhouse gas impact of a process (e.g., an industrial process or transportation process) or to even reduce the amount of carbon dioxide in a room or the atmosphere (either for thermodynamic reasons for heating and air conditioning processes or for environmental reasons).

In some embodiments the amount of target gas in a treated gas mixture (e.g., a gas mixture from which an amount of the target gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% or less of the amount (in volume percent) of the target gas in the original gas mixture prior to treatment (e.g., the amount of the target in the gas mixture prior to being exposed to electrochemical cell). In some embodiments, the amount of target gas in a treated gas mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5%, or greater of the amount (in volume percent) of the target gas in the original gas mixture prior to treatment.

In some embodiments the amount of target gas in a treated gas mixture (e.g., a gas mixture from which an amount of the target gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% or less of the amount (in mole percent) of the target gas in the original gas mixture prior to separation (e.g., the amount of the target in the gas mixture prior to being exposed to electrochemical cell). In some embodiments, the amount of target gas and a treated gas mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5%, or greater of the amount (in mole percent) of the target gas in the original gas mixture prior to treatment.

In some embodiments, methods described herein can be used to remove an amount of the target gas from the gas mixture (e.g., during and/or after the applying the potential across the electrochemical cell) while removing a relatively low amount of any oxygen gas ($O_2$) that may be present in the gas mixture. In some such cases, this is beneficial in that reactivity with oxygen gas may be deleterious to the performance of the systems and methods described (e.g., reduced capture efficiency, damage to components of the electrochemical cell, etc.). Any of a number of the features described here in, alone or in combination may contribute to an ability to remove an amount of the target gas from a gas mixture while removing a relatively low amount of any oxygen gas that may be present in the gas mixture. For example, the use of a first electroactive species in the negative electrode that has a reduced state in which the species is capable of bonding with the target gas but for which reactivity with oxygen is a thermodynamically unfavorable may allow for removal of relatively high amount of the target gas for moving little to no oxygen gas.

One non-limiting way in which the target gas may be removed while removing little to no oxygen gas from the gas mixture is by applying a certain potential across the electrochemical cell during at least a portion of the operation. For example, it is has been discovered in the context of the present disclosure that it is possible to apply a potential across the electrochemical cell (e.g., first potential) that is sufficient to reduce the first electroactive species to at least one reduced state in which it is capable of reacting with the target gas, but the potential is insufficient to reach a state in which the species (or the electrode itself) is capable of reacting with oxygen (e.g., to form superoxide ion or peroxide dianion). Judicious choice of first electroactive species may allow for such a potential to be applied, whereas certain conventional electroactive species may not allow for such a potential to be applied. The potential applied across the electrochemical cell may be such that the electrode potential at the negative electrode is positive (e.g., by greater than or equal to 10 mV, greater than or equal to 50 mV, greater than or equal to 100 mV, greater than or equal to 200 mV, greater than or equal to 5 mV, and/or up to 1 V or more) relative to the standard reduction potential for the interconversion of oxygen gas and superoxide ion, or the superoxide ion and peroxide ion.

In some embodiments, an amount of the target gas (e.g., $CO_2$) is removed from the gas mixture during and/or after the application of the potential difference, and less than or equal to 0.1%, less than or equal to 0.05%, less than or equal to 0.001%, and or as little as 0.0001%, as little as 0.00001%, or less of any oxygen gas present in the gas mixture (by vol %) is removed from the gas mixture. In some embodiments, an amount of the target gas is removed from the gas mixture during and/or after the application of the potential different, and no oxygen gas is removed from the gas mixture (e.g., during the removal of the target gas). These ranges of oxygen removal from the gas mixture may be achievable even when oxygen gas is present in the gas mixture in a relatively high amount (e.g., greater than or equal to 0 vol %, greater than or equal to 1 vol %, greater than or equal to 5 vol %, greater than or equal to 10 vol %, greater than or equal to 21 vol %, greater than or equal to 50 vol %, and/or up to 75 vol %, up to 90 vol %, up to 99 vol %, substantially 100 vol %, or higher).

In some, but not necessarily all cases, when oxygen is present in the gas mixture, an amount of the oxygen gas is removed from the gas mixture during at least a portion of the time that an amount of the target gas is removed from the gas mixture (e.g., during and/or after the application of the electrochemical potential). In some such embodiments, a ratio of the amount of target gas removed to the amount of oxygen gas removed is greater than or equal is relatively high. The ratio may be relatively high in cases in which the reaction between the electroactive species in at least one reduced state formed during and/or after the application of the potential across the electrode and the target gas (e.g., $CO_2$), but is more thermodynamically favorable than is the species with oxygen gas. In some embodiments, a ratio of the amount of target gas removed to the amount of oxygen gas removed is greater than or equal is greater than or equal to 10:1, greater than or equal to 100:1, greater than or equal to 1,000:1, greater than or equal to 10,000:1, and/or up to 100,000:1, up to 1,000,000, up to 10,000,000:1, up to 100,000:1, up to 1,000,000,000:1, or higher.

In some embodiments, the positive electrode (e.g., positive electrode 120a in FIG. 3A) serves as a source of electrons during operation in a charge mode. In FIG. 3A, a corresponding redox half-cell reaction takes place at the complementary electroactive composite layer 124a of the positive electrode 120a to oxidize its electroactive species, in accordance with certain embodiments. The oxidation reaction may release electrons from the complementary electroactive species (e.g., polyvinylferrocene). These electron reaction products may then travel through the substrate layer 122a and/or the external wiring 150a to complete the circuit, according to certain embodiments. Separators 130a separate the positive and negative electrodes 120a and 110a, according to certain embodiments.

According to one or more embodiments, operation of the electrochemical cell further comprises applying a second potential difference across the electrochemical cell to release the target gas bonded to first electroactive species. In some embodiments, releasing the target gas produces a product or treated gas mixture having a higher concentration of target gas then the original gas mixture exposed to the electrochemical cell (e.g., target gas-rich gas mixture, such as a target gas-rich gas stream). According to some embodiments, after operating an electrochemical cell in the charge mode for a period of time, during which the target gas bonds to the first electroactive species of the negative electrode, operation may be switched to a discharge mode. During operation in the discharge mode, the applied voltage is switched to provide an electron flow in the opposite direction from that during the charge mode. While operating in the discharge mode, a negative voltage may be applied across the electrochemical cell. In the discharge mode, a redox half takes place at the negative electrode in which the first electroactive species of the negative electrode is oxidized. During operation in the discharge mode, the target gas may be released from the electroactive species to which it had been bonded in the negative electrode.

According to some embodiments in which the electroactive species of the negative electrode is an optionally-substituted quinone, the electroactive active species is oxidized, during a discharge mode, according to the following reaction (4):

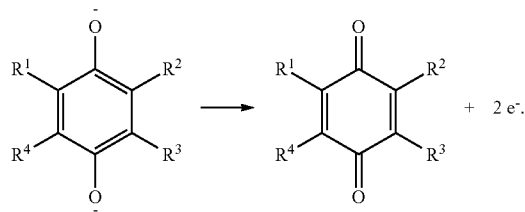

(4)

According to some embodiments in which the electroactive active species is oxidized after bonding to a target gas comprising carbon dioxide, the following reaction (5) may take place:

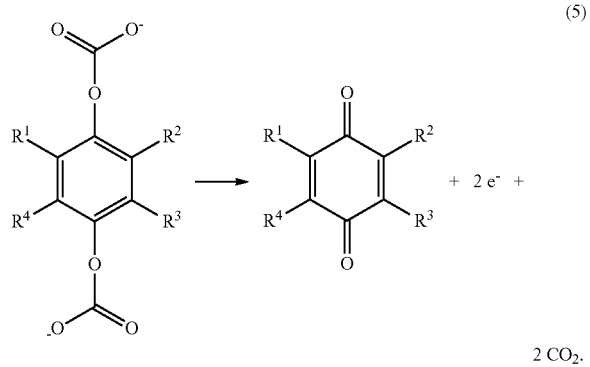

(5)

According to some embodiments, while the first electroactive species (e.g., comprising an optionally-substituted quinone) is being oxidized at the negative electrode, the second electroactive species (e.g., polyvinyl ferrocene) is being reduced as the positive electrode. During the discharge mode, the reduction of the second electroactive species serves as an electron sink.

According to some embodiments in which the electroactive species of the positive electrode comprises polyvinyl ferrocene, this second electroactive species is reduced according to the following reaction (6):

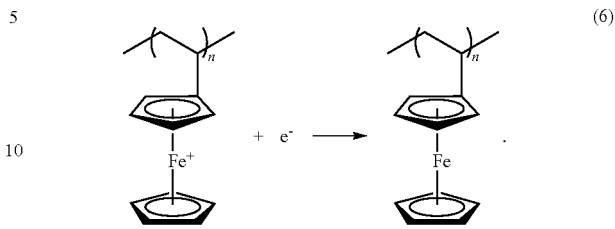

(6)

While each of reactions (4)-(6) are shown taking place in one direction, some reversibility may be exhibited. Analogous reactions may take place with the use of different species, as would be understood by a person of ordinary skill in the art with the benefit of this disclosure.

According to some such embodiments, the electroactive species of the negative electrode is oxidized by discharging the electrochemical cell, when the polarization of the external circuit is altered to allow for the flow of electrons in the reverse direction compared to the charging process. The covalent bonds formed between the optionally-substituted quinone and $CO_2$ molecules are broken (as shown in reaction (5)), releasing $CO_2$ gas to diffuse out of the negative electrode and electrons which flow to the positive electrode, reducing $Fc^+$ units to Fc (as shown in reaction (6), according to certain embodiments. According to some such embodiments, polyvinyl ferrocene may serve as an electron source for the reduction of the optionally-substituted quinone or electron sink for the oxidation of the carbon dioxide adduct of the optionally-substituted quinone.

The potential difference across the electrochemical cell, during the discharge mode, may have a particular voltage. For example, in some embodiments, the potential difference may be less than 0 V, less than or equal to $-0.5$ V, less than or equal to $-1.0$ V, or less than or equal to $-1.5$ V. In some embodiments, the potential difference may be at least $-2.0$ V, at least $-1.5$ V, at least $-1.0$ V or at least $-0.5$ V. Combinations of these voltages are also possible, for example, at least $-2.0$ V and less than or equal to $-0.5$ V. Other values are also possible.

Figure 3B:
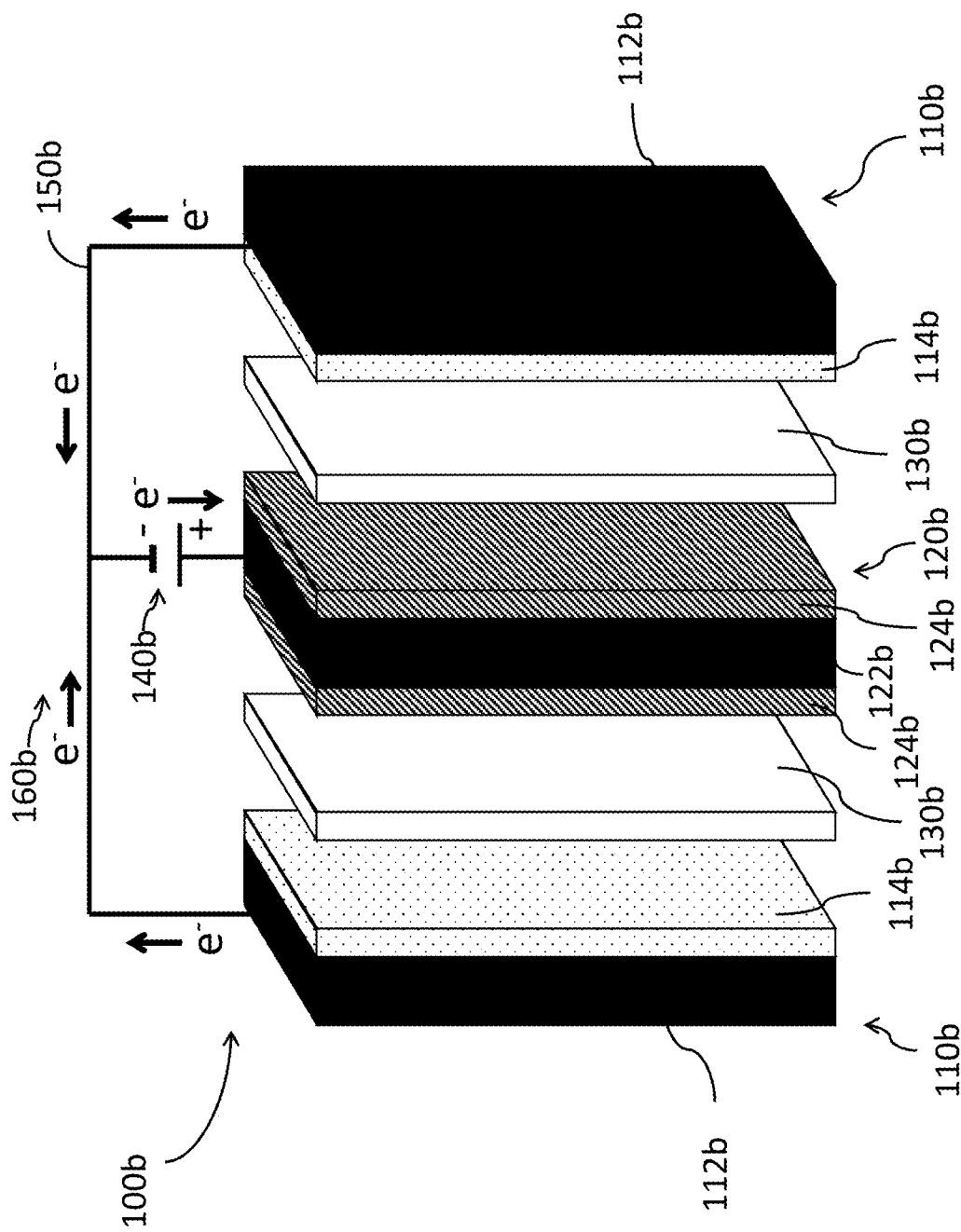
FIG. 3B shows an exploded schematic diagram of an exemplary electrochemical cell, operating in a discharge mode, according to one or more embodiments.

FIG. 3B shows an exploded view of an exemplary electrochemical cell 100b, operating in a discharge mode, according to one or more embodiments. The components of electrochemical cell 100b are the same as those of cell 100a of FIG. 3A, according to certain embodiments. However, the voltage applied by power source 140b has been altered to create a potential difference that reverses the direction of electron flow 160b through the external wiring 150b relative to the direction of electron flow 160a in FIG. 3A, according to certain embodiments. In discharge mode, a redox half-cell reaction takes place at electroactive composite layer 114b of negative electrodes 110b to oxidize the first electroactive species immobilized in the layer 114b, according to some embodiments. In some embodiments, in its oxidized state, the first electroactive species exhibits a decreased affinity towards the target gas, causing the target gas to be released from the electroactive material. The released target gas may exit through the gas permeable layer 112b and may be directed towards further processing, sequestration, or other desired destination. Meanwhile, in some embodiments, positive electrode 120b serves as an electron sink during operation in the discharge mode. A half-cell reaction takes place at complementary electroactive composite layer 124b of the positive electrode 120b to reduce the second electroactive species, according to some embodiments. In some embodiments, during the reduction reaction electrons, which have traveled through the wiring 150b and the substrate layer 122b, bond to the complementary electroactive species allowing for a completed circuit. Separators 130b separate the positive and negative electrodes 120b and 110b, in accordance with some, but not necessarily all embodiments.

According to one or more embodiments, one or more electrochemical cells as described herein may be incorporated into a gas separation system. The gas separation system may comprise a plurality of electrochemical cells, according to any of the embodiments described herein, in fluid communication with a gas inlet and a gas outlet.

The gas separation system may comprise an external circuit connecting the negative electrode (or the first and second negative electrodes when both are present) and the positive electrode of each electrochemical cell to a power source configured to apply a potential difference across the negatives electrode(s) and the positive electrode of each electrochemical cell.

Figure 4:
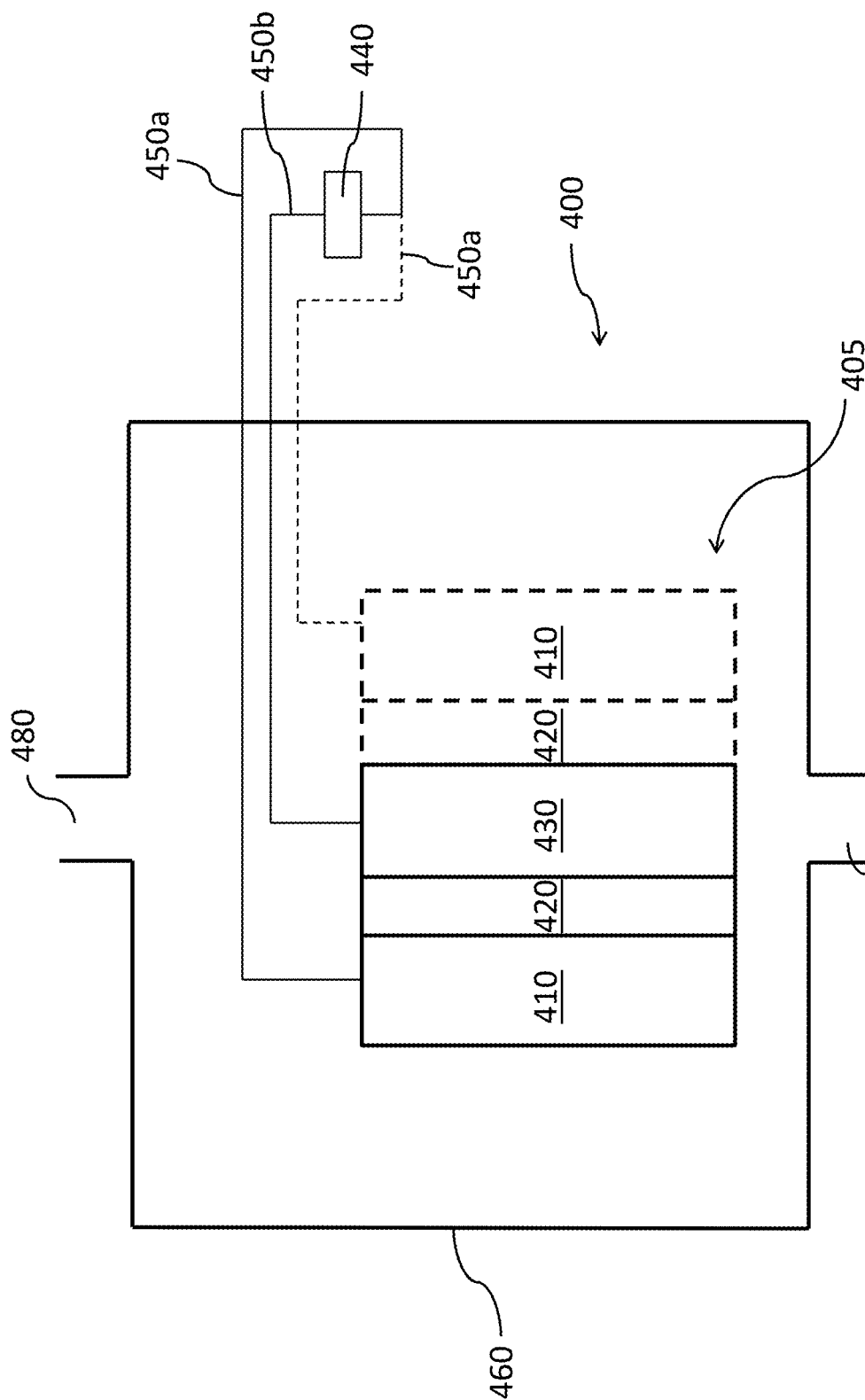
FIG. 4 shows a schematic drawing of an exemplary gas separation system, according to one or more embodiments.

FIG. 4 shows a schematic drawing of an exemplary gas separation system 400, according to one or more embodiments. The system 400 comprises a housing 460 having an inlet 470 and an outlet 480, according to certain embodiments. Positioned within the housing is an electrochemical cell 405. While only one cell 405 is shown in FIG. 4 for the sake of clarity, it will be readily understood that a plurality of cells 405 could be positioned in the housing 460. A power source 440, which may be positioned inside or outside of housing 460, is connected to the cell 405, according to certain embodiments. Negative electrode(s) 410 are connected to the power source 440 through wiring 450a, while positive electrode 430 is connected via wiring 450b, according to certain embodiments. While a voltage is applied to operate the cell(s) in a charge mode, as described elsewhere herein, a gas mixture (e.g., gas stream such as ventilated air or ambient air) that is to be at least partially separated is delivered through inlet 470. In some embodiments, the gas mixture comprises a target gas designed to be at least partially removed by the system 400. The gas mixture then passes in proximity to the cell 405, in particular, in proximity to the negative electrode(s) 410. In some embodiments, the first electroactive species in at least one of its reduced states in the negative electrode 410 bonds to the target gas, removing at least a portion of it from the gas mixture. An optional second negative electrode 410, second separator 420, and corresponding wiring 450a are shown in dashed line, according to certain embodiments. While the embodiments shown in FIG. 4 and other figures comprise an optional housing it should be understood that the electrochemical cell could be positioned in a variety of environments, for example, in-line in a conduit, or otherwise without a housing.

Figure 5A:
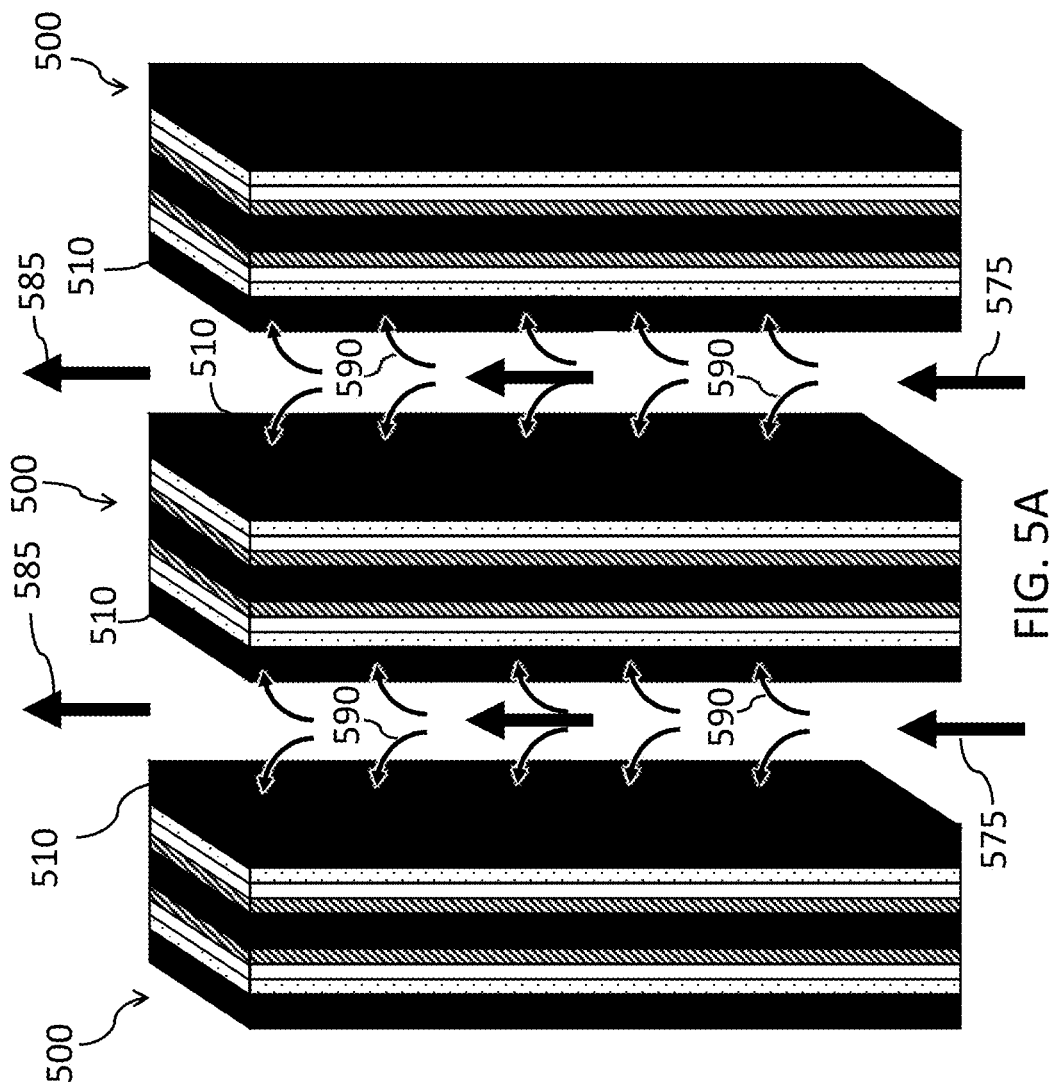
FIG. 5A shows a schematic drawing of an exemplary system performing a gas separation process, according to one or more embodiments.

FIG. 5A shows a schematic drawing of an exemplary system performing a gas separation process during a charge mode, according to one or more embodiments. In FIG. 5A, a potential difference is applied across each of the electrochemical cells, so that each operates in a charge mode, according to certain embodiments. In the charge mode, a redox reaction (e.g., reduction) of the first electroactive species in the negative electrode 510 increases the affinity between the electroactive species and the target gas 590, according to certain embodiments. A gas mixture 575 comprising the target gas 590 is introduced to the system and passes in proximity to the negative electrodes 510. The increased affinity causes the target gas (e.g., $CO_2$) to bond to the electroactive material, according to certain embodiments. In this manner, at least a portion of the target gas is separated from the gas mixture 575 to produce treated gas mixture 585.

In some embodiments, a gas separation system comprises a plurality of electrochemical cells, and a flow field is between at least some (e.g., some or all) of the plurality of electrochemical cells. As an illustrative example, FIG. 5B shows a schematic drawing of an exemplary system comprising flow fields 511 separating electrochemical cells 500, performing a gas separation process during a charge mode, according to one or more embodiments. It should be understood that when a first object is between a second object and a third object, it may be between an entirety of the first object and second object or between portions of the first object and second object. In some embodiments, a flow field between two neighboring electrochemical cells is directly adjacent to each of the neighboring electrochemical cells such that no intervening structures/layers are between the flow field and the electrochemical cells. However, in some embodiments, a flow field between two neighboring electrochemical cells is indirectly adjacent to one or both cells, such that there are one or more intervening structures/layers such as electrically conductive solids.

Figure 5E:
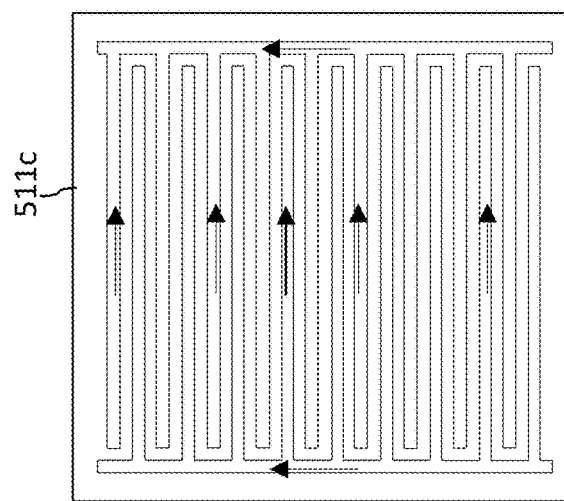
FIGS. 5C-5E show side view schematic illustrations of exemplary flow field channel patterns, according to one or more embodiments.
Figure 5D:
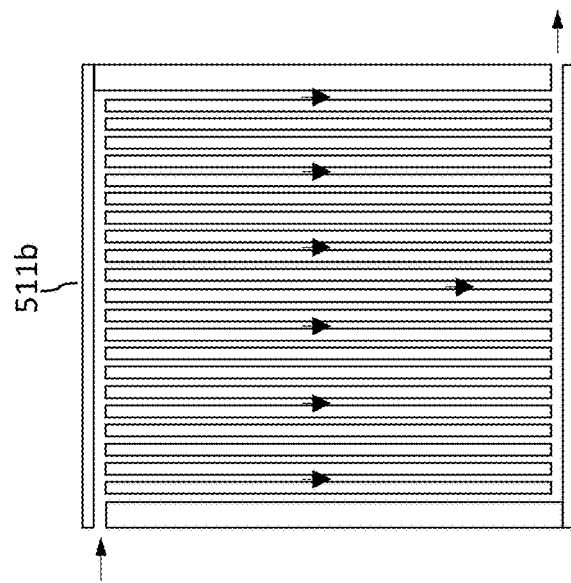
Figure 5C:
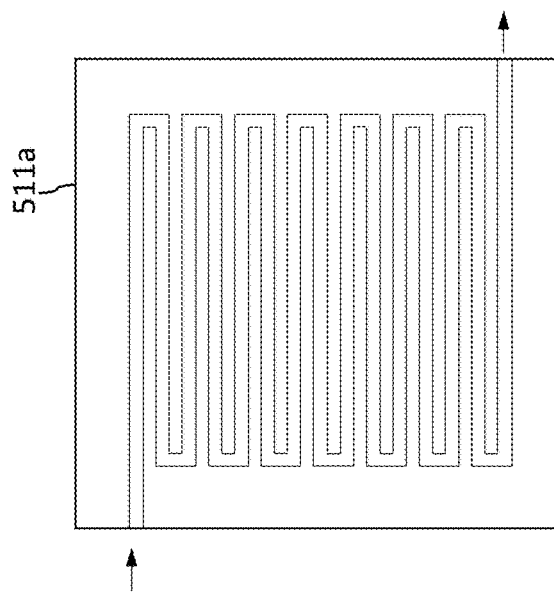

A flow field generally refers to a solid structure configured to define pathways through which a fluid may flow. In some instances, a flow field comprises a solid article defining pores or channels for fluid flow while allowing the fluid to be exposed to adjacent structures. Suitable materials for the solid articles of flow fields include, but are not limited to, polymeric materials (e.g., plastics), metals/metal alloys, graphite, composite materials (e.g., a graphite-polymer composite). In some embodiments, a flow field comprises a solid article comprising one or more surfaces with patterned channels. The channel patterns may be selected to distribute fluid (e.g., gas) effectively across one or more dimensions of the flow field. Suitable channel patterns include, but are not limited to serpentine, parallel, and interdigitated. FIGS. 5C, 5D, and 5E show side-view schematic drawings of faces of flows field 511a having a serpentine pattern, flow field 511b having a parallel pattern, and flow field 511c having an interdigitated pattern, respectively with fluid flow direction indicated as arrows, according to certain embodiments. Flow field channel patterns can be formed, for example, via etching, cutting, stamping, molding, milling, or additive manufacturing. In some embodiments, a flow field comprises a porous solid. For example, a flow field may comprise carbon fiber paper, felt, or cloth, or metal foam.

In FIG. 5B, gas 590 from fluid mixture 575 is distributed along a facial area of electrode 510 via flow field 511 (e.g., via channels not shown). It has been realized in the context of the present disclosure that flow fields may assist with distributing gas mixtures relatively uniformly across electrodes and may assist with controlling the duration of exposure of the gas to the electrodes (e.g., to promote efficient capture of target gases). Relatively uniform distribution of gas may increase efficiency by utilizing a larger percentage of electrode area (e.g., comprising electroactive species in at least one reduced state) for binding target gas. In some embodiments, during at least a portion of a charging process, a flux of the gas mixture across at least 25%, at least 50%, at least 75%, at least 90%, at least 95%, or more of a facial area of a negative electrode in the system is within 50%, within 25%, within 15%, within 10%, within 5%, within 2%, within 1% or less of an average flux across the entire facial area of the negative electrode during the charging process.

System 400 shown in FIG. 4 may also be operated in a discharge mode by altering the applied voltage from the power source 440 to cause an electron flow opposite to the flow direction in the charge mode, according to certain embodiments. This alteration causes a different redox reaction to take place at the negative electrode 410, for example, one in which the first electroactive species of the negative electrode is oxidized. Such a change in the oxidation state of the electroactive may causes the target gas to be released from the electroactive species to produce a treated gas mixture having a higher amount of the target gas then the original gas mixture (e.g., input gas mixture). The treated gas mixture may exit through outlet 480 or an alternative outlet (not shown).

In some, but not necessarily all embodiments, because operation in the discharge mode causes target gas material to be released, it would be counter-productive to simultaneously introduce via inlet 470 a gas stream that is to undergo at least partial gas separation. Therefore, during operation in discharge mode, inlet 470 is either closed or a different stream (e.g., a waste stream) is redirected to the inlet. However, in certain embodiments, a second portion of a gas mixture to be to undergo at least partial gas separation is introduced via inlet 470 while operation in the discharge mode occurs.

According to some, but not necessarily all embodiments, a gas separation system comprises a first set of electrochemical cells and a second set of electrochemical cells. Each of the first set and the second set may comprise one or more electrochemical cells as described throughout this disclosure. The first and second set may be made to run in parallel in an alternating fashion, such that one set of cells is operating in a charge mode and capturing a target gas (e.g., $CO_2$) from a gas mixture while another set of cells is operating in a discharge mode and releasing the target gas (e.g., $CO_2$). The system may comprise separate housings for each of the sets of electrochemical cells. The system may further comprise conduits and valving arranged to direct flow in a desired manner. The gas separation system may allow for continuous or semi-continuous separation of a gas mixture (e.g., gas stream), with the gas mixture being directed to the set of cells operating in a charge/capture mode, at a given moment, while a separate target gas-rich treated mixture is produced by the other set of cells operating in a discharge/release mode. Furthermore, additional sets of electrochemical cells may be added in parallel or in series, according to the needs of the application.

Figure 6:
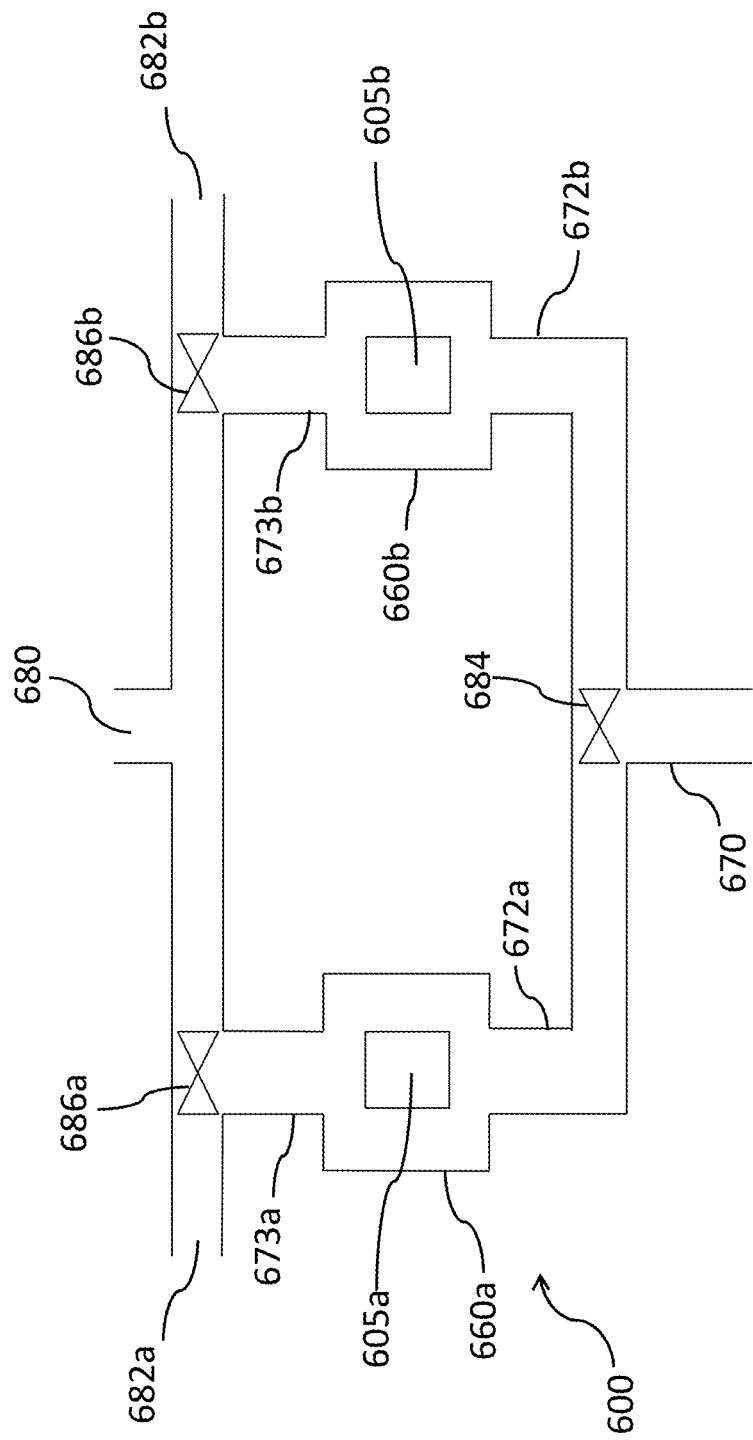
FIG. 6 shows a schematic drawing of an exemplary gas separation system, according to one or more embodiments.

FIG. 6 shows an example of an embodiment of such a gas separation system. In the gas separation system 600, a first set of electrochemical cells 605a is positioned in a first housing 660a, and a second set of electrochemical cells 605b is positioned in a second housing 660b. Conduits connect a gas inlet 670 to housing inlets 672a and 672b. A valve 684 may be arranged to direct flow to either of the sets 605a and 605b, depending on which is currently operating in a charge mode.

In operation, a gas stream comprising a target gas (e.g., $CO_2$) may be introduced to the gas separation system 600 through inlet 670. When the first set of cells 605a are operating in a charge/capture mode, the valve 684 may be arranged to direct the stream to bring it into proximity to the first set of cells 605a where the target gas may bond to electroactive species in the cells 605a to produce a treated gas mixture (one having a reduced concentration of target gas) that then exits the housing 660a through an outlet 673a, according to certain embodiments. Additional valving 686a downstream of the housing outlet 673a may be arranged to direct the treated gas stream through a treated gas outlet 680.

While the first set of cells 605a are operating in a charge mode, the second set of cells 605b may be operating in a discharge mode, in which previously accumulated target gas are released from the electroactive material of the second set of cells 605b. In the embodiment shown, valve 684 is arranged to isolate the gas mixture from the set of cells 605b operating in the discharge mode. The release of the target gas from the set of cells 605b produces a target gas-rich gas mixture, which then exits housing 660b through outlet 673b. A valve 686b may be arranged to isolate the target gas-rich gas mixture from treated stream outlet 680 and to direct the target gas-rich stream to waste outlet 682b, instead, where the target rich stream may undergo further processing, storage, etc.

After operating in the above manner for a period of time, the modes of cells 605a and 605b may be reversed. The first set of cells 605b are then operated in a discharge mode to release the accumulated target gas from their electrodes. During this period, the valve 684 is rearranged to isolate the treatment stream from the first set of cells 605a. During this period, the valve 686a is rearranged to direct a target-rich stream toward a waste outlet 682a.

Meanwhile, the operation of the second set of cells 605b is reversed so that they are operated in a charge mode to capture target gas and produce a treated stream. Inlet valve 684 is arranged to direct the treatment gas mixture from system inlet 670 through conduits to the second set of cells 605b via second housing inlet 672b. The outlet valve 686b is rearranged to direct the treated gas mixture to the outlet 680.

In such a manner the different sets of cells 605a and 605b may cycle through modes while, together, providing continuous or semi-continuous separation of a gas stream comprising the target gas, according to certain embodiments. While the particular embodiment shown in FIG. 6 shows one particular arrangement of system components (e.g., valves, conduits, inlets, and outlets), it would be understood that different configurations could be provided to still meet the goal of providing continuous operation with segregated treated streams and target gas-rich streams.

Figure 7A:
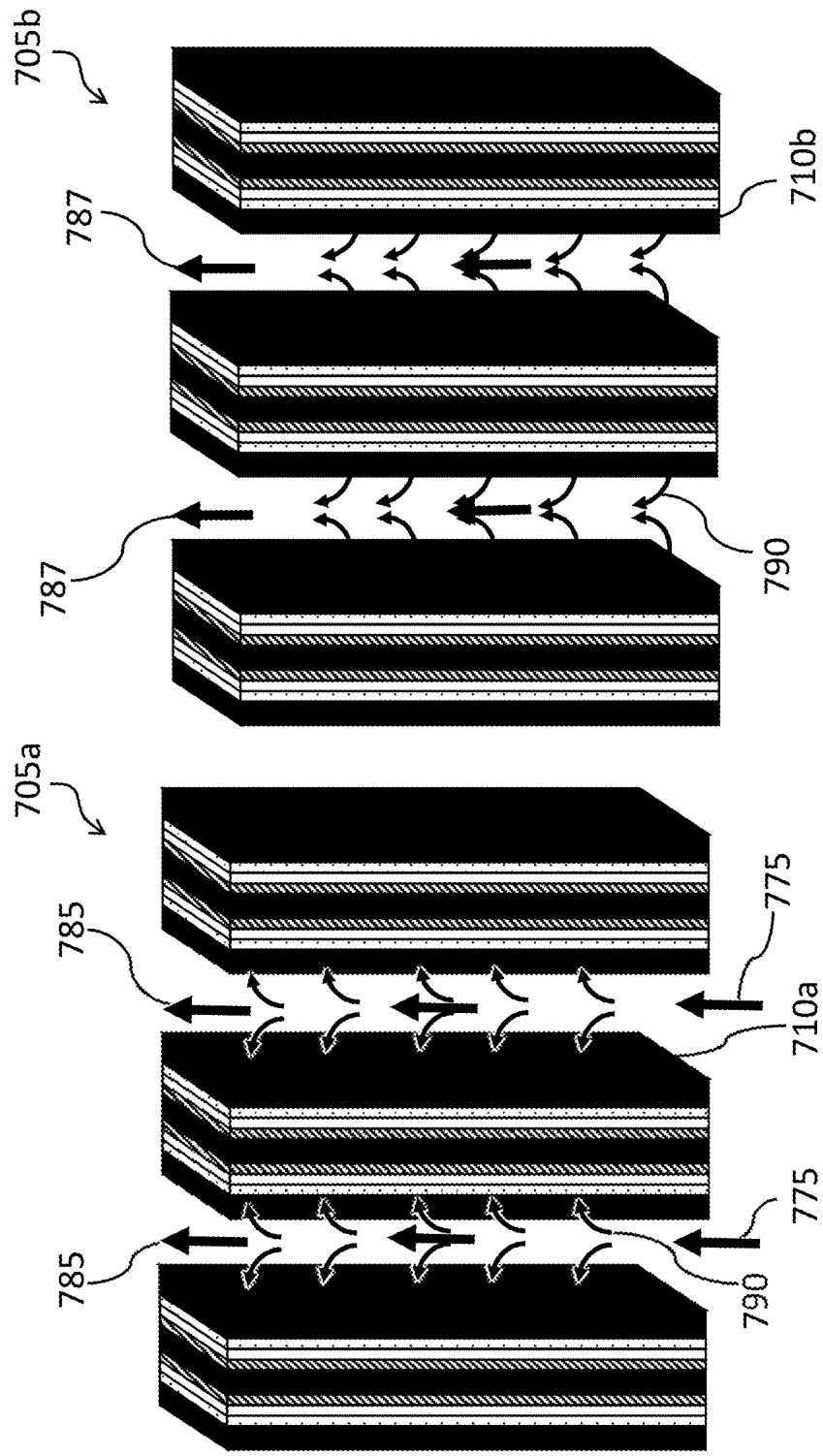
FIG. 7A shows a schematic drawing of an exemplary system performing a gas separation process, according to one or more embodiments.

FIG. 7A shows a schematic drawing of an exemplary system, similar to that of FIG. 6, performing a gas separation process in which a first set of cells 705a are operating in a charge mode, while a second set of cells 705b are operating in a discharge mode, according to one or more embodiments. In the charge mode, an applied voltage induces a redox reaction (e.g., reduction) of the electroactive species in the negative electrode 710a that increases the affinity between the first electroactive species and the target gas 790. A gas stream 575 comprising the target gas 590 is introduced to the set of cells 705a and passes in proximity to the negative electrodes 510a. The increased affinity causes the target gas (e.g., $CO_2$) 790 to bond to the electroactive material. In this manner at least a portion of the target gas is separated from the gas stream 775 to produce a treated gas stream 785.

In the discharge mode, a second applied voltage, causing an electron flow in the opposite direction from that during the charge mode, induces a second redox reaction (e.g., oxidation) of the first electroactive species in the negative electrode 710b that decreases the affinity between the electroactive species and the target gas 790, according to certain embodiments. The released target gas 790 enters a target gas-rich gas mixture 787.

Figure 7B:
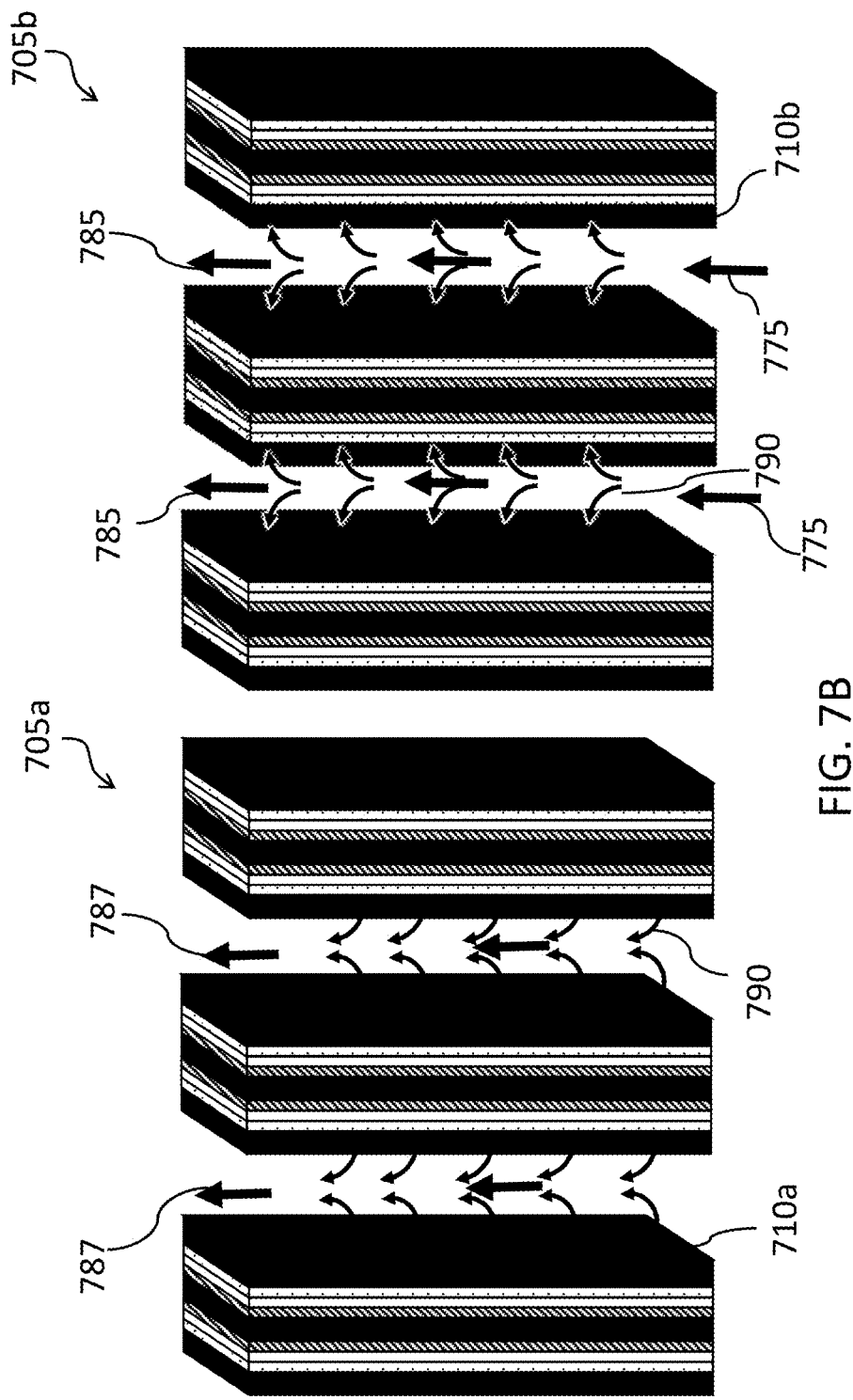
FIG. 7B shows a schematic drawing of an exemplary system performing a gas separation process, according to one or more embodiments.

FIG. 7B shows a schematic drawing of an exemplary system, similar to that of FIG. 6, performing a gas separation process in which the operation modes shown and described for FIG. 7A have been reversed. In FIG. 7B, the voltage applied across the first set of cells 705a has been altered and the cells 705a are operated in a discharge mode to release stored target gas 790 from the negative electrodes 710a to produce a target gas-rich gas mixture, according to certain embodiments. Meanwhile, the voltage applied across the second set of cells 705b has also been altered, causing them to operate in a charge mode. The target gas 790 of treatment stream 775 bonds to the negative electrodes 710b to produce a treated stream 785.

Figure 10A:
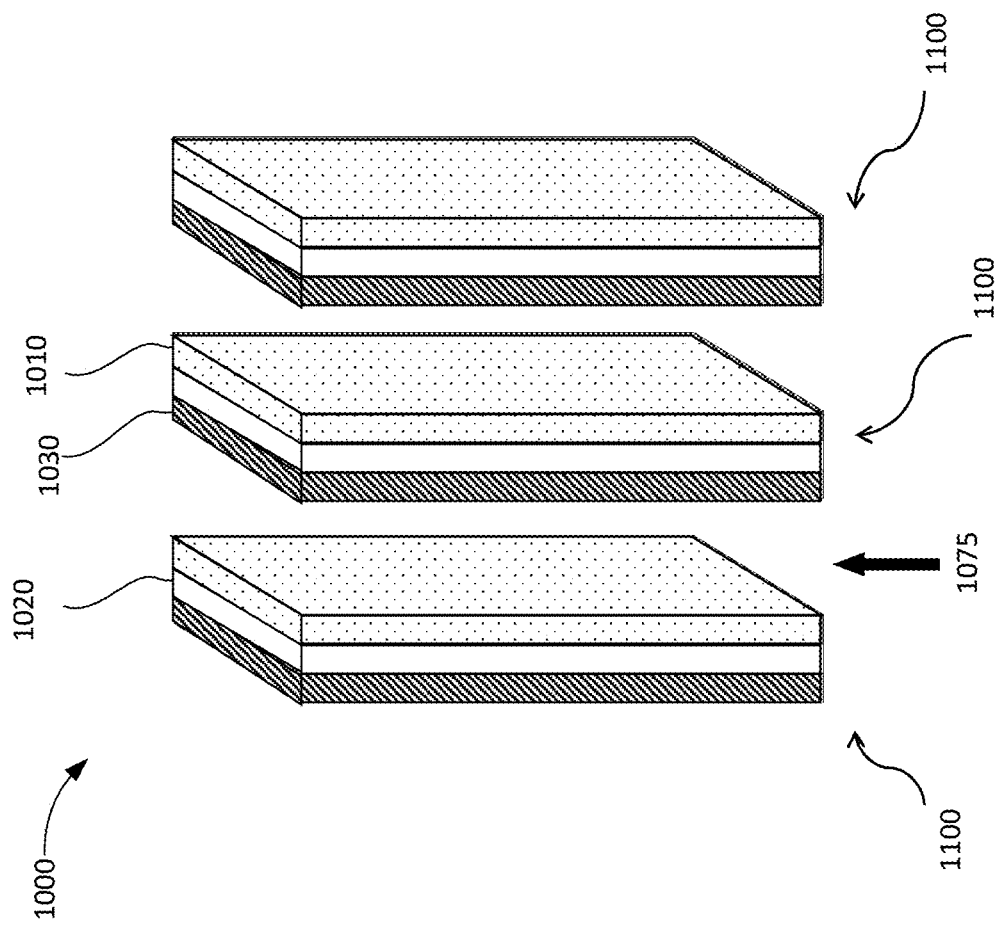
FIG. 10A shows a schematic drawing of an exemplary system comprising a plurality of electrochemical cells performing a gas separation process, according to one or more embodiments.

As mentioned above, a gas separation system may comprise a plurality of electrochemical cells electrically connected in parallel or in series. One of ordinary skill in the art, with the benefit of this disclosure, would understand generally how to electrically connect electrochemical cells to form a circuit. Such connections can be made by establishing an electrically conductive pathway for electrons to flow between electrodes of the electrochemical cells (in other words, establishing electrical coupling between electrodes). An electrically conductive pathway may in some instances be established via one or more electrically conductive solid materials (e.g., conductive metals, alloys, polymers, composites, carbonaceous materials, or combinations thereof). For example, an electrically conductive pathway may be established via wiring electrodes of the electrochemical cells. The electrochemical cells may have any of the configurations described above. For example, in some embodiments, some or all of the electrochemical cells in the system have a single negative electrode (e.g., comprising a first electroactive species), a single positive electrode (e.g., comprising a second electroactive species), and optionally a separator between the first positive electrode and the second positive electrode. FIG. 10A shows a schematic drawing of an arrangement of electrochemical cells 1100 in one such system 1000, where each electrochemical cell 1100 comprises, in order, negative electrode 1010, optional separator 1020, and positive electrode 1030, according to certain embodiments. A gas mixture 1075 comprising a target gas may be introduced to the system such that gas mixture 1075 passes in proximity to negative electrode 1010 of first electrochemical cell 110 and positive electrode 1030 of neighboring second electrochemical cell 1100. While FIG. 10A shows three electrochemical cells 1100, it should be understood than any of a variety of suitable numbers of electrochemical cells may be employed in a gas separation system (e.g., electrically connected in parallel or in series), depending on the requirements of a particular application as needed.

In other embodiments, some or all of the electrochemical cells in a gas separation system comprise a positive electrode (e.g., comprising a second electroactive species), a first negative electrode (e.g., comprising the first electroactive species), a second negative electrode (e.g., comprising the first electroactive species), a first separator between the first negative electrode and the positive electrode, and a second separator between the positive electrode and the second negative electrode. Examples of such electrochemical cells are shown in FIG. 1B and FIG. 2.

FIG. 10B shows a schematic drawing of configuration in which a plurality of electrochemical cells 1100 in system 1000 are electrically connected in parallel, according to certain embodiments. In a parallel configuration, each negative electrode 1010 is electrically coupled to a first terminal (e.g., of a power source) and each positive electrode 1030 is electrically coupled to a second terminal (e.g., of a power source). For example, in FIG. 10B, each negative electrode 1010 is electrically coupled to a first terminal of a power source via wiring 1015, and each positive electrode 1030 is electrically coupled to a second terminal of the power source via wiring 1016, in accordance with certain embodiments.

Figure 10C:
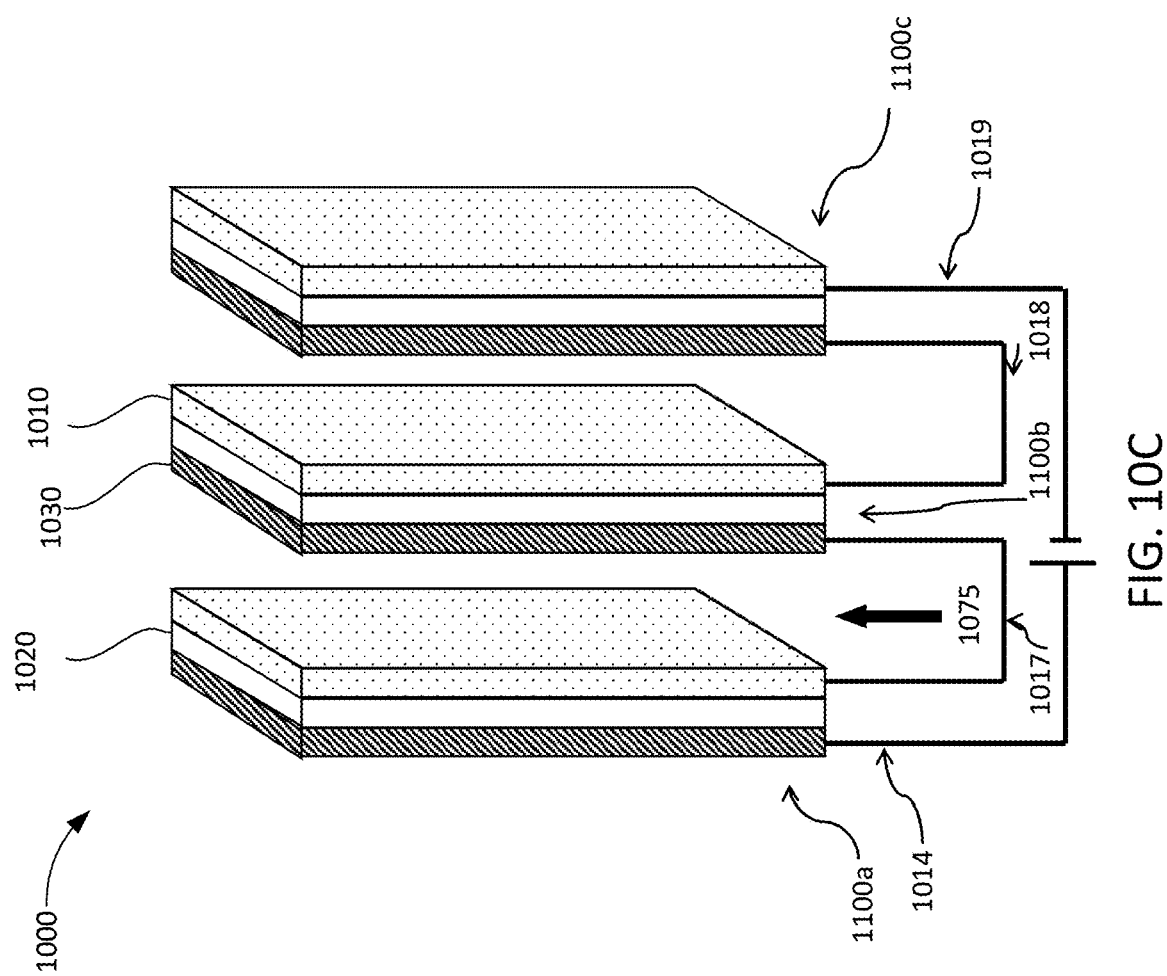
FIG. 10C shows a schematic drawing of an exemplary system comprising a plurality of electrochemical cells electrically connected in series performing a gas separation process, according to one or more embodiments.

FIG. 10C shows a schematic drawing of a configuration in which a plurality of electrochemical cells 11000 in system 1000 are electrically connected in series, according to certain embodiments. In a series configuration, a positive electrode of a first electrochemical cell is electrically connected to a negative electrode of a second electrochemical cell of the system. For example, in FIG. 10B, negative electrode 1010 of first electrochemical cell 1100a is electrically connected to positive electrode 1030 of second electrochemical cell 1100b via wiring 1017, and negative electrode 1010 of second electrochemical cell 1100b is electrically connected to positive electrode 1030 of third electrochemical cell 1100c via wiring 1018, according to certain embodiments. Further, positive electrode 1030 of first electrochemical cell 1100a is electrically coupled to a first terminal of a power source via wiring 1014, and negative electrode 1030 of third electrochemical cell 1100a is electrically coupled to a second terminal of the power source via wiring 1019, in accordance with certain embodiments.

It has been determined in the context of this disclosure that certain configurations of gas separation systems comprising a plurality of electrochemical cells electrically connected in series may promote relatively efficient charge transport/and/or gas transport. For example, in some embodiments, electrically conductive materials between electrochemical cells may establish electrically conductive pathways rather than using external wiring. For example, a gas separation system may comprise a first electrochemical cell and a second electrochemical cell electrically connected in series, where the electrical connection is established via one or more electrically conductive materials between the first electrochemical cell and the second electrochemical cell. Any of a variety of suitable electrically conductive materials may be positioned between electrochemical cells to establish electrical connection between, for example, a negative electrode of the first electrochemical cell and a positive electrode of the second electrochemical cell. For example, an electrically conductive material may be an electrically conductive solid. The electrically conductive solid may comprise, for example, a metal and/or metal alloy (e.g., steel, silver metal/alloy, copper metal/alloy, aluminum metal/alloy, titanium metal/alloy, nickel metal/alloy). In some embodiments, the electrically conductive solid comprises a carbonaceous material (e.g., graphite, single-walled carbon nanotubes, multi-walled-carbon nanotubes, carbon black, a carbon mat (e.g., carbon nanotube mat), Ketjen-Black, carbon black Super P, graphene, and the like). In some embodiments, the carbonaceous material is a porous carbonaceous material as described elsewhere herein. In some embodiments, the electrically conductive solid comprises a composite of an electrically conductive solid with a binder resin. In some embodiments, an electrically conductive solid between electrochemical cells comprises an electrically conductive polymeric material.

In some, but not necessarily all embodiments, an electrically conductive material between electrochemical cells comprises a bipolar plate. It should be understood that in the context of this disclosure a plate need not necessarily be flat. Bipolar plates are known to those of skill in the art and are typically used in fields other than gas separation, such as in fuel cells. A bipolar plate may be configured to separate fluid (e.g., gas) contacting the positive electrode from the fluid contacting the negative electrode. Bipolar plates may comprise electrically conductive solids such as steel, titanium, or graphite.

In some embodiments, at least some of the plurality of electrochemical cells (e.g., connected in series) are separated by a flow field. As mentioned above, positioning a flow field between neighboring electrochemical cells may promote beneficial gas distribution and relatively efficient interaction between gases and the electrodes (e.g., for binding). In some embodiments, a bipolar plate as described above comprises a flow field (e.g., via etching of fluidic pathways in one or both faces of the plate), though in other embodiments a different flow field is employed as an alternative or in addition to the flow-field-containing bipolar plate.

Figure 11:
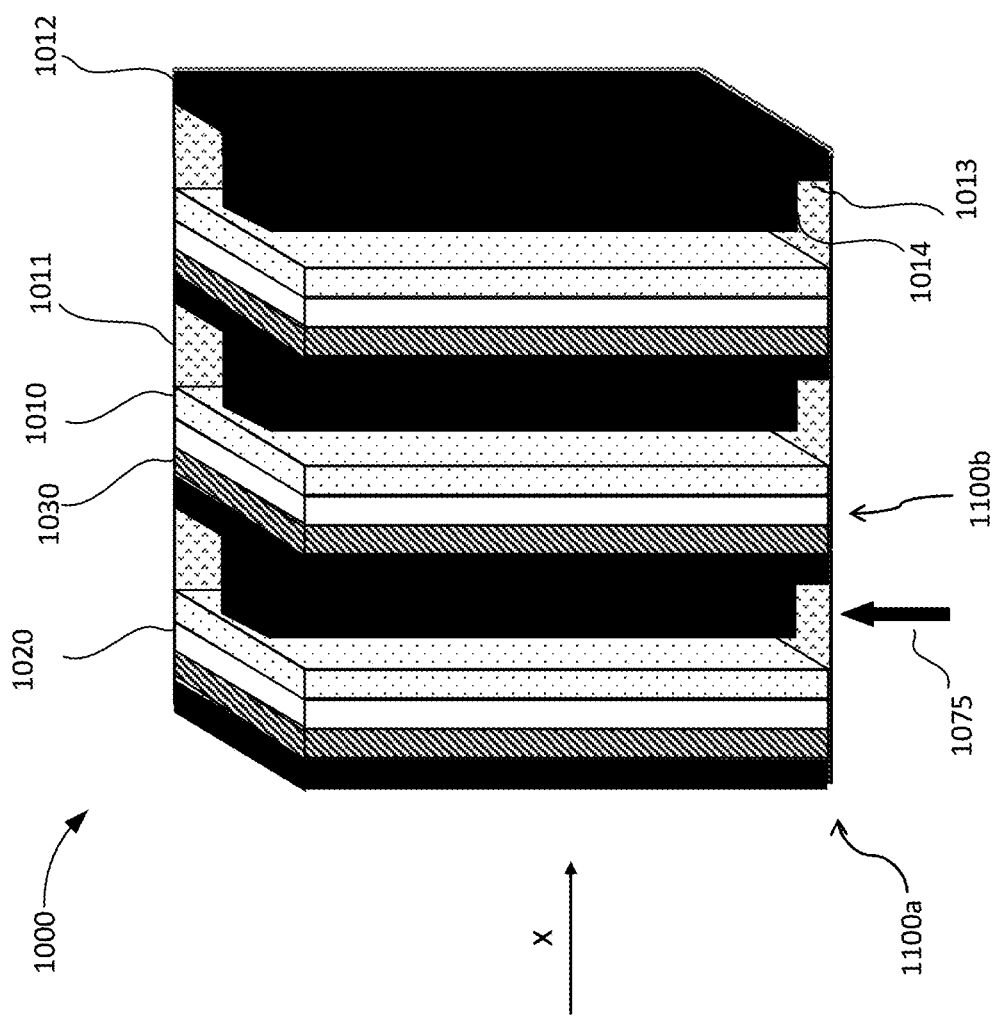
FIG. 11 shows a schematic drawing of an exemplary system comprising a plurality of electrochemical cells electrically connected in series and one or more electrically conductive materials between electrochemical cells, performing a gas separation process, according to one or more embodiments.

FIG. 11 shows a schematic diagram of exemplary gas separation system 1000 comprising electrochemical cells 1100 electrically connected in series via one or more electrically conductive materials between cells, according to certain embodiments. In FIG. 11, system 1000 comprises electrically conductive solid materials in the form of bipolar plates 1012 and ribs 1014. Ribs in a gas separation system may be made of any of the electrically conductive solid materials described above. In the embodiment shown in FIG. 11, first electrochemical cell 1100a is separated from second electrochemical cell 1100b via bipolar plate 1012 and rib 1014. Bipolar plate 1012 and rib 1014 may be directly adjacent to negative electrode 1010 of first electrochemical cell 1100a and positive electrode 1030 of second electrochemical cell 1100b, thereby establishing an electrically conductive pathway for the series connection. Other electrochemical cells in the system may be electrically connected similarly. While FIG. 11 shows bipolar plates and ribs, such a depiction is non-limiting, and other configurations (e.g., without bipolar plates, without ribs, etc.) are possible. FIG. 11 also shows optional flow fields 1011 separating electrochemical cells 1100, in accordance with certain embodiments. In some embodiments, one or more components (e.g., electrically conductive solids such as ribs) may establish channels between negative electrodes and positive electrodes of neighboring electrochemical cells. For example, ribs 1014 in FIG. 11 may have dimensions such that channels 1013 establish pathways for gas (e.g., gas mixtures) to flow between electrochemical cells 1011 and interact with the electrodes. For example, gas mixture 1075 may be passed through channel 1013, through flow field 1011, and between first electrochemical cell 1100a and second electrochemical cell 1100b, according to certain embodiments.

The flow of electrical current in certain embodiments described above may encounter less electrical resistance compared to other configurations. For example, in some embodiments in which electrochemical cells are connected in series via electrically conductive materials between at least some of a stack of electrochemical cells, electrical current can flow in a direction perpendicular to the stack. FIG. 11 shows one such example, where electrical current can flow in direction x perpendicular to electrochemical cells 1100, while gas mixture 1075 can flow in a direction parallel to electrochemical cells 1100. In FIG. 11, the path through which the current travels is relatively short and is determined by the thickness of bipolar plate 1012 and rib 1014. In some embodiments, a thickness of the one or more electrically conductive solids between electrochemical cells is less than or equal to 10 mm, less than or equal to 5 mm, less than or equal to 2 mm, less than or equal to 1 mm, and/or as low as 0.5 mm, as low as 0.2 mm, as low as 0.1 mm, or lower. In contrast, in embodiments in which electrochemical cells are electrically connected in parallel or electrically connected in series via external wiring, electrical current must flow through up to an entire height and/or length of electrodes (e.g., current collectors of electrodes) and through electrode tabs to reach the external wiring. Such heights and/or lengths may be, for example, at least 1 cm, at least 2 cm, at least 5 cm, at least 10 cm, and/or up to 20 cm, up to 50 cm, up to 100 cm, or more. The greater distances for current travel in such embodiments generally results in greater total cell resistance, which may reduce charge transport and/or energy efficiency for methods of at least partial gas separation described herein.

The electrochemical cells, systems, and methods described herein may be implemented in a variety of applications. The number of electrochemical cells or sets of cells may be scaled to the requirements of a particular application as needed. In some embodiments, the systems and methods described herein may be for removing $CO_2$ from ambient air, as well as enclosed spaces such as airtight building, car cabins—reducing the heating cost of incoming air for ventilation—and submarines and space capsules, where an increase in $CO_2$ levels could be catastrophic. In embodiments directed to the electrical power industry, they may be used for capturing carbon dioxide post-combustion at varying concentrations. In some embodiments, the systems and methods are suitable for separate target gases from industrial flue gas. Also, they may be used for capturing sulfur dioxide and other gases from flue gas. In embodiments directed to the oil and gas industry, the disclosed systems and methods may be used for capturing carbon dioxide and other gases from various processes and diverting them for downstream compression and/or processing. The disclosed systems and methods may be applied to capture carbon dioxide from burning natural gas used to heat the greenhouses in mild and cold climates, then diverting the captured dioxide into the greenhouse for the plants to use in photosynthesis, i.e., to feed the plants.

In some embodiments, a gas separation system described here can capture a target gas with a relatively high productivity. At a given gas stream flow rate though the gas separation system, the productivity with which a gas separation system captures a target gas from a gas mixture generally refers to the ratio of target gas captured during a gas capture process (measured in terms of mass and referred to herein as $kg_{target\ gas}$), divided by the mass of the bed of the gas separation system (referred to herein as $kg_{bed}$), multiplied by the breakthrough time (referred to as $t_b$). The bed of a gas separation system generally refers to the absorbent material of a gas separation system, such as a layer of electroactive species (e.g., a primary electroactive composite layer) of the electrochemical cells described herein. Those of ordinary skill in the art would understand that the breakthrough time of a gas separation system generally refers to the time required to reach saturation of the electrodes or for the outlet target gas concentration to begin to increase when flowing the gas mixture through the system during a capture process. A relatively high productivity may be desirable cases in which it is desirable for the gas separation system to perform with high efficiency even when the gas separation system is relatively small (e.g., having a total volume of less than or equal to 1,000 $ft^3$, less than or equal to 500 $ft^3$, less than or equal to 200 $ft^3$, less than or equal to 100 $ft^3$, less than or equal to 50 $ft^3$, less than or equal to 25 $ft^3$, less than or equal to 10 $ft^3$, and/or as low as 5 $ft^3$, as low as 2 $ft^3$, as low as 1 $ft^3$, as low as 0.1 $ft^3$, or less). Some such small gas separation systems may be particularly useful for ventilation systems or systems for direct air capture. One or more of the features described herein may contribute to the gas separation system having a relatively high productivity, such as the use of particular electroactive species, the use of porous electrodes, and the use of electrochemical cells having a first negative electrode, a second negative electrode, and a positive electrode between the first negative electrode and the second negative electrode).

In some embodiments, the gas separation system is configured to have a productivity for capturing a target gas (e.g., $CO_2$) of greater than or equal to 0.003, greater than or equal to 0.005, greater than or equal to 0.01, greater than or equal to 0.02, greater than or equal to 0.03 $kg_{target\,gas}/(kg_{bed}t_b)$, or greater at a gas stream flow rate of greater than or equal to 0.001 L/s and less than or equal to 500 L/s. In some embodiments, the gas separation system is configured to have a productivity have a productivity for capturing a target gas (e.g., $CO_2$) of less than or equal to 0.05, less than or equal to 0.04, less than or equal to 0.03, less than or equal to 0.02, less than or equal to 0.015 $kg_{target\,gas}/(kg_{bed}t_b)$, or less at a gas stream flow rate of greater than or equal to 0.001 L/s and less than or equal to 500 L/s. In some cases, the gas separation system is capable of these ranges of productivities even with gas mixtures comprising the target gas at relatively low concentrations and or with gas mixtures comprising potentially interfering gases such as oxygen gas, due to the contribution of certain features described herein. It should be understood that while a gas separation system may be configured to achieve the productivities described above when operated within the flow rate ranges described, the gas separation system may be operated, in some instances, in flow rates outside of the indicated flow rates, provided that under such the same configuration (e.g., electrochemical cell types, dimensions, arrangements), the indicated productivities are achieved. In some embodiments, the flow rates described herein refer to gas stream flow rates per negative electrode facial area. For example, in some embodiments, the flow rates described herein refer to gas stream flow rates per 100 $cm^2$ of negative electrode. In this context, negative electrode facial area can be a sum of facial area across multiple negative electrodes of multiple in electrochemical cells, in multiple stacks of electrochemical cells in the system. In some embodiments, the flow rates described herein refer to gas stream flow rates per stack of electrochemical cells in the system. For example, in some embodiments, the flow rates described herein refer to gas stream flow rates per 10 electrochemical cells in the system.

According to one or more embodiments, the gas mixture (e.g., a gas stream such as an input gas stream) is introduced to the gas separation system at a particular flow rate. In some embodiments, the flow rate is greater than or equal to 0.001 L/s, greater than or equal to 0.005 L/s greater than or equal to 0.01, greater than or equal to 0.05 L/s, greater than or equal to 0.1 L/s, greater than or equal to 0.5 L/s, greater than or equal to 1 L/s, greater than or equal to 5 L/s, greater than or equal to 10 L/s, greater than or equal to 50 L/s, greater than or equal to 100 L/s, or higher. In some embodiments, the flow rate of the gas mixture (e.g., a gas stream such as an input gas stream) is less than or equal to 500 L/s, less than or equal to 400 L/s, less than or equal to 300 L/s, less than or equal to 200 L/s, less than or equal to 100 L/s, less than or equal to 50 L/s, less than or equal to 10 L/s, less than or equal to 1 L/s, less than or equal to 0.5 L/s, less than or equal to 0.1 L/s, or less. Combinations of these ranges are possible. For example, in some embodiments, the flow rate is greater than or equal to 0.001 L/s and less than or equal to 500 L/s. As above, in some embodiments these flow rates are per 100 $cm^2$. In some embodiments these flow rates are per 10 electrochemical cells in the system.

Figures 8A, 8B:
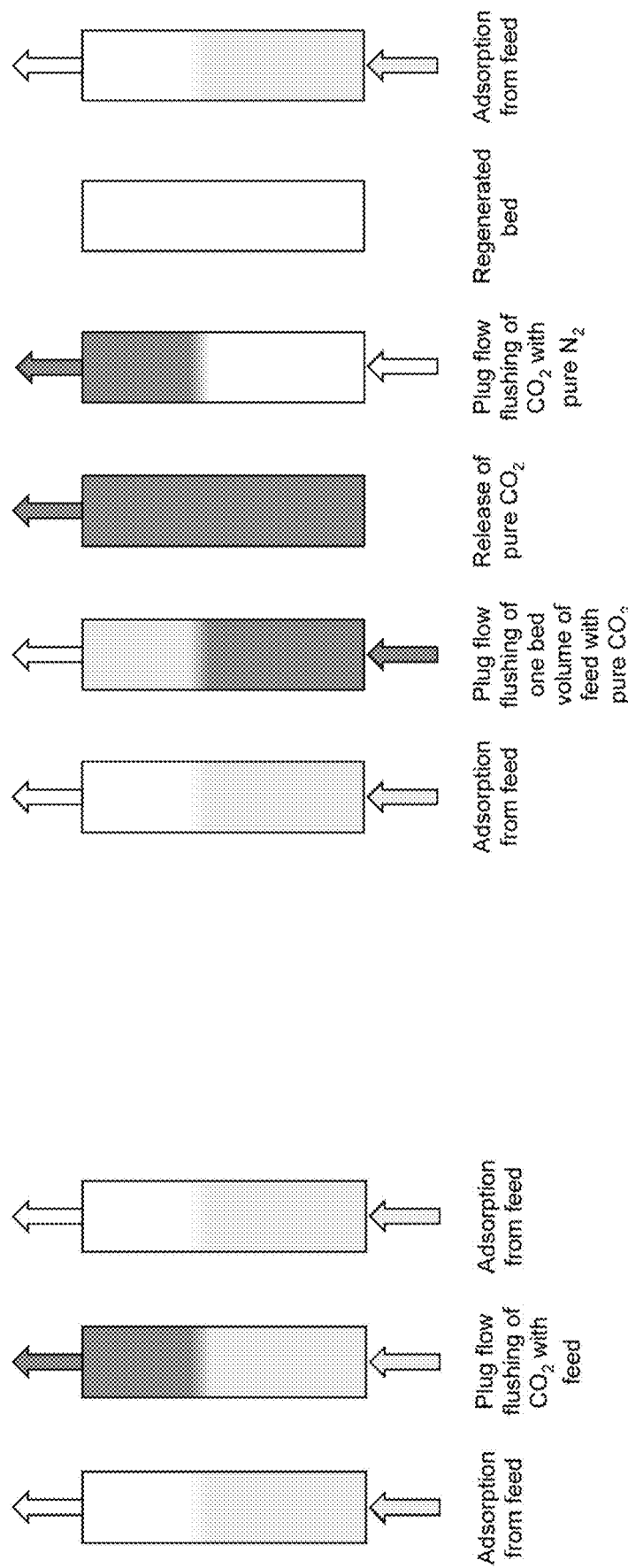
FIGS. 8A-8B show schematic diagrams of methods for flowing gases through beds of electrochemical devices, according to one or more embodiments.

Certain aspects described herein are related to methods of capturing and releasing a target gas. For example, certain embodiments comprise capturing a target gas by applying a first potential difference across an electrochemical cell (e.g., electrochemical cell 100) and exposing a first amount of an input gas mixture comprising a target gas to the electrochemical cell. The first amount of the input gas mixture may be exposed by flowing it as a gas stream through the electrochemical cell (or a gas separation system comprising a plurality of electrochemical cells), such as shown in FIGS. 5-7B. In some embodiments, during and/or after the applying the first potential difference, a portion of the target gas bonds with an electroactive species of the electrochemical cell to produce a first treated gas mixture. For example, the target gas (e.g., carbon dioxide) may bond with the first electroactive species of the negative electrode of the electrochemical cell when the first electroactive species is in at least one of its reduced states generated by the application of the potential across the electrochemical cell. Bonding of the target gas to the electroactive species may result in the treated gas mixture having a lower amount of the target gas than the first gas mixture (as described regarding ranges for amounts of target gas removed above). FIGS. 8A-8B and Example 2 below describe exemplary methods of flowing input gas mixtures and second gases. It should be understood that additional gases may be flowed in addition to the input gas mixture and the second gas (e.g., a third gas, a fourth gas, a fifth gas, etc.). The additional gases may be flowed through the electrochemical system before and/or after the second gas is flowed.

In some cases, a second potential difference is applied across the electrochemical cell after at least a portion of the target gas is bonded to the electroactive species. The second potential difference may be different than that first potential difference. In some embodiments, applying the second potential difference results in a step of releasing a portion or all of the target gas bonded with the electroactive species to produce a second treated gas mixture. The second treated gas mixture may have a higher amount of the target gas than the input gas mixture. For example, target gas may be present in the second treated gas mixture in an amount such that its volume percent is 10% higher, 20%, higher 50%, 100% higher, 200% higher, 1000% higher, and/or up to 2,000% higher, 5,000% higher, 10,000% higher, or more than the first amount of gas mixture.

In some embodiments, during and/or after the releasing of the target gas from the electroactive species, the method further comprises flowing a second gas through the electrochemical cell to remove at least a portion or all of the released target gas from the electrochemical cell. In some embodiments, the second gas is different than the input gas mixture. For example, the second gas may be an inert gas. In other cases, the second gas is a substantially pure gas of the target gas (e.g., greater than or equal to 99.9%, greater than 99.99%, greater than or equal to 99.999%, greater than 99.9999% pure, or more). For example, the second gas may be substantially pure $CO_2$. As another example, the second gas may comprise steam.

One exemplary situation in which it may be beneficial to pass a second gas through the electrochemical cell to remove at least a portion or all of the released target gas from the electrochemical cell is when the amount of captured target gas is greater than the volume of the bed of the electrochemical cell. In some such cases, more than one bed volume of the target gas bonds to the first electroactive species. For example, in some cases, the volume of target gas captured by the electrochemical cell is equal to at least 1.5 times, at least two times, at least three times, at least five times, at least 10 times, at least 20 times, or more greater than the volume of the bed of the electrochemical cell. In some such cases where the volume of the captured target gas is greater than the bed volume of the electrochemical cell, more than one bed volume of the target gas is released from the first electroactive species. In these cases, release of the captured target gas may cause the electrochemical cell to have a gas pressure greater than ambient gas pressure. In some such cases then, the released target gas will flow out of the electrochemical cell by virtue of the force of the pressure differential created with the ambient atmosphere until approximately 1 bed volume of target gas remains. To remove remaining released target gas, the second gas may be flowed through the electrochemical cell. In some cases, substantially pure target gas (e.g., $CO_2$) is flowed through to remove remaining target gas. In other cases, an inert gas (e.g., nitrogen gas, $N_2$) is flowed through the electrochemical cell to remove remaining released target gas.

Another situation in which it may be beneficial to flow a second gas through the electrochemical cell to remove at least a portion or all of the released target gas from the electrochemical cell is when the amount of captured target gas is less than or equal to the volume of the bed of the electrochemical cell. For example, in some cases, the volume of target gas captured by the electrochemical cell is less than or equal to at 1.0 times, less than or equal to 0.8 times, less than or equal to 0.5 times, less than or equal to 0.3 times, and/or as low as 0.2 times, as low as 0.1 times, as low as 0.01 times, or less in the volume of the bed of the electrochemical cell. In some such cases, the pressure inside the bed of the electrochemical cell will be less than or equal to that of ambient pressure. In these cases, it may be advantageous to flow a second gas through the electrochemical cell to provide force necessary to remove the released target gas from the electrochemical cell. In some such cases, the second gas is a carrier gas. A carrier gas may be any suitable gas that can transport the target gas while not reacting with the target gas or the electrochemical cell components. The carrier gas may be readily separable from the target gas via any of a variety of techniques that are less cost or energy-intensive as the initial separation of the target gas from the gas mixture. For example, the target gas and the carrier gas may be separable via condensation or flash separation techniques. The carrier gas may be flowed through the electrochemical cell during the step of releasing the target gas and/or after the step of releasing the target gas. In some cases, the carrier gas is an inert gas. In certain cases, the carrier gas is substantially pure target gas (e.g., substantially pure $CO_2$). In certain cases, the carrier gas comprises steam. In some embodiments, the second gas (e.g., a carrier gas) is a second portion of the input gas mixture. For example, in a ventilation application, an amount of the target gas may be removed from ventilated air during the application of the first potential across electrochemical cell, and then during and/or after the release of the target gas, more ventilated air is flowed through the electrochemical cell to remove released target gas.

In some embodiments, during and/or after the step of releasing the target gas, the method further comprises applying a vacuum condition to the electrochemical cell to remove at least a portion or all of the released target gas from the electrochemical cell. One of ordinary skill, with the benefit of this disclosure, would understand suitable techniques and equipment for applying a vacuum condition to the electrochemical cell. For example, a vacuum pump may be fluidically connected to a gas outlet of the electrochemical cell. The vacuum pump may be operated to produce a negative pressure differential between the electrochemical cell bed and a downstream location. This vacuum condition may provide a force sufficient to cause target gas released during the releasing step described above to flow out of the electrochemical cell. The vacuum condition may be applied such that the pressure inside the electrochemical cell during and/or after the releasing of the target gas is less than or equal to 2000 torr, less than or equal to 1500 torr, less than or equal to 1200 torr, less than or equal to 1000 torr, less than or equal to 900 torr, less than or equal to 800 torr, less than or equal to 760 torr, less than or equal to 700 torr, less than or equal to 500 torr, less than or equal to 100 torr, less than or equal to 50 torr, less than or equal to 10 torr, and/or as low as 5 torr, as low as 1 torr, as low as 0.5 torr, as low as 0.1 torr, or lower. A vacuum condition may be applied such that the pressure inside the electrochemical cell during and/or after the releasing of the target gas is less than a pressure of an environment surrounding a gas separation system comprising the electrochemical cell. Such an environment may be ambient conditions on Earth at sea level, such that the vacuum condition establishes a pressure inside the electrochemical cell during and/or after releasing of the target gas of less than or equal to 760 torr, less than or equal to 100 torr, less than or equal to 10 torr, etc. However, an environment surrounding the gas separation system may be pressurized, such as in some instances where the gas separation system is in a pressurized structure such as a spacecraft (which may be pressurized to 1.2 times atmospheric pressure at sea level). Under some such pressurized environments, the vacuum condition establishes a pressure inside the electrochemical cell during and/or after releasing of the target gas of, for example, 2000 torr, less than 1000 torr, etc.

In some embodiments in which a target gas (e.g., $CO_2$) is released from the electrochemical cell, the released target gas may be handled in any of a variety of ways. For example, the released target gas may be expelled from the electrochemical cell (and gas separation system) at the same partial pressure established upon initial release. The released target gas may subsequently be expelled into a surround environment as exhaust, or it may be directed (e.g., via flowing) for further downstream processing. In some embodiments, the released target gas may be incorporated into a fluid mixture (e.g., gas mixture) having a relatively high partial pressure of the target gas (e.g., greater than or equal to 10 bar, greater than or equal to 20 bar, greater than or equal to 50 bar, greater than or equal to 50 bar, greater than or equal to 75 bar, greater than or equal to 100 bar, and/or up to 110 bar, up to 120 bar, up to 150 bar, or higher). In some embodiments, the partial pressure of the resulting fluid mixture is greater supercritical (e.g., greater than 130 bar for carbon dioxide). Incorporation into a fluid mixture may be achieved in some instances by combining the released target gas with a fluid mixture already comprising the target gas (thereby increasing a partial pressure of the target gas). In some embodiments, the target gas is incorporated into the fluid mixture having a relatively high partial pressure of the target gas by compressing the released target gas. One of ordinary skill in the art, with the benefit of this disclosure, would understand how to compress released target gas (e.g., $CO_2$) expelled from the electrochemical cell, e.g., using standard compressor equipment and techniques.

In some embodiments, the negative electrode or a portion thereof (e.g., an electroactive composite layer of the negative electrode when present) has a particular capacity for absorbing target gas (e.g., $CO_2$). For example, in some embodiments, the negative electrode or a portion thereof (e.g., an electroactive composite layer of the negative electrode when present) has an absorption capacity of at least 0.01 mol per $m^2$, at least 0.02 mol per $m^2$, at least 0.05 mol per $m^2$, or more. In some embodiments, the negative electrode or a portion thereof (e.g., an electroactive composite layer of the negative electrode when present) has an absorption capacity of less than or equal to 0.1 mol per $m^2$, less than or equal to 0.08 mol per $m^2$, less than or equal to 0.5 mol per $m^2$, less than or equal to 0.03 mol per $m^2$, or less. Combinations of these ranges are possible. For example, in some embodiments, the negative electrode or a portion thereof (e.g., an electroactive composite layer of the negative electrode when present) has an absorption capacity of at least 0.01 mol per $m^2$ and less than or equal to 0.1 mol per $m^2$, or at least 0.01 mol per $m^2$ and less than or equal to 0.03 mol per $m^2$ In some embodiments, the negative electrode or portion thereof (e.g., an electroactive composite layer of the negative electrode when present) is be able to absorb target gas (e.g., $CO_2$) at a particular rate. For example, in some embodiments, the negative electrode or portion thereof (e.g., an electroactive composite layer of the negative electrode when present) has an absorption capacity rate of at least 0.0001 mol per $m^2$ per second, at least 0.0002 mol per $m^2$ per second, at least 0.0005 mol per $m^2$ per second, or more. In some embodiments, the negative electrode or portion thereof (e.g., an electroactive composite layer of the negative electrode when present) has an absorption capacity rate of less than or equal to 0.001 mol per $m^2$ per second, less than or equal to 0.0008 mol per $m^2$ per second, less than or equal to 0.0005 mol per $m^2$ per second, or less. In some embodiments, the electroactive composite layer has an absorption capacity rate of at least 0.0001 and less than or equal to 0.0005 mol per $m^2$ per second. Other absorption capacities rates are also possible.

In some embodiments the electroactive composite layer of a negative electrode may have a particular surface area that is exposed to the gas mixture, for example, of greater than or equal to 5 $cm^2$, greater than or equal to 8 $cm^2$, greater than or equal to 10 $cm^2$, and/or up to 10 $cm^2$, up to 20 $cm^2$, up to 50 $cm^2$, up to 1 $m^2$, or more. Other values are also possible.

In some embodiments, at least a portion or all of an electrode (e.g., negative electrode, positive electrode) described herein is comprises a porous material. A porous electrode may be made of any suitable material and/or may comprise any suitable shape or size. In a non-limiting embodiment, the electrode comprises a porous carbonaceous material. The term carbonaceous material is given its ordinary meaning in the art and refers to a material comprising carbon or graphite that is electrically conductive. Non-limiting example of carbonaceous materials include carbon nanotubes, carbon fibers (e.g., carbon nanofibers), and/or graphite. In some such embodiments, the electrode may be partially fabricated from the carbonaceous material or the carbonaceous material may be deposited over an underlying material. The underlying material generally comprises a conductive material, for example, a metal and/or metal alloy solid (e.g., steel, copper, aluminum, etc.). Other non-limiting examples of conductive materials are described herein.

In some embodiments, an electrode (e.g., the negative electrode, the positive electrode) is porous. The porosity of an electrode may be measured as a percentage or fraction of the void spaces in the electrode. The percent porosity of an electrode may be measured using techniques known to those of ordinary skill in the art, for example, using volume/density methods, water saturation methods, water evaporation methods, mercury intrusion porosimetry methods, and nitrogen gas adsorption methods. In some embodiments, the electrode is at least 10% porous, at least 20% porous, at least 30% porous, at least 40% porous, at least 50% porous, at least 60% porous, at least 70% porous or greater. In some embodiments, the electrode is up to 90% porous, up to 85% porous, up to 80% porous, up to 70% porous, up to 50% porous, up to 30% porous, up to 20% porous, up to 10% porous or less. Combinations of these ranges are possible. For example, the electrode may be at least 10% porous and up to 90% porous. The pores may be open pores (e.g., have at least one part of the pore open to an outer surface of the electrode and/or another pore). In some cases, only a portion of the electrode is porous. For example, in some cases, only a single surface of the electrode is porous. As another example, in some cases, the outer surface of the electrode is porous and the inner core of the electrode is substantially non-porous (e.g., less than or equal to 20%, less than or equal to 10% porous, less than or equal to 5% porous, less than or equal to 1% or less). In a particular embodiment, the entire electrode is substantially porous.

In some embodiments, the electrochemical cell has a particular cycle time. The cycle time of an electrochemical cell generally refers to the period of time in performance of one charge mode and one discharge mode. The cycle time may be at least 60 seconds, at least 100 seconds, at least 300 seconds, at least 500 seconds, at least 1000 seconds, or more. In some embodiments, the cycle time is less than or equal to 3600 seconds, less than or equal to 2400 seconds, less than or equal to 1800 seconds, or less. Combinations of these ranges are possible. For example, in some embodiments, the cycle time is at least 60 seconds and less than or equal to 3600 seconds, or at least 300 seconds and less than or equal to 1800 seconds.

According to some embodiments, the electrochemical cell and its components have a particular thickness, depending on the desired application (e.g., gas separation of ventilator air, direct air capture, etc.). In some embodiments, the electrochemical cell has a thickness of at least 10 µm, at least 20 µm, at least 50 µm, at least 100 µm, at least 200 µm, at least 300 µm, at least 500 µm, or greater. In some embodiments, the electrochemical cell has a thickness of less than or equal to 750 µm, less than or equal to 600 µm, less than or equal to 500 µm, less than or equal to 300 µm, or less. Combinations of these ranges are possible. For example, in some embodiments, the electrochemical cell has a thickness of at least 200 µm and less than or equal to 750 µm. In some embodiments, the electrochemical cell has a thickness of at least 10 µm and less than or equal to 750 µm.

In some embodiments, the negative electrode or the positive electrode has a thickness of at least 0.5 µm, at least 1 µm, at least 2 µm, at least 5 µm, at least 10 µm, at least 20 µm, at least 50 µm, at least 75 µm, at least 100 µm or more. In some embodiments, the negative electrode or the positive electrode has a thickness of less than or equal to 200 µm, less than or equal to 150 µm, less than or equal to 100 µm, or less. Combinations of these ranges are possible. For example, in some embodiments, the negative electrode or the positive electrode has a thickness of at least 50 µm and less than or equal to 200 µm. In some embodiments, in some embodiments, the negative electrode or the positive electrode has a thickness of at least 0.5 µm and less than or equal to 200 µm.

In some embodiments, the electroactive composite layer of the negative electrode or the positive electrode has a thickness of at least 10 nm, at least 20 nm, at least 40 nm, at least 0.1 µm, at least 0.2 µm, at least 0.5 µm, at least 1 µm, at least 2 µm, at least 5 µm, at least 10 µm, at least 50 µm, at least 100 µm or more. In some embodiments, the electroactive composite layer of the negative electrode or the positive electrode has a thickness of less than or equal to 200 µm, less than or equal to hundred 50 µm, less than or equal to hundred micrometers, less than or equal to 50 µm, less than or equal to 20 µm, less than or equal to 10 µm, less than or equal to 5 µm, less than or equal to 2 µm, less than or equal to 1 µm, less than or equal to 0.5 µm, less than or equal to 0.2 µm, less than or equal to 0.1 µm, or less. Combinations of these ranges are possible. For example, in some embodiments, the electroactive composite layer of the negative electrode or a positive electrode has a thickness of greater than or equal to 10 µm and less than or equal to 200 µm. In some embodiments, the electroactive composite layer of the negative electrode or a positive electrode has a thickness of greater than or equal to 10 nm and less than or equal to 100 nm, or greater than or equal to 50 nm and less than or equal to 500 nm.

Various components of a system, such as the electrodes (e.g., negative electrode, positive electrodes), power source, electrolyte, separator, container, circuitry, insulating material, etc. can be fabricated by those of ordinary skill in the art from any of a variety of components. Components may be molded, machined, extruded, pressed, isopressed, infiltrated, coated, in green or fired states, or formed by any other suitable technique. Those of ordinary skill in the art are readily aware of techniques for forming components of system herein.

The electrodes described herein (e.g., negative electrode, positive electrodes) may be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, etc.). Additionally, the electrode may comprise a means to connect the electrode to another electrode, a power source, and/or another electrical device.

Various electrical components of system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

U.S. Provisional Application No. 62/892,962, filed Aug. 28, 2019, and entitled "Electrochemically Mediated Carbon Capture from Low Concentration Streams," U.S. patent application Ser. No. 15/335,258, filed Oct. 26, 2016, and entitled "Electrochemical Process for Gas Separation," U.S. patent application Ser. No. 16/659,398, filed Oct. 21, 2019, and entitled "Electrochemically Mediated Gas Capture, Including from Low Concentration Streams," and International Patent Application No. PCT/US2019/057224, filed Oct. 21, 2019, and entitled "Electrochemically Mediated Gas Capture, Including from Low Concentration Streams," are each incorporated herein by reference in its entirety for all purposes.

The following examples are intended to illustrate certain embodiments of the present invention, but do not exemplify the full scope of the invention.

Example 1

This example describes experimentation, embodiments, and non-limiting theories regarding the effect of oxygen electrochemistry and reactivity on the electrochemical separation of target gases from gas mixtures, and methods described herein. The materials and parameter values described in this example are non-limiting and by way of example, only.

In an electrochemical process, the superoxide ion can be generated either through heterogeneous one-electron reduction on electrode surfaces or through homogeneous one-electron transfer reaction of redox-active molecules with dissolved $O_2$. In DMF electrolyte solution, it has been reported that $O_2$ showed a quasi-reversible electron transfer to form superoxide ion with a half-wave potential of −1.35 V (0.87 V vs standard calomel electrode (SCE) reference electrode). To limit or prevent the generation of superoxide through heterogeneous reduction on electrode surfaces, it has been discovered in the context of the present disclosure that the half-wave reduction potentials to activate quinones should, in some cases, be more positive than the half-wave potential of the formation of superoxide ion. Furthermore, the reduced quinones are able to undergo homogeneous one-electron transfer reactions with $O_2$ if the half-wave reduction potentials of the quinones are more negative than that of the $O_2$. The formation of the superoxide ion follows either $Q^{\bullet-}+O_2 \leftrightarrow Q+O_2^{\bullet-}$ or $Q^{2-}+O_2 \leftrightarrow O_2^{\bullet-}+O_{2,-}$ reactions. In the case of weakly complexing quinones, it has been determined that the electrode potentials should be sufficiently negative to form the dianion quinones required, in some cases, for the carboxylation with $CO_2$, whereas in the case of strongly complexing quinones, the formation of semiquinones is sufficient to facilitate the complexation with $CO_2$. In the case of weakly associating quinones, the equilibrium constant of electron transfer from dianion quinones to $O_2$ can be calculated using $$K_{reaction} = \exp\frac{F}{RT}\left(E^{\frac{1}{2}}_{O_2/O_2^{\bullet-}} - E^{\frac{1}{2}}_{Q^{\bullet-}/Q^{2-}}\right)$$

In the case of strongly associating quinones, the equilibrium constants of electron transfer from semiquinones to $O_2$ can be calculated using $$K_{reaction} = \exp\frac{F}{RT}\left(E^{\frac{1}{2}}_{O_2/O_2^{\bullet-}} - E^{\frac{1}{2}}_{Q/Q^{\bullet-}}\right)$$

where, $$E^{\frac{1}{2}}_{Q/Q^{\bullet-}} \text{ and } E^{\frac{1}{2}}_{Q^{\bullet-}/Q^{2-}}$$

are the formal standard reduction potentials of the first and second electron transfers, respectively, to the quinones, and $$E^{\frac{1}{2}}_{O_2/O_2^{\bullet-}}$$

is the formal standard reduction potential for $O_2$ reduction. Cyclic voltammetry was performed to measure or approximate the standard reduction potentials of a variety of quinones. Tables 1 and 2 summarize the equilibrium constants measured and determined for the various quinones. The equilibrium constant for the DBQ semiquinone and $O_2$ from this example's calculations ($K_{reaction}$=49.0 M$^{-1}$) is similar to a previously reported experimental value ($K_{reaction}$= 43.8±3.8 M$^{-1}$).

TABLE 1

Equilibrium reactions of dianions of weakly complexing quinones and $O_2$.

| Compound | $\Delta E = E^{\frac{1}{2}}_{O_2} - E^{\frac{1}{2}}_{2,N_2}$ (mV) | $K_{reaction}$ (M$^{-1}$) |
|---|---|---|
| AQ—CONH—C$_4$H$_9$ | 700 | 6.80 × 10$^{11}$ |
| AQ—COO—C$_3$H$_7$ | 650 | 9.71 × 10$^{10}$ |
| AQ—Cl | 650 | 9.71 × 10$^{10}$ |
| p-NQ—Cl$_2$ | 400 | 5.77 × 10$^{6}$ |
| BQ—Cl$_4$ | 70 | 15.2 |
| BQ—Cl$_2$ | 310 | 1.74 × 10$^{5}$ |

TABLE 2

Equilibrium reactions of semiquinones of strongly complexing quinones and $O_2$.

| Compound | $\Delta E = E^{\frac{1}{2}}_{O_2} - E^{\frac{1}{2}}_{1,N_2}$ (mV) | $K_{reaction}$ (M$^{-1}$) |
|---|---|---|
| PQ-ester | −400 | 1.73 × 10$^{-7}$ |
| PQ—I | −390 | 2.56 × 10$^{-7}$ |
| PQ—I$_2$ | −310 | 5.75 × 10$^{-6}$ |
| PQ | −180 | 9.07 × 10$^{-4}$ |
| o-NQ | −280 | 1.85 × 10$^{-5}$ |
| AQ—O—C$_3$H$_7$ | 80 | 22.5 |
| AQ | 40 | 47.4 |
| p-NQ—Me$_2$ | −90 | 3.01 × 10$^{-2}$ |
| p-NQ | −80 | 9.07 × 10$^{-4}$ |
| TBQ | −130 | 6.35 × 10$^{-3}$ |
| DBQ | 100 | 49.0 |
| BQ | −300 | 1.73 × 10$^{-7}$ |

Figure 9:
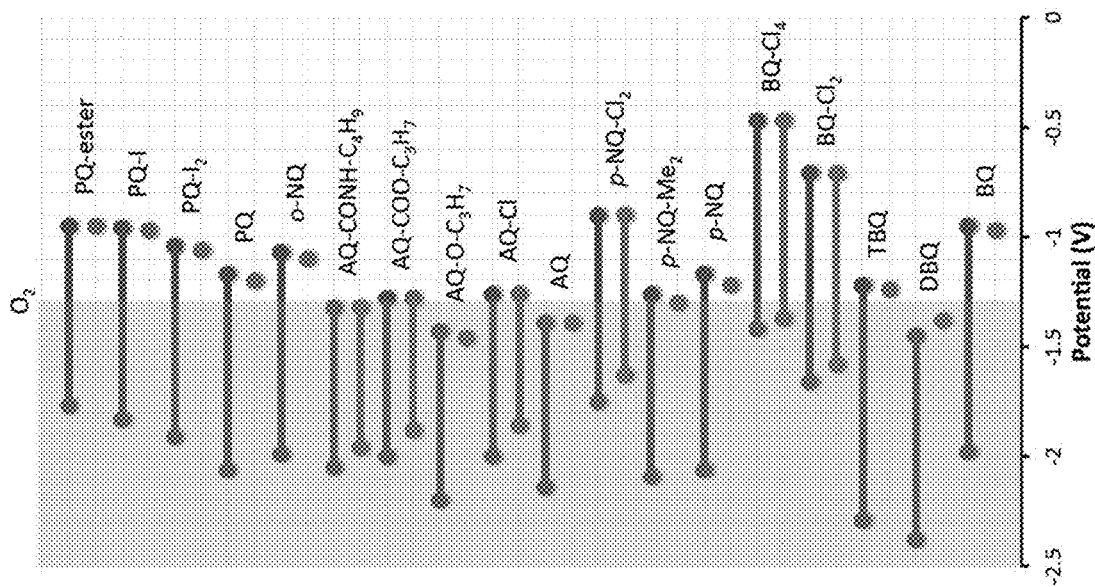
FIG. 9 shows tabulated electrochemical data for various quinones and oxygen gas, according to one or more embodiments.

Based on the reaction constants, none of the weakly associating quinones is suitable for electrochemical $CO_2$ separations in the presence of $O_2$ under the conditions measured, because the electron transfer from dianion quinones to $O_2$ was favorable and would generate the superoxide ion in the system. Several of strongly associating quinones were determined to be suitable for electrochemical $CO_2$ separation in the presence of $O_2$: PQ-ester (the phenanthrenequinone ethyl ester), PQ-I, PQ-I$_2$, PQ, o-NQ, p-NQ-Me$_2$, p-NQ, TBQ and BQ. The peak potentials of the reduction waves under $N_2$ and $CO_2$ for the various quinone structures measured in this example are summarized in FIG. 9. FIG. 9 shows tabulated cyclic voltammetric results of a 20 mM solution of various quinones shown in Scheme 1 in dry 0.1 M n-tetrabutylammonium hexafluorophosphate ([n-Bu$_4$N]PF$_6$) dimethylformamide (DMF) electrolyte saturated with either $N_2$ (top circular symbols connected by lines for each quinone) or $CO_2$ (lower circular symbol for each quinone) at a scan rate of 100 mV/s. The filled circular symbols represented the half-wave potentials of the first electron transfer from quinones to semiquinones (right symbol) and the second electron transfer (left symbol), which occurs at more negative electrode potential, from semiquinones. The half-wave potentials can be used to approximate the standard reduction potential of the conversions.

Scheme 1. Structures and Names of Quinone Molecules Measured in this Example.

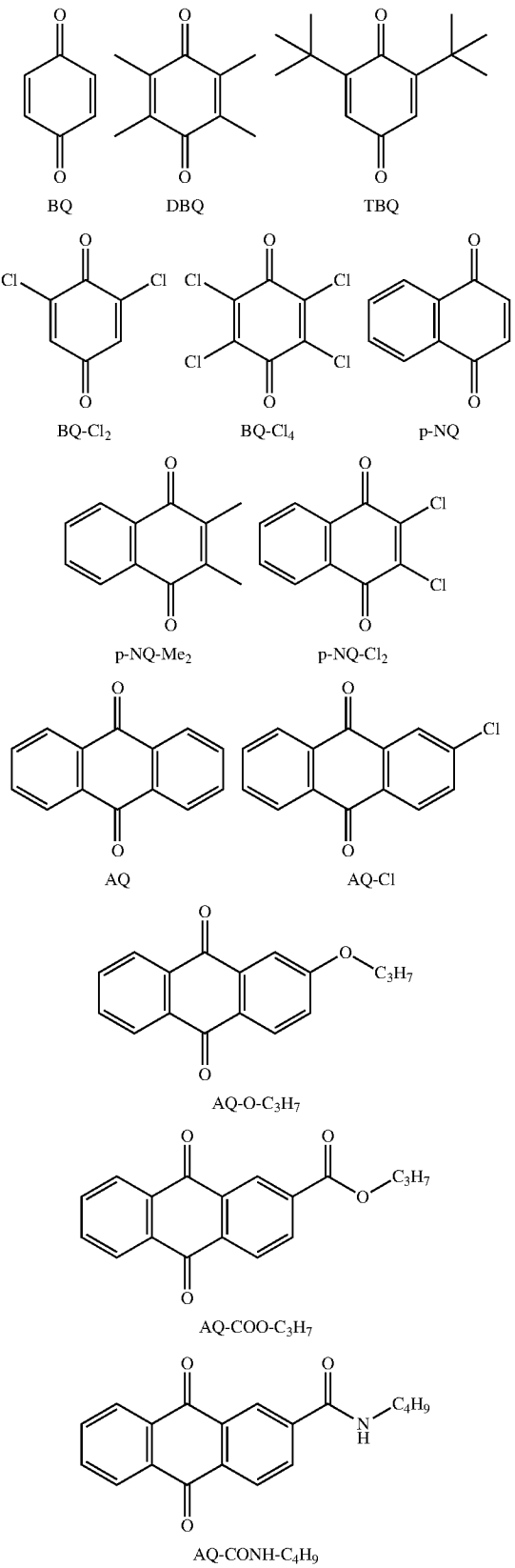

-continued

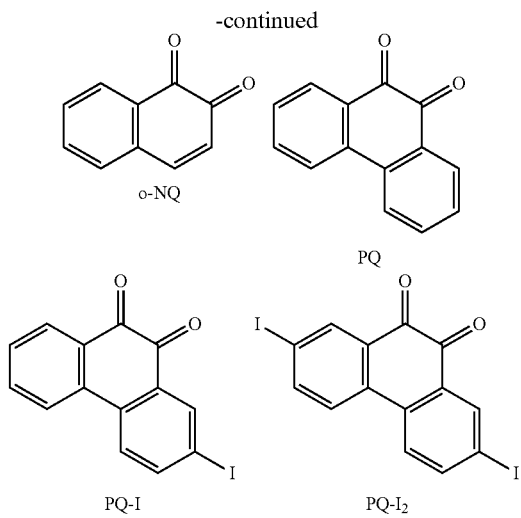

o-NQ

PQ

PQ-I

PQ-I$_2$

The two reduction waves and larger negative electrode potentials required for the carboxylation of the weakly-complexing quinones preclude, in certain cases their use as complexing agents in CO$_2$ separations. This is not the case for some strongly-complexing quinones, which exhibited adequate redox characteristics for the effective separation of CO$_2$ from gas mixtures, particularly those containing O$_2$. During the complexation step, these compounds can be activated electrochemically to form semiquinones with electrode potentials ranging from −0.87 V to −1.07 V, which are, as desired in this case, more positive than the −1.35V at which the undesirable superoxide anion forms on the electrode.

These experimental results demonstrated that it is possible to determine suitable electroactive species having at least one reduced state capable of bonding with an exemplary target gas (CO$_2$) while not being able to react with oxygen gas. This example also demonstrates one exemplary way of making such a determination for a given candidate electroactive species.

Example 2

This example describes embodiments, and non-limiting theories regarding the methods of capturing and releasing exemplary target gases (e.g., CO$_2$), and methods described herein, including for ventilation and direct air capture applications. The materials and parameter values described in this example are non-limiting and by way of example, only.

The device of this example can be used in a number of carbon capture applications a variety of possible scales, with low concentrations or with CO$_2$-rich streams and compositions. These application can be categorized into those where the goal is the removal of CO$_2$ and those where the goal is upgrading the CO$_2$ for downstream sequestration or processing.

When Recovery of CO$_2$ is Not of Importance

The released CO$_2$ in these applications is usually discarded because of its small volume compared to the volume of total gas being treated, other than in direct air capture (DAC). Therefore, this mode of operation is mainly of interest to applications where the feed concentration is <1% CO$_2$ (10,000 ppm), which is advantageous for ventilation applications. Here, CO$_2$ is removed from the input gas mixture ("feed stream") and the bed of the electrochemical cell is saturated. Then pure CO$_2$ is released into the same inlet stream which is used to purge the bed during the release to regenerate the bed. The energy of the capture may not be of great importance in this mode either, because the bed has to be regenerated at a much lower frequency than in other mode ~10-50 times/day. Also, the energetic cost of the advection of inlet air via fans becomes comparable to energy of capture. Hence, full bed activation and full bed regeneration can be performed before adsorption. This will increase the energy of capture to about 120 kJ/mol. FIG. 8A shows a schematic diagram of a non-limiting example of method of flowing input gas mixtures and other gases (e.g., second gases) under these conditions.

Ventilation (Feed Concentration: 1,000-5,000 ppm CO$_2$)

Removal of metabolic CO$_2$ from buildings and other structures has been recently gaining more traction to improve the efficiency of HVAC (Heating, ventilation, and air conditioning) systems via the reduction of the heating required for incoming air. The indoors CO$_2$ concentration in human habited areas is maintained at less than 5,000 ppm by constantly replacing the air indoors with fresh outside air up to ten times a day. The temperature moderation required for the replacement air, be it cooling or heating, often results in the exorbitant energy consumption typical of residential and commercial buildings. However, it has been realized that it is possible to recirculate indoor air for much longer, with intermittent replacements that are of much smaller volume, if CO$_2$ is removed from the air.

While removing volatile organic compounds (VOC) and other indoor air pollutants which occur in <100 ppm concentrations via physical filtration, and the occasional dehumidification, CO$_2$ can be directly captured from recirculating air by the electrochemical cells and gas separation systems described herein. Feed air is depleted of CO$_2$ upon capture and is used to purge the bed upon release, where the outlet flow of the bed is diverted outdoors. Constant current release at high currents can achieve high rates of regeneration of bed, though not full generation.

The bed volume required per person can be calculated by scaling the fabricated device. At a rate of CO$_2$ generation of ~22 mol/day·person and a bed saturation period of ~0.5 h, i.e. a regeneration frequency of about 50/day, an electrochemical cell bed of 0.8-1×10$^{-2}$ m$^3$ (8-10 L) is required per person. This can be readily integrated into the existing HVAC system, where given the standard ventilation requirements of 7.5 L/s·person[1] and a temperature difference of 25° C. between indoors and outdoors, energy consumption reduction of up to 60% can be expected. Heating or cooling at this ventilation rate would require >150 W, while the electrochemical methods described herein, at the human rate of generation of 250 μmol/s at 120 kJ/mol, would require ~30 W. By reducing the total air replacement requirement to 20% the mandated value, the total energy consumption should not exceed 60 W.

The electrochemical cells and gas separation systems and methods described herein can also be used for ventilation of car cabins, where the mode of operation would be very similar to that of indoor ventilation, with the possibility of a smaller bed and more frequent regeneration. In addition to that, electrochemical ventilation units can be installed onboard spacecraft and space stations, where removal of CO$_2$ is the only possible mechanism of ventilation. Current NASA requirements for the International Space Station (ISS) call for the removal of ~4 kg/day of CO$_2$. Current pressure swing adsorption (PSA) or temperature swing adsorption (TSA) systems operate at 300 W. The regeneration of the bed in this case can be performed by release of pure CO$_2$ into the vacuum of space with the inlet valve shut close. But more recently, given NASA's "zero waste" policy, there is interest in the valorization of captured $CO_2$ to other useful compounds and oxygen. In this case, the electrochemical system described herein has to operate in the $CO_2$-recovery mode.

Recovery of $CO_2$ is of Importance

One possible use for $CO_2$ capture in this mode of operation is the upgrade of $CO_2$ concentration, from low inlet concentrations to nearly pure $CO_2$, for downstream sequestration or valorization. The capture of $CO_2$ by the electrochemical methods described herein in this mode proceeds in a similar manner as before. For high feed concentrations and where the energetics of capture are of importance, the adsorption can be performed by the activation of the half bed followed by a constant potential capture. Although full bed activation is also possible for when the inlet concentration is very low, and the disconnection of electric power supply is desired.

However, the release of pure $CO_2$ is performed with the inlet sealed, after rinsing the bed with a stream of pure $CO_2$ just before breakthrough to remove the column of $CO_2$-lean gas. This is followed by the removal of the last column of $CO_2$ by rinsing with pure $N_2$, as shown in FIG. 6. The flow rate of pure $CO_2$ and $N_2$ during the rinse steps, before and after the release respectively, is very high to achieve Re>2000, which ensures a plug flow with a sharp front. This minimizes mixing at the interface of the gas columns which allows for sharp transitions from one gas to another at the outlet. FIG. 8B shows a schematic diagram of a non-limiting example of method of flowing input gas mixtures and other gases (e.g., second gases) under these conditions.

Water content in exhaust—and in indoor air—may have negative effects on the electrochemical cells, which include the dissolution of electrolyte ionic liquid (IL), and the diminishing of the electrode capacity by competing with $CO_2$ for reaction with reduced quinones. This can be avoided in some cases by using hydrophobic ILs which repel water from the wetted electrodes. Hydrophobic ILs usually have highly fluorinated cations and anions, like bis[trifluoromethyl)sulfonyl]imide [$Tf_2N^-$], which further improve the solubility of $CO_2$ in IL and potentially enhance its transport through the electrode.

Direct Air Capture (DAC) (e.g., Feed Concentration: 300-400 ppm $CO_2$)

With increased interest in carbon-negative technologies as ways of offsetting carbon footprint, DAC is gaining prominence. However, most existing sorbent material considered, or being developed, for DAC, require thermal regeneration; a process associated with energy loss to the sorbent and other matrix material used.

The thermodynamic minimum work for the recovery of 100% of $CO_2$ at 100% purity from a binary gas mixture is given by:

$$W_{min} = -RT\left[\ln y + \left(\frac{1-y}{y}\right)\ln(1-y)\right]$$

where R is the gas constant, T is the temperature and y is the molar fraction of $CO_2$ in the binary mixture. The equation above shows that the minimum work of separation increases dramatically as the concentration of $CO_2$ decreases to reach values of ~22 kJ/mol at 400 ppm, the average atmospheric concentration of $CO_2$. But the charge-discharge electrochemistry of quinones has a minimum V-Q work that is greater than that. Therefore, the energy required for DAC using the electrochemical methods described herein is independent of inlet $CO_2$ concentration.

The capture process can proceed via either half bed or full bed activation. However, given the energy economy consideration of DAC technologies, it is in some cases recommended to capture at a constant potential after the activation of the half bed. The release process may follow the scheme described in FIG. 8B to allow the recovery of pure $CO_2$. The frequency of regeneration of beds in DAC, even for small beds at reasonable inlet flow rates, is very small, and the period of capture can be on the order of days.

While the electrochemical systems and methods described here have been determined to allow DAC at ~45 kJ/mol, which is lower than many of the thermally regenerated system (55-130 kJ/mol), additional expenditure may be incurred when operating fans to force the advection of air through the electrochemical cells. It electrochemical devices described herein have been fabricated and found to have a pressure drop, at flow rates of 1-2 L/min, of not more than 100 Pa. A larger pressure differential may however be required in some cases to allow for the physical filtration of dust and other air pollutants.

Example 3

This example describes experimentation, embodiments, and non-limiting theories regarding the electrochemically-mediated reactivity of certain electroactive species with a target gas. The materials and parameter values described in this example are non-limiting and by way of example, only.

To demonstrate reactivity of non-limiting examples of electroactive species with carbon dioxide, cyclic voltammetry experiments were performed with optionally-substituted quinones mentioned above in the presence of carbon dioxide and in an inert nitrogen atmosphere. Cyclic voltammetry of weakly complexing quinones were also performed.

Cyclic voltammetry measurements were carried out with a standard three-electrode cell using a Parstat 3000-A potentiostat with VersaStudio™ software from Princeton Applied Research. Electrochemical measurements were conducted in a glass cell, and the temperature of the solution was maintained at the defined temperatures. The platinum working electrode was purchased from BASi. Platinum wire served as the counter electrode and a leakless Ag/AgCl reference electrode was used. Ferrocene was used as the internal standard for. An electrolyte of 0.1 M [n-$BU_4N$]$PF_6$ in DMF was used. The solution was carefully purged with nitrogen with gentle stirring for 30 min and a nitrogen atmosphere was maintained during the electrochemical experiments.

Weakly Complexing Quinones

Five weakly complexing quinones mentioned in Example 1 were categorized based on their reactivity with carbon dioxide upon electrochemical reduction. The weakly complexing quinones were tetrachloro-p-benzoquinone (BQ-$Cl_4$), 2,7-dichlorobenzoquinone (BQ-$Cl_2$), 2-3-dichloro-p-naphthquinone (p-NQ-$Cl_2$), 2-chloro-9,10-anthraquinone (AQ-Cl), 9,10-anthraquinone 2-propanoate ester (AQ-COO—$C_3H_7$), and 9,10-anthraquinone butyl amide derivative (AQ-CONH—$C_4H_9$), based on the effect their interaction with $CO_2$ had on their redox properties. FIG. 12a shows cyclic voltammograms of AQ-Cl under $N_2$ (left) and $CO_2$ (right) atmospheres at a scan rate of 100 mV/s. The results with AQ-Cl were representative of the other four indicated weakly complexing quinones. When the electrolyte solution was saturated with $CO_2$, no changes were observed in either the cathodic or the anodic waves of the first electron transfer (at the more positive potential), but the cathodic waves of the second electron transfer were shifted positively, and the oxidation waves exhibited features indicated of irreversibility at the scan rate employed. In FIG. 12A, under an $N_2$ atmosphere, AQ-Cl showed two reversible one-electron transfer processes with the first half-wave potential at −1.26 V and the second at −2.00 V vs ferrocenium/ferrocene ($Fc^+$/Fc). When $CO_2$ was introduced to the solution, no changes were observed in the cathodic peak current and the position for the first electron transfer, but the positive shift in the second cathodic wave indicated the occurrence of a reductive addition of $CO_2$ to the AQ-Cl dianion. This chemical reaction between the dianion and $CO_2$ is believed to occur through a nucleophilic addition reaction between the oxyanion and the electropositive carbon atom of the $CO_2$ molecule.

The value of the association constants for complexation of $CO_2$ with the dianions of the weakly complexing quinones were calculated from the positive shift of the half-wave potential of the second-electron transfer when $CO_2$ was introduced to the solution using the equation $$E = E^{\frac{1}{2}}_{Q^{\bullet-}/Q^{2-}} + \frac{RT}{F}\ln\frac{[Q^{\bullet-}]}{[Q^{2-}]} - \frac{RT}{F}\ln(K_{binding}[CO_2]+1)$$

$$\Delta E^{\frac{1}{2}}_{Q^{\bullet-}/Q^{2-}} = \frac{RT}{F}\ln(K_{binding}[CO_2]+1)$$

where F is the Faraday constant, R is the ideal gas constant, T is the temperature, is the shift in the half-wave potentials when CO2 is introduced to the system, and [CO2] is the concentration of dissolved CO2. The calculations afforded values ranging from $6\times10^1$ $M^{-1}$ for $BQ-Cl_4$ to $2.32\times10^3$ $M^{-1}$ for AQ-Cl.

The variations in the $CO_2$ association constants for $BQ-Cl_2$, $BQ-Cl_4$ and $p-NQ-Cl_2$ are due to the resonance and the inductive stabilization effects of the oxyanion by the electron withdrawing substituents on the quinoid ring-structures. A greater stabilization of the oxyanion lowers its nucleophilic reactivity towards $CO_2$ addition and decreases the $CO_2$ association constant. The decrease in $CO_2$ binding constant for $p-NQ-Cl_2$ over the $BQ-Cl_2$ dianion, for instance, was believe to be due mainly to the resonance stabilization through electron delocalization within the aromatic phenyl groups fused to the quinone ring-structure, consistent with the effect of resonance stabilization on the basicity of aromatic oxide anions observed in phenol and 1-naphthol molecules. In a dilute aqueous solution, phenol (phenoxide $pK_b$=3.11), is more basic than the 1-naphthol (naphthoxide $pK_b$=3.66). In organic solvents, the strength of an oxyanion as a Lewis base is reflected in its hydrogen-bonding power. A lower measured $CO_2$ binding constant for $BQ-Cl_4$ as compared to $BQ-Cl_2$ is believed to be predominantly due to the electron-withdrawing character of the chlorine side groups; replacement of the two hydrogen atoms of $BQ-Cl_2$ with two chlorine atoms allowed for greater stabilization of the dianion $BQ-Cl_4$ and a decrease in the nucleophilicity of this anion toward $CO_2$.

Fusion of the aromatic benzene group to the quinone ring showed less of an effect on the resonance stabilization of the oxyanions than did attaching of the electron-withdrawing groups to the quinone-ring structure. Thus, replacement of the electron-withdrawing groups with fused aromatic phenyl groups increased the $CO_2$ association constant, as demonstrated for the anthraquinone derivatives, AQ-Cl, AQ-CONH—$C_4H_9$ and AQ-COO—$C_3H_7$, which were categorized as weakly complexing quinones because addition of $CO_2$ did not affect the reduction and oxidation waves of the first electron transfer whereas the half-wave electron transfer shifted positively.

Electrochemistry of Strongly Complexing Quinones in the Presence of $CO_2$

Addition of $CO_2$ to quinones that interact strongly with the $CO_2$ led to significantly different cyclic voltammetry waves than those discussed for weakly complexing quinones above. Eleven quinones referenced in Example 1 were categorized as strongly complexing quinones: BQ, p-NQ, AQ, AQ-O—$C_3H_7$, o-NQ, PQ, DBQ, TBQ, p-NQ-$Me_2$, PQ-I and PQ-$I_2$. The discussion below on the first six compounds as these quinones presented unique cyclic voltammograms over the complete interaction range.

The anthraquinone derivative, AQ-COO—$C_3H_7$, showed the strongest $CO_2$ association constant among the group of weakly complexing quinones. The electron-withdrawing nature of the carbonyl group (C=O) of the ester substituent lowers the Lewis basicity of the oxyanion, which is believed to limit its association constant with $CO_2$. Replacing the ester group with any electron-donating substituent is believed to result in an increase in the $CO_2$ association constant. The electrochemical behavior of two anthraquinone derivatives with opposite inductive effects, AQ-COO—$C_3H_7$ and AQ-O—$C_3H_7$, was compared with that of the unsubstituted anthraquinone molecules, AQ, for which the substituent inductive effect of the hydrogen is between that of the ester and the ether groups.

Figures 12C, 12D:
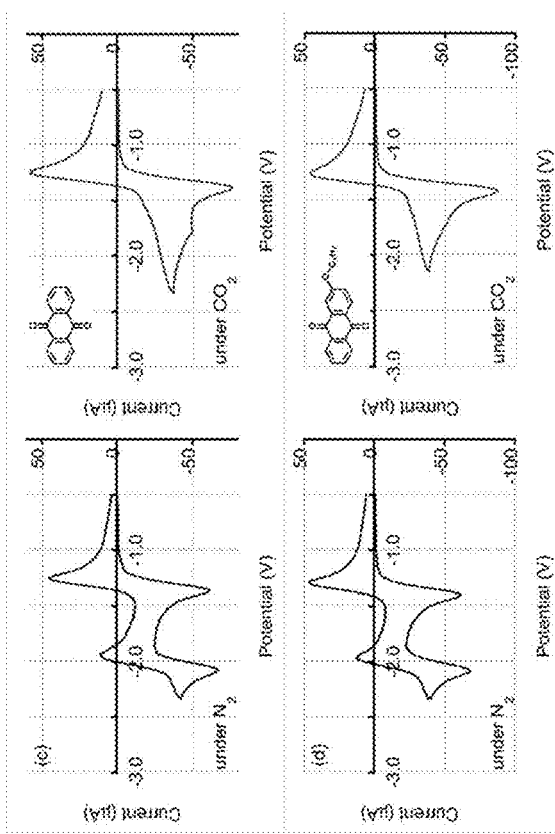
FIGS. 12A-12D show cyclic voltammetry of 2-chloro-9,10-anthraquinone (AQ-Cl) (FIG. 12A), an ester-derivative of 9,10-anthraquinone (AQ-COO—$C_3H_7$) (FIG. 12B), 9,10-anthraquinone (AQ) (FIG. 12C) and an ether-derivative of 9,10-anthraquinone (AQ-O—$C_3H_7$) (FIG. 12D) in solutions of 0.1 M [n-$Bu_4$N]$PF_6$ in DMF saturated with either $N_2$ (left) or $CO_2$ (right)
Figures 12A, 12B:
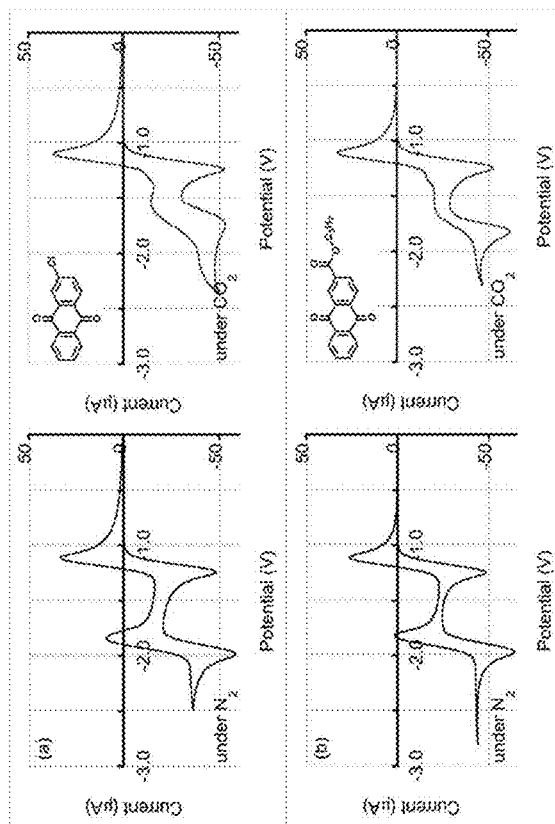

FIG. 12B-12D, show cyclic voltammetry data for AQ-COO—$C_3H_7$, AQ and AQ-O—$C_3H_7$, respectively, in a DMF electrolyte saturated with $N_2$ (left) and in $CO_2$ (right) atmospheres at a scan rate of 100 mV/s. The cyclic voltammograms of AQ-COO—$C_3H_7$, AQ and AQ-O—$C_3H_7$ showed two one-electron transfer waves in $N_2$, which were separated by about 0.7V. As with other weakly complexing quinones, there was no change in the peak current and position of the first reduction wave for AQ-COO—$C_3H_7$ when the electrolyte solution was saturated with $CO_2$ but the second reduction wave was shifted positively (FIG. 12B). With both hydrogen and the ether substituents, the $CO_2$ association constant was expected to be stronger than with the ester group, and accordingly larger positive shifts of the second reduction waves were observed for AQ and AQ-O—$C_3H_7$ (FIGS. 12C and 12D, respectively). The positive shift of the second (more negative) reduction wave was accompanied by an increase in the first cathodic current. The second reduction wave was only a shoulder in the case of AQ (FIG. 12C) and none was observed in the case of AQ-O—$C_3H_7$ (FIG. 12D). The first cathodic peak current of AQ increased from 56 μA to 70 μA, while the cathodic peak current for AQ-O—$C_3H_7$ increased from 56 μA to 83 μA. Only one oxidation wave was observed in the voltammograms of AQ and AQ-O—$C_3H_7$ with the current of the oxidation wave under $CO_2$ higher than that under $N_2$. The current increase in the first oxidation wave is believed to correspond to the oxidation of the quinone-$CO_2$ monoadducts to release $CO_2$ and regenerate the semiquinones, which were oxidized immediately to the neutral quinone species. Simultaneous two-oxidation processes occur because the electrode potential to oxidize the monoadduct is sufficiently energetic to further oxidize the semiquinones thus generated.

Quinones with electron-donating substituents were expected to have stronger $CO_2$ association constants. Based on their molecular structures, the oxyanions of BQ and p-NQ should have $CO_2$ association constants higher than those of both AQ and AQ-O—$C_3H_7$. With the concept of resonance stabilization and its effects on the basicity of aromatic oxyanions described previously, the basicity of p-NQ oxyanion was expected to be between those of BQ and AQ. With no fused aromatic phenyl ring, the BQ oxyanion is the strongest Lewis base among these three quinones.

Figure 13A:
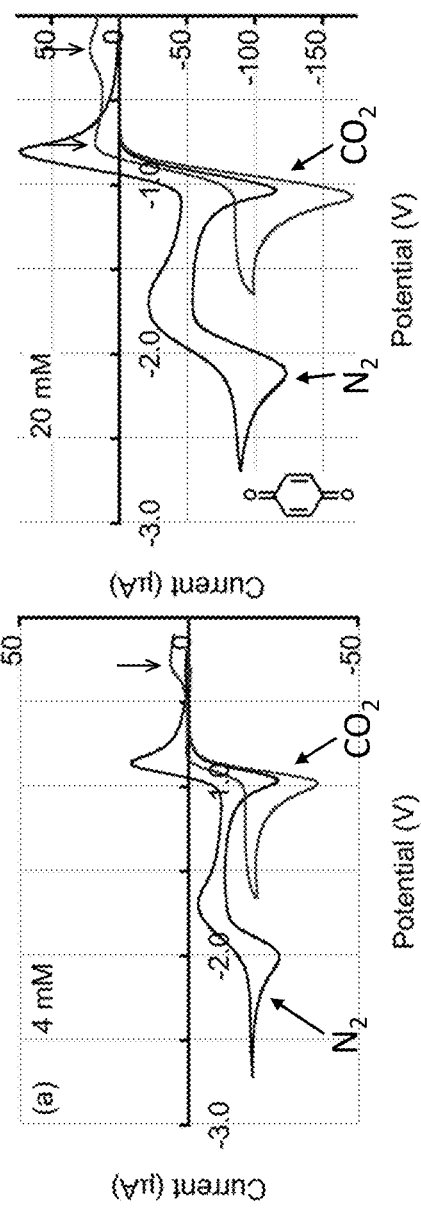
FIGS. 13A-13B show cyclic voltammetry of p-benzoquinone (BQ) (FIG. 13A) and p-napthoquinone (p-NQ) (FIG. 13B) in solutions of 0.1 M [n-$Bu_4$N]$PF_6$ in DMF saturated with either $N_2$ or $CO_2$.
Figure 13B:
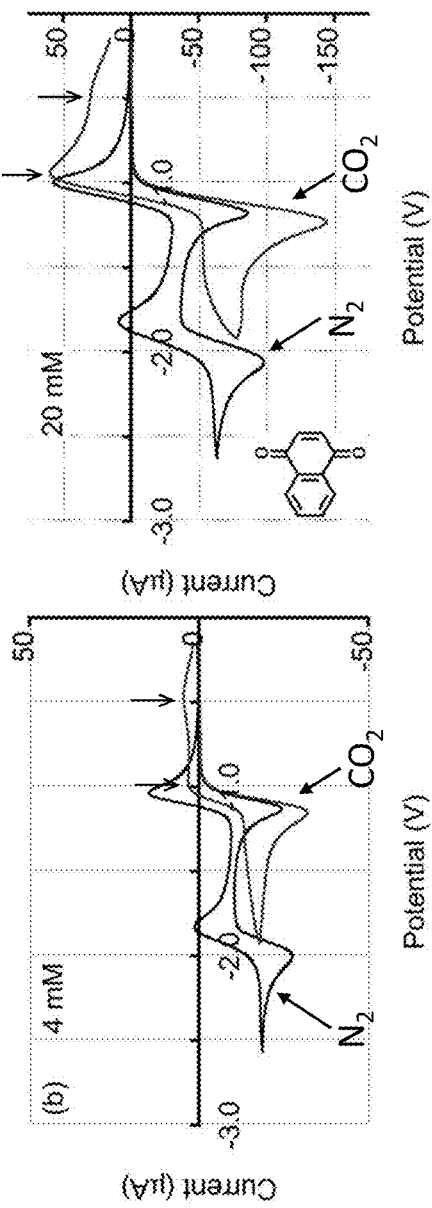

FIGS. 13A-13B shows cyclic voltammetry of p-benzoquinone (BQ) (FIG. 13A) and p-napthoquinone (p-NQ) (FIG. 13B) solutions of 0.1 M [n-Bu$_4$N]PF$_6$ in DMF saturated with either N$_2$ or CO$_2$ at a scan rate of 100 mV/s using at quinone concentrations of 4 mM (left) and 20 mM (right). Two well-separated electrochemical waves were observed for BQ and p-NQ solutions under a nitrogen environment. In the presence of CO$_2$, these quinones showed a significant increase in the peak current of the first electron transfer, attributed to two consecutive electron transfers at this reduction potential, and the disappearance of the reduction wave of the second electron transfer, which could be attributed to a rapid disproportionation of the semiquinones to give monoadduct dianions and neutral quinones.

At a BQ concentration of 4 mM, the presence of CO$_2$ increased the peak current of the first electron transfer from 24.5 µA to 36.0 µA, i.e., by about 47%. For 20 mM BQ, the current increase reached 54%. Similarly, at 4 mM p-NQ, the peak current increased from 22.6 µA to 30.3 µA, or about 34%; whereas, at 20 mM p-NQ, the peak current increased from 77.6 µA to 135.5 µA, or about 75%. This indicated that the formation of monoadduct dianions of BQ and p-NQ depended on the concentration of their semiquinones within the boundary layers at the electrode surfaces.

FIGS. 13A-13B show that the voltammograms for BQ and p-NQ revealed two oxidation waves due to the electron abstraction from the products of the interacting dianion quinones and CO$_2$, corresponding to two different oxidation mechanisms at the two oxidation potentials. These are indicated by downward arrows in FIGS. 13A-13B. The first oxidation wave was attributed to the CO$_2$ monoadducts and the second, which occurred at a less negative potential, to the oxidation process of the diadducts. In the case of BQ, the anodic peak current of the monoadduct was observed at −0.83V, while the anodic peak current of the diadduct was observed at −0.32V. In the case of p-NQ, the anodic peak current of the monoadduct oxidation process was observed at −1.01V, while the anodic peak current of the diadduct was observed at −0.50V.

Figure 14:
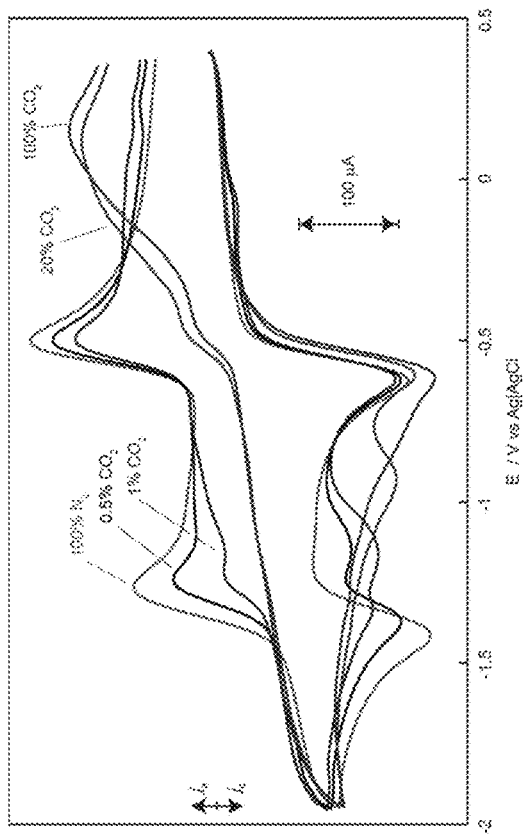
FIG. 14 shows cyclic voltammetry of p-napthoquinone (p-NQ) in solution in 0.1 M [n-$Bu_4$N]$PF_6$ in DMF saturated with increasing concentration of $CO_2$ gas (with $N_2$ balance)

Mechanistic Analysis of p-naphthoquinone Electrochemistry and the Subsequent Addition of CO$_2$ Deeper mechanistic analysis was performed on p-NQ to more fully understand the mechanism of electrochemically-induced reductive CO$_2$ addition. This was done by studying the CVs of p-NQ under increasing concentrations of CO$_2$ with a balance of N$_2$. FIG. 14 shows cyclic voltammetry of 5 mM p-napthoquinone (p-NQ) solution in 0.1 M [n-Bu$_4$N]PF$_6$ in DMF saturated with increasing concentration of CO$_2$ gas (with N$_2$ balance) at a scan rate of 500 mV/s using glassy carbon working electrode. The CVs in FIG. 14 show that at very low concentrations of CO$_2$ there is a clear trend of emergence of new peaks and the diminishing of others. The discussion to follow will constantly make references to FIG. 14 and explains the major features observed through thermodynamic and kinetic phenomena.

The first major observation from the CVs in FIG. 14 is the great difference in the behavior of two reduced species, the semiquinone NQ$^{•-}$ and the quinol dianion NQ$^{2-}$, in the presence of CO$_2$. The cathodic peak of the first reduction, where NQ$^{•-}$ is generated, has an intensity that only slightly deceases with increasing concentrations of CO$_2$, which indicated a relatively weak equilibrium with CO$_2$.

The semiquinone monoadduct, which results from this equilibrium, has the density of the electron acquired in the first reduction wave shift from the conjugation of the naphthoquinone aromatic rings to the conjugation of the newly-added carboxylate moiety, which is isolated from the conjugation of the rest of the molecule via the newly-formed σ-bond. This causes the relative neutralization of the aromatic rings, which now can acquire a second electron at a more positive potential, i.e. the first reduction potential or a few 10's mV thereof, as seen in FIG. 13B and the 100% CO$_2$ CV in FIG. 14. This is believed to be mainly because the reduction of quinones at the electrode interface occurs via an electron transfer from the electrode to the aromatic conjugated system.

At low concentrations of CO$_2$, 0.5 and 1.0% CO$_2$ CVs in FIG. 14, the rate of the forward reaction in the semiquinone monoadduct formation reaction was relatively slow, and the cathodic peaks between the first and second reduction waves appeared closer to the second reduction wave. With increasing concentrations of the CO$_2$, 20 and 100% CO$_2$ CVs, this peak shifted more positively and in the case of 100% CO$_2$ merged with the cathodic peak of the first reduction wave, causing a shift in the peak position due to the convolution effect. This peak is believed to be caused essentially by kinetic effects: as NQ$^{•-}$ forms in the first reduction wave at the vicinity of the electrode, it reacts with CO$_2$ in the diffusion layer of the electrode to form the semiquinone diadduct, which in turn can accept a second electron at a more positive reduction potential. But during the negative (cathodic) sweep of the CV, the glassy carbon electrode attains an increasingly negative potential, and hence an increasingly greater overpotential, η, where η=$E_{applied}$−$E_{equilibrium}$ and $E_{equilibrium}$ is obtained from the Nernst expression. This drives the kinetics of the second reduction of the semiquinone monadduct in accordance to the Butler-Volmer expression, $$i = i_0\left(e^{\left(\frac{\alpha F\eta}{RT}\right)} - e^{\left(\frac{(1-\alpha)F\eta}{RT}\right)}\right),$$

where i is the current associated with the Faradaic electrochemical reaction, i.e. the reduction of the semiquinone monoadduct, which increases exponentially until counteracted by transport resistance, i.e. depletion of reactant in the electrode diffusion layer. This is believed to lead to the emergence of the kinetic cathodic peak between the two thermodynamic cathodic peaks, which correspond to the two reduction waves of p-NQ.

Figure 15:
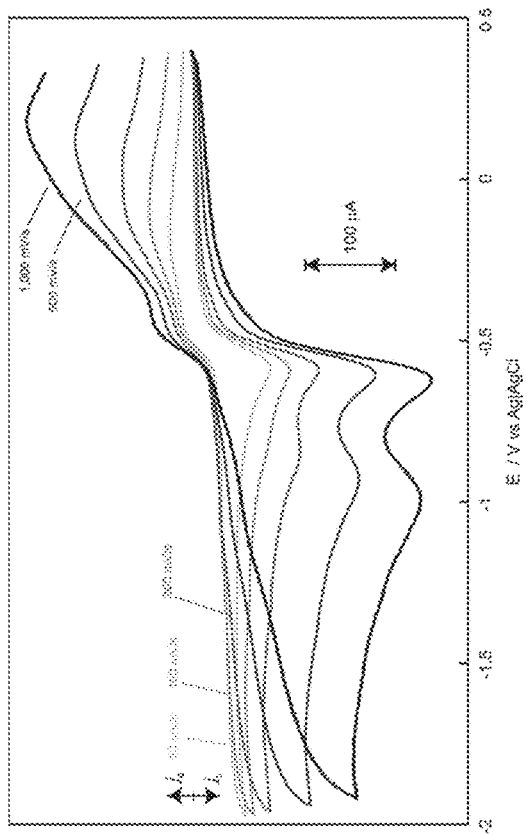
FIG. 15 shows cyclic voltammetry of 5 mM p-naphthoquinone (p-NQ) in solution in 0.1 M [n-$Bu_4$N]$PF_6$ in DMF saturated at 20% $CO_2$ (with $N_2$ balance) at different scan rates.

It is believed that the position of the peak between the two reduction peaks in FIG. 14 is determined strictly by the competition between the rate of the chemical formation of the semiquinone, which is dependent on the concentration of CO$_2$ dissolved in the electrolyte—rate of bimolecular reaction r=k[NQ$^{•-}$][CO$_2$]—and the rate of the electrochemical reduction of the semiquinone monoadduct to dianion monoadduct. The rate constant for the bimolecular reaction is estimated at k~25 M$^{-1}$ s$^{-1}$, which at the conditions of the CV and at 20% CO$_2$ yields a rate of semiquinone monoadduct formation of ~5×10$^{-3}$ M s$^{-1}$. The scan rate dependence on position of this peak can be seen in FIG. 15, which shows cyclic voltammetry of 5 mM p-napthoquinone (p-NQ) solution in 0.1 M [n-Bu$_4$N]PF$_6$ in DMF saturated at 20% CO$_2$ (with N$_2$ balance) at different scan rates using glassy carbon working electrode. In FIG. 15, at low scan rates 50-100 mV/s, the peak merges with the cathodic peak of the first reduction wave, while at higher scan rates, which are believed to be greater than the time constant of the chemical reaction, the second peak emerges and moves further away negatively from the first peak. The intensity of this peak also increases relative to the first reduction wave, since the electrochemical reaction, which occurs only after the chemical reaction had occurred, takes place at a greater overpotential. The voltage distance between the two cathodic peaks corresponds to the time required for the chemical reaction to proceed. The second chemical reaction of the dianion diadduct proceeds as expected and does not contribute to the electrochemical behavior greatly beyond the thermodynamic stabilization of the dianion diadduct.

Steric Effects of Para- vs Ortho-Quinones

Figure 16A:
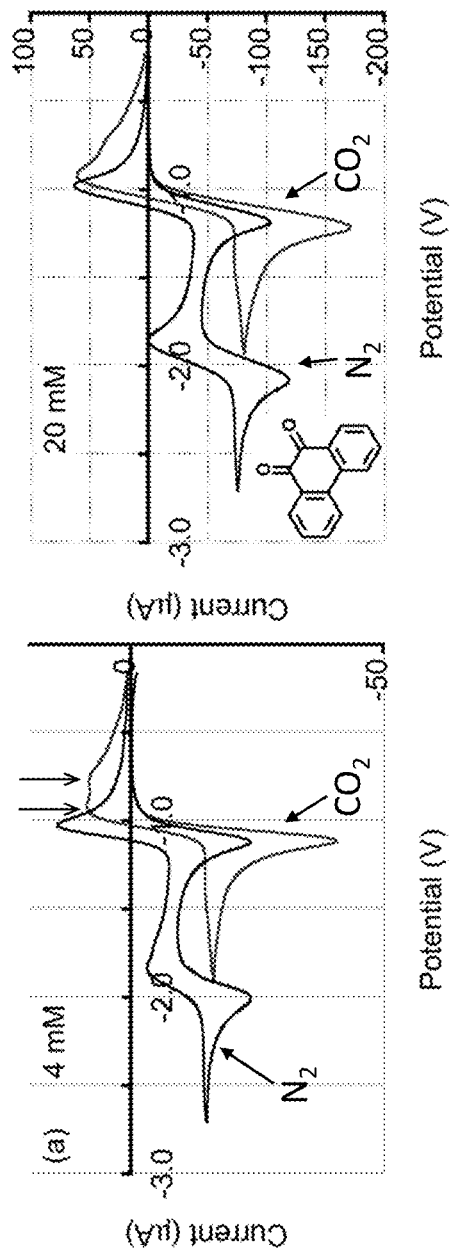
FIGS. 16A-16B show cyclic voltammetry of 9,10-phenanthrenequinone (PQ) (FIG. 16A) and o-napthoquinone (o-NQ) (FIG. 16B) in solutions of 0.1 M [n-$Bu_4$N]$PF_6$ in DMF saturated with either $N_2$ or $CO_2$.
Figure 16B:
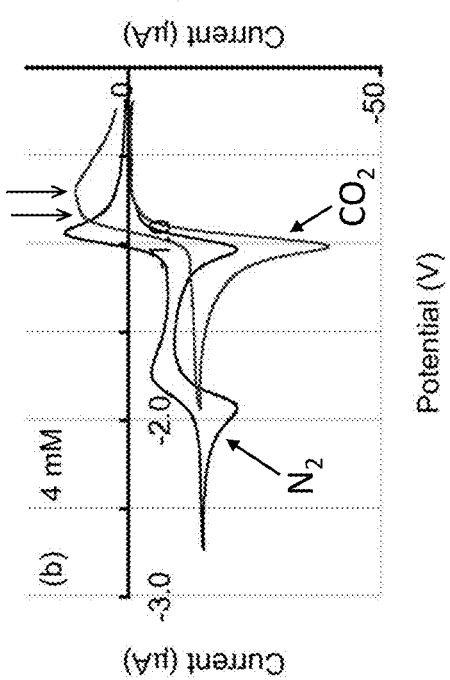

Quinones exist in two isomeric forms, 1,4-cyclohexadienedione (para-quinone) and 1,2-cyclohexadienedione (ortho-quinone). The discussion above was focused on the association of the dianions of para-quinones with $CO_2$. The $CO_2$ association with two ortho-quinones, PQ, the isomeric form of AQ, and o-NQ, the isomeric form of p-NQ, are assessed. In dilute aqueous solution, the deprotonated hydrobenzoquinone ($pK_b$=3.65) is more basic than the deprotonated catechol ($pK_b$=4.15); therefore it was believed that dianions of ortho-quinones would be less basic than those of para-quinones. FIGS. 16A-16B show cyclic voltammetry of 9,10-phenanthrenequinone (PQ) (FIG. 16A) and o-napthoquinone (o-NQ) (FIG. 16B) in solutions of 0.1 M [n-Bu$_4$N] PF$_6$ in DMF saturated with either $N_2$ or $CO_2$ at a scan rate of 100 mV/s using a platinum electrode, at quinone concentrations of 4 mM (left) and 20 mM (right). As shown in FIGS. 16A-16B, in DMF electrolyte solution saturated with nitrogen, PQ showed the two typical electrochemical waves corresponding to the formation of the semiquinone and the dianion quinone, respectively. The half-wave potential for the first electron transfer with PQ occurred at −1.09 V, and the second at −1.96 V, with a separation of about 0.87 V. This value was larger than the separation of the half wave potentials observed for AQ of about 0.75 V. Similarly, the potential separation of o-NQ, about 0.89 V, was slightly wider than that of p-NQ, 0.87 V. The larger potential separation with ortho-quinones is believed to be due to the close proximity of the two oxyanions in $C_1$ and $C_2$ positions which experience a larger electrostatic repulsion.

Addition of $CO_2$ to DMF solutions containing PQ resulted in a large increase in the peak current of the first electron transfer and disappearance of the reduction wave for the second electron transfer (FIG. 16A), significantly different from the observed trends in the cyclic voltammograms for AQ (FIG. 12C), which still showed a shoulder in the reduction wave due to the second electron transfer under $CO_2$ atmosphere. These results suggest that PQ has a stronger association with $CO_2$ than does AQ. The increase in the PQ peak current of the first electron transfer was attributed to two consecutive electron transfers at the first reduction wave. Addition of $CO_2$ to DMF solutions containing o-NQ also resulted in a significant increase in the peak current of the first electron transfer and no separate reduction wave of the second electron transfer was observed (FIG. 16B). At a PQ concentration of 4 mM (FIG. 16), addition of $CO_2$ increased the peak current of the first electron transfer from 22 μA to 39 μA, i.e., by about 77%. At a PQ concentration of 20 mM (FIG. 16B), the percentage increase in current dropped to 71%. A more significant drop in the percentage of current increase with increasing quinone concentration was observed with o-NQ. At 4 mM concentration (FIG. 16B), the percentage peak current increase was about 93%, while at 20 mM concentration, the percentage peak current increase was only about 84%. The difference in the trend of peak current increase with increasing quinone concentration from the results obtained for the para-quinones suggested a different mechanism of $CO_2$ binding. For the ortho-quinones, the linear dependence of the peak current increase with the relative concentration ratio of $CO_2$ to quinone suggested a mechanism of electron transfer, then chemical step, then electron transfer (ECE). The carbonate complex formed by an initial one-electron reduction of the neutral quinone to form a semiquinone which then complexes with $CO_2$. This intermediate complex is believed to immediately undergo a second one-electron reduction in close proximity to the electrode surface to form the mono(carbonate) of the dianion quinone. The complexation of the semiquinone with $CO_2$ was confirmed by a small positive shift in the first electron transfer when the electrolyte was saturated with $CO_2$. The positive shift for o-NQ was about 38 mV and for PQ was about 14 mV.

As observed and discussed above, the voltammograms of PQ and o-NQ in DMF electrolyte saturated with $CO_2$ showed two oxidation waves (FIGS. 16A-16B), corresponding to the oxidations of $CO_2$ monoadducts and diadducts, respectively. The relative peak currents of these oxidation waves gave an indication of the fraction of dianion quinone-$CO_2$ complexes within the diffuse layer on the electrode surface that underwent each of the oxidation processes. The concentration of dissolved $CO_2$ in the DMF electrolyte solution at a $CO_2$ pressure of 1 bar is about 0.175 M, or approximately 44 times the quinone concentration of 4 mM. At the same $CO_2$ concentration, at a quinone loading of 20 mM, the relative concentration of dissolved $CO_2$ to quinone was 8.75. As the relative $CO_2$ concentration increased, the equilibrium position shifted to disfavor the dissociation of the $CO_2$-dianion quinone diadducts, and thus the relative peak currents of the two oxidations were lower with the 4 mM than with the 20 mM quinone solution, shown in FIG. 16.

The experiments described in this example demonstrate reactivity between certain electroactive species (e.g., certain semiquinones) with carbon dioxide at relatively positive potentials. As described above, incorporation of certain of the electroactive species described (e.g., optionally-substituted quinones that are strongly complexing) into electrochemical cells can, with the insight and guidance of the present disclosure, promote electrochemically mediated capture of carbon dioxide under conditions in which relatively little (or no) electrochemically-mediated reactivity with other species such as $O_2$ occurs.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

As used herein in the specification and in the claims, the phrase "at least a portion" means some or all. "At least a portion" may mean, in accordance with certain embodiments, at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %. "At least a portion" may mean, in accordance with certain embodiments, at least 1 vol %, at least 2 vol %, at least 5 vol %, at least 10 vol %, at least 25 vol %, at least 50 vol %, at least 75 vol %, at least 90 vol %, at least 95 vol %, or at least 99 vol %, and/or, in certain embodiments, up to 100 vol %. "At least a portion" may mean, in accordance with certain embodiments, at least 1 mol %, at least 2 mol %, at least 5 mol %, at least 10 mol %, at least 25 mol %, at least 50 mol %, at least 75 mol %, at least 90 mol %, at least 95 mol %, or at least 99 mol %, and/or, in certain embodiments, up to 100 mol %.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of at least partial gas separation, the method comprising:

applying a potential difference across an electrochemical cell comprising a first electroactive species;

exposing a gas mixture comprising a target gas to the electrochemical cell; and removing an amount of the target gas from the gas mixture during and/or after the applying the potential difference, wherein less than or equal to 0.1% of any oxygen gas ($O_2$) present in the gas mixture by volume percent is removed from the gas mixture, and wherein the first electroactive species comprises one or more of phenanthrenequinone ester (PQ-ester), iodo-phenanthrenequinone (PQ-I), di-iodo-phenanthrenequinone (PQ-$I_2$), phenanthrenequinone (PQ), ortho-naphthoquinone (o-NQ), dimethyl-para-naphthoquinone (p-NQ-$Me_2$), para-naphthoquinone (p-NQ), di-tert-butyl-benzoquinone (TBQ), and benzoquinone (BQ), the structures of which are shown below:

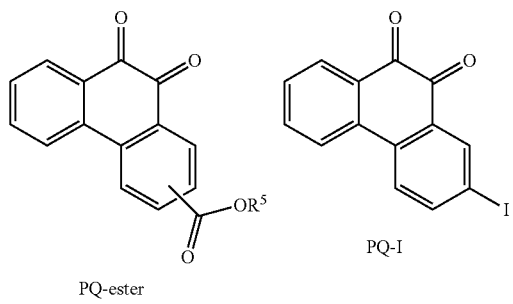

-continued

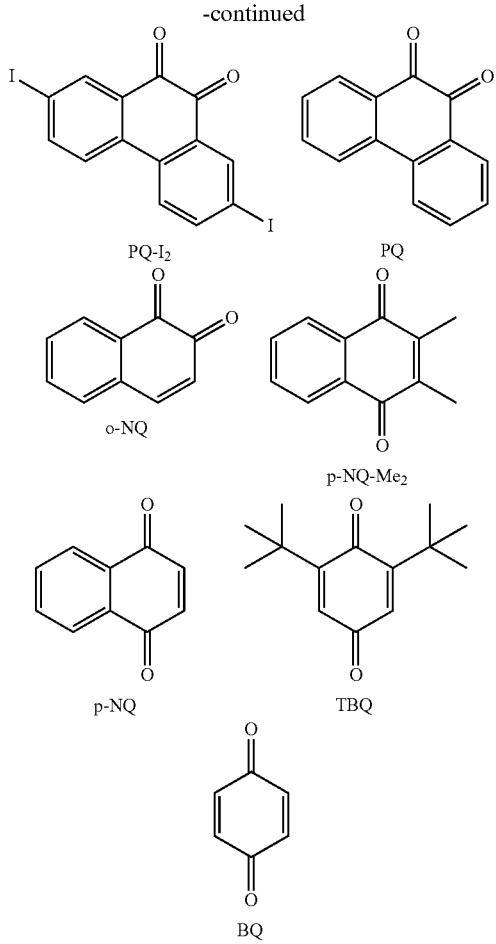

wherein R⁵ is optionally-substituted branched or unbranched C1-C18 alkyl.

2. The method of claim 1, wherein the electrochemical cell comprises a negative electrode, a positive electrode, and a separator between the negative electrode and the positive electrode.

3. The method of claim 2, wherein the separator contains a conductive liquid, and wherein the conductive liquid comprises a room temperature ionic liquid or a non-volatile electrolyte.

4. The method of claim 3, wherein the target gas comprises carbon dioxide, sulfur dioxide, or a borane, and wherein the target gas concentration is less than or equal to 5,000 ppm.

5. The method of claim 4, wherein the electrochemical cell comprises a first electroactive species is immobilized on the negative electrode.

6. The method of claim 1, wherein the target gas comprises carbon dioxide, sulfur dioxide, or a borane.

7. The method of claim 1, wherein the target gas concentration is less than or equal to 5,000 ppm.

8. The method of claim 1, wherein the gas mixture comprises oxygen gas ($O_2$) and the oxygen gas ($O_2$) is present in the gas mixture at a concentration of greater than or equal to 0.1 vol %.

9. The method of claim 1, wherein no $O_2$ gas is removed from the gas mixture.

10. The method of claim 1, wherein the electrochemical cell comprises
  a negative electrode comprising the first electroactive species;
  a positive electrode; and
  a separator between the negative electrode and the positive electrode, wherein the separator contains a conductive liquid.

11. The method of claim 1, wherein the electrochemical cell comprises a negative electrode, and wherein the first electroactive species is part of a polymeric material immobilized on the negative electrode.

12. The method of claim 1, wherein the target gas comprises carbon dioxide, sulfur dioxide, or a borane, and wherein the target gas concentration is less than or equal to 500 ppm.

13. The method of claim 3, wherein the target gas concentration is less than or equal to 500 ppm.

14. The method of claim 13, wherein the target gas comprises carbon dioxide.

15. The method of claim 1, wherein the target gas concentration is less than or equal to 500 ppm.

16. The method of claim 1, wherein the target gas comprises carbon dioxide.

17. The method of claim 1, wherein the first electroactive species comprises PQ-ester.

18. The method of claim 1, wherein the first electroactive species comprises PQ-I.

19. The method of claim 1, wherein the first electroactive species comprises PQ-I$_2$.

20. The method of claim 1, wherein the first electroactive species comprises PQ.

21. The method of claim 1, wherein the first electroactive species comprises o-NQ.

22. The method of claim 1, wherein the first electroactive species comprises p-NQ-Me$_2$.

23. The method of claim 1, wherein the first electroactive species comprises p-NQ.

24. The method of claim 1, wherein the first electroactive species comprises TBQ.

25. The method of claim 1, wherein the first electroactive species comprises BQ.

* * * * *

UNITED STATES PATENT AND TRADEMARK OFFICE
CERTIFICATE OF CORRECTION

PATENT NO. : 12,264,399 B2
APPLICATION NO. : 18/103310
DATED : April 1, 2025
INVENTOR(S) : Sahag Voskian et al.

It is certified that error appears in the above-identified patent and that said Letters Patent is hereby corrected as shown below:

In the Claims

In Claim 5, at Column 61, Lines 52-53, the text: "wherein the electrochemical cell comprises a first electroactive species is immobilized" should read: --wherein the first electroactive species is immobilized--.

Signed and Sealed this
Sixth Day of May, 2025

Coke Morgan Stewart
*Acting Director of the United States Patent and Trademark Office*